(12) United States Patent
Fukuhara et al.

(10) Patent No.: US 8,031,960 B2
(45) Date of Patent: Oct. 4, 2011

(54) WAVELET TRANSFORMATION DEVICE AND METHOD, WAVELET INVERSE TRANSFORMATION DEVICE AND METHOD, PROGRAM, AND RECORDING MEDIUM

(75) Inventors: Takahiro Fukuhara, Kanagawa (JP);
Katsutoshi Ando, Kanagawa (JP);
Naoto Nishimura, Kanagawa (JP);
Yuuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1065 days.

(21) Appl. No.: 11/767,743

(22) Filed: Jun. 25, 2007

(65) Prior Publication Data

US 2008/0013846 A1 Jan. 17, 2008

(30) Foreign Application Priority Data

Jul. 14, 2006 (JP) ................................. 2006-193670

(51) Int. Cl.
*G06K 9/46* (2006.01)
(52) U.S. Cl. ........ 382/248; 382/232; 382/234; 382/240; 382/276; 375/240; 375/240.11; 375/240.18; 375/240.19
(58) Field of Classification Search .......................... None
See application file for complete search history.

(56) References Cited

U.S. PATENT DOCUMENTS

| | | | | |
|---|---|---|---|---|
| 5,838,377 A | * | 11/1998 | Greene | 375/240.11 |
| 6,678,422 B1 | * | 1/2004 | Sharma et al. | 382/240 |
| 6,738,523 B1 | * | 5/2004 | Small et al. | 382/240 |
| 6,891,895 B1 | * | 5/2005 | Onno et al. | 375/260 |
| 2002/0078113 A1 | * | 6/2002 | Nakayama | 708/300 |
| 2004/0021587 A1 | * | 2/2004 | Hashirano | 341/50 |

FOREIGN PATENT DOCUMENTS

| | | |
|---|---|---|
| JP | 10-283342 | 10/1998 |
| JP | 2001-197498 | 7/2001 |
| JP | 2001-285643 | 10/2001 |
| JP | 2003-298846 | 10/2003 |

OTHER PUBLICATIONS

Wim Sweldens, "The Lifting Scheme: A Custom-Design Construction of Biorthogonal Wavelets", Applied and Computational Harmonic Analysis, vol. 3, No. 2, Article No. 0015, 1996, pp. 186-200.
Christos Chrysafis, et al., "Line-Based, Reduced Memory, Wavelet Image Compression", IEEE Transactions on Image Processing, vol. 9, No. 3, Mar. 2000, pp. 378-389.
U.S. Appl. No. 11/760,951, filed Jun. 11, 2007, Fukuhara, et al.

* cited by examiner

*Primary Examiner* — Sath V Perungavoor
*Assistant Examiner* — Jason Heidemann
(74) *Attorney, Agent, or Firm* — Oblon, Spivak, McClelland, Maier & Neustadt, L.L.P.

(57) ABSTRACT

Wavelet transformation is performed at a plurality of levels as to image signals. A first buffer stores, independently for each of the levels, a part of coefficients from results of analysis filtering in a horizontal direction of the image signals. A second buffer stores, independently for each of the levels, a part of coefficients generated in a computation process of analysis filtering in a vertical direction of the image signals. A vertical filtering unit performs the vertical direction analysis filtering, using coefficients read out from the first and second buffers. A horizontal filtering unit performs analysis filtering in the horizontal direction, using coefficients from the results of the vertical direction analysis filtering as the input of the horizontal direction analysis filtering for the next level, except for the final level of the levels.

38 Claims, 29 Drawing Sheets

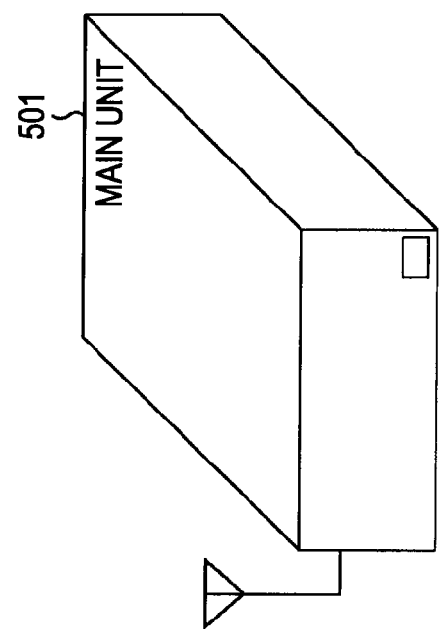
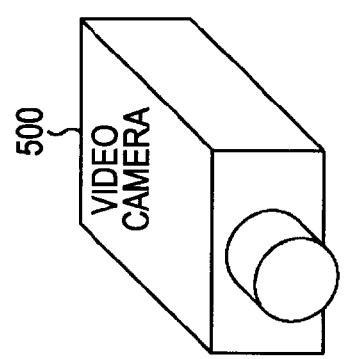
FIG. 29

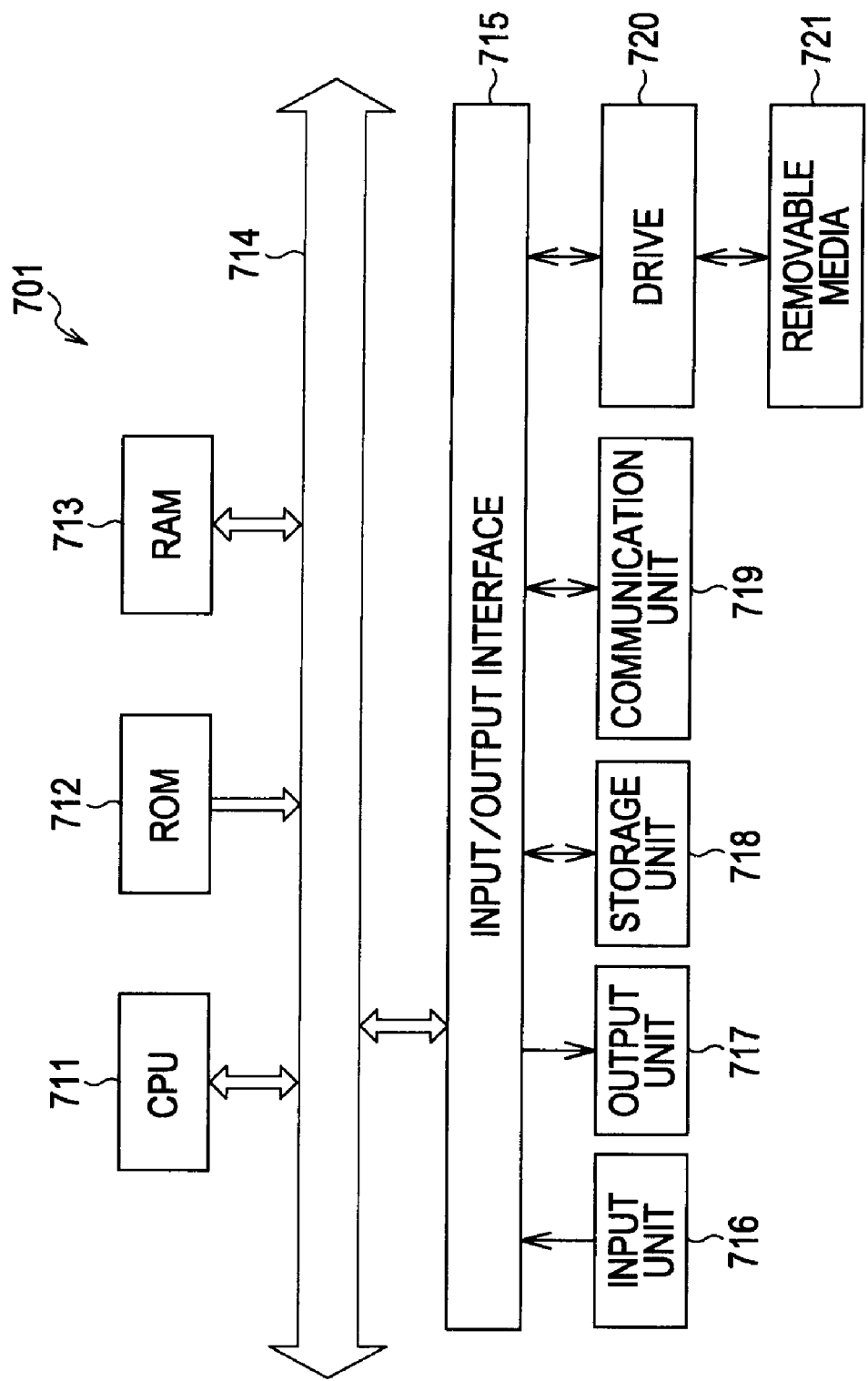

WAVELET TRANSFORMATION DEVICE AND METHOD, WAVELET INVERSE TRANSFORMATION DEVICE AND METHOD, PROGRAM, AND RECORDING MEDIUM

CROSS REFERENCES TO RELATED APPLICATIONS

The present invention contains subject matter related to Japanese Patent Application JP 2006-193670 filed in the Japanese Patent Office on Jul. 14, 2006, the entire contents of which are incorporated herein by reference.

BACKGROUND OF THE INVENTION

1. Field of the Invention

The present invention relates to a wavelet transformation device and method, a wavelet inverse transformation device and method, a program, and a recording medium, and more particularly relates to a wavelet transformation device and method, a wavelet inverse transformation device and method, a program, and a recording medium, enabling highs-peed wavelet transformation to be performed by exchanging data with internal memory configured with a small capacity.

2. Description of the Related Art

An image compression method representative of known methods is the JPEG (Joint Photographic Experts Group) method that has been standardized by the ISO (International Standards Organization). This is known to provide excellent coded images and decoded images in the event that DCT (Discrete Cosine Transform) is used and a relatively great number of bits are appropriated. However, reducing coding bits beyond a certain level results in marked block distortion characteristic of DCT, and deterioration can be subjectively observed.

On the other hand, in recent years, there has been much research performed on a method wherein images are divided into multiple bands (sub-bands) with filters called filter banks, wherein high-pass filters and low-pass filters are combined, and coding is performed for each band. Particularly, wavelet transformation coding is viewed as a new technology which is a likely candidate to replace DCT, since it does not have the problem that DCT has, i.e., marked block distortion at high compression rates.

International standardization of JPEG 2000 was completed January 2001. JPEG 2000 combines wavelet transformation and high-efficiency entropy coding (bit-plane based bit modeling and arithmetic encoding), and realizes marked improvements over JPEG with regard to coding efficiency.

Wavelet transformation uses a technique wherein, basically, image data is taken as input which is subjected to horizontal direction filtering and vertical direction filtering, in which lowband components are hierarchically divided. At this time, reading and writing of data to and from memory, such as readout of image data, writing of frequency coefficients generated as the result of filtering, readout of frequency coefficients once more, and so forth, need to be performed at a high frequency.

There has been recognized the need for a technique by which to perform wavelet transformation at high speeds, since image signals have a great amount of data. Also, a great number of techniques for externally writing frequency coefficients to memory and reading these in again have been proposed (See Japanese Unexamined Patent Application Publication No. 10-283342).

SUMMARY OF THE INVENTION

However, techniques wherein frequency coefficients are written out to external memory and read in again have the problem than sufficient bandwidth cannot be obtained since data is exchanged between the external memory an wavelet transformation unit, so it has been difficult to perform wavelet transformation at high speeds.

Also, raising the clock (operating frequency) is effective in increasing the speed of data between the external memory and wavelet transformation unit, but simple increasing of the clock not only results in the problem of increased power consumption; this is not readily handled by hardware such as FPGA (Field Programmable Gate Array) and PLD (Programmable Logic Device).

It has been recognized that there is a need to enable high-speed wavelet transformation without requiring external memory.

A wavelet transformation device according to an embodiment of the present invention, for performing wavelet transformation at a plurality of levels as to image signals, comprises: a first buffer for storing, independently for each of the levels, a part of coefficients from the results of analysis filtering in the horizontal direction of the image signals; a second buffer for storing, independently for each of the levels, a part of coefficients generated in the computation process of analysis filtering in the vertical direction of the image signals; a vertical filtering unit for performing the vertical direction analysis filtering, using coefficients read out from the first and second buffers; and a horizontal filtering unit for performing analysis filtering in the horizontal direction, using coefficients from the results of the vertical direction analysis filtering as the input of the horizontal direction analysis filtering for the next level, except for the final level of the levels.

The horizontal filtering unit and the vertical filtering unit may be realized by a lifting scheme of the wavelet transformation.

The lifting scheme may be a scheme wherein horizontal direction analysis filtering is performed divided into a plurality of stages of computations, with the horizontal filtering unit performing horizontal direction analysis filtering for a preset number of columns with the lifting scheme.

The horizontal filtering unit may further comprise a holding unit for holding a part of coefficients obtained in the process of the plurality of stages of computation with the lifting scheme, and generate coefficients of highband components and lowband components by performing the plurality of stages of computation to the final stage; wherein, in the event of performing horizontal direction analysis filtering for the next stage, only as many columns worth as necessary are input of the coefficients from vertical direction analysis filtering results from the vertical filtering unit, and further, coefficients held in the holding unit in the process of the plurality of stages of computation by the previous lifting scheme are read out, and the plurality of stages of computation with the lifting scheme are performed.

The horizontal filtering unit may perform horizontal direction analysis filtering with the lifting scheme until the number of columns in the horizontal direction are all gone.

The number of columns input to the lifting scheme at once may be three columns, and the number of coefficients held in the holding unit, three.

The horizontal filtering unit may store highband component and lowband component coefficients, generated by performing the plurality of stages of computation with the lifting scheme to the final stage, in the first buffer corresponding to the level.

The lifting scheme may be a scheme for performing vertical direction analysis filtering in multiple stages of computation, with the vertical filtering unit performing a preset number of lines worth of vertical direction analysis filtering with the lifting scheme.

The vertical filtering unit may generate highband component and lowband component coefficients by storing, in the second buffer, a part of coefficients obtained in the process of the plurality of stages of computation with the lifting scheme, and performing the plurality of stages of computation to the final stage, wherein, when performing vertical direction analysis filtering for the next stage, only as many lines worth as necessary of the coefficients from horizontal direction analysis filtering results from the horizontal filtering unit are read out from the first buffer, and further, coefficients stored in the second buffer in the process of the plurality of stages of computation with the previous lifting scheme are read out, and the plurality of stages of computation with the lifting scheme are performed.

The vertical filtering unit may perform vertical direction analysis filtering with the lifting scheme until the number of lines in the vertical direction are all gone.

The number of lines read out from the first buffer may be three lines, and the number of coefficients stored in the second buffer, three.

The first buffer may be configured having within itself independent buffers of as many lines as necessary for performing the vertical direction analysis filtering.

The second buffer may be configured having within itself independent buffers of as many coefficients necessary for performing the plurality of stages of computation.

The horizontal filtering unit may input the image signals in increments of lines, and perform horizontal direction analysis filtering each time the number of samples in the horizontal direction reaches a predetermined number, with the vertical filtering unit performing the vertical direction analysis filtering each time the number of lines in the vertical direction of the frequency component in the results of the horizontal direction analysis filtering performed by the horizontal filtering unit reach a predetermined number.

The horizontal filtering unit and the vertical filtering unit may perform analysis filtering on the lowest frequency components in a hierarchical manner.

The image signals may be video signals comprising a plurality of pictures, with the wavelet transformation device further comprising detecting unit for detecting the end of each picture by detecting vertical synchronization signals of the video signals, and the horizontal filtering unit and the vertical filtering unit performing analysis filtering for each picture.

According to an embodiment of the present invention, a wavelet transformation method of a wavelet transformation device for performing wavelet transformation at a plurality of levels as to image signals, comprises the steps of: storing a part of coefficients from the results of analysis filtering in the horizontal direction in first buffers independent for each of the levels; storing a part of coefficients generated in the process of computation of analysis filtering in the vertical direction in second buffers independent for each of the levels; performing vertical direction analysis filtering, using coefficients read out from the first and second buffers; and taking coefficients from the results of the vertical direction analysis filtering as the input of the horizontal direction analysis filter for the next level, except for the final level of the levels.

According to an embodiment of the present invention, with a program for causing a computer to execute processing of wavelet transformation at a plurality of levels as to image signals, the processing comprises the steps of: storing a part of coefficients from the results of analysis filtering in the horizontal direction in first buffers independent for each of the levels; storing a part of coefficients generated in the process of analysis filtering in the vertical direction of the image signals in second buffers independent for each of the levels; performing vertical direction analysis filtering, using coefficients read out from the first and second buffers; and taking coefficients from the results of the vertical direction analysis filtering as the input of the horizontal direction analysis filter for the next level, except for the final level of the levels.

According to an embodiment of the present invention, a recording medium stores a program for causing a computer to execute processing of wavelet transformation at a plurality of levels as to image signals, the processing comprising the steps of: storing a part of coefficients from the results of analysis filtering in the horizontal direction in first buffers independent for each of the levels; storing a part of coefficients generated in the computation process of analysis filtering in the vertical direction of the image signals in second buffers independent for each of the levels; performing vertical direction analysis filtering, using coefficients read out from the first and second buffers; and taking coefficients from the results of the vertical direction analysis filtering as the input of the horizontal direction analysis filter for the next level, except for the final level of the levels.

With the above-described arrangement, a part of coefficients from the results of analysis filtering in the horizontal direction are stored in first buffers independent for each of the levels, and a part of coefficients generated in the process of analysis filtering in the vertical direction of the image signals are stored in second buffers independent for each of the levels. Vertical direction analysis filtering is performed, using coefficients read out from the first and second buffers, and coefficients from the results of the vertical direction analysis filtering are taken as the input of the horizontal direction analysis filter for the next level, except for the final level of the levels. Thus, only a small configuration is needed for memory for storing the coefficients. Consequently, high-speed wavelet transformation can be performed without requiring external memory.

According to an embodiment of the present invention, a wavelet inverse transformation device for performing wavelet inverse transformation at a plurality of levels as to frequency components, generated by wavelet transformation having been performed as to image signals, thereby reconstructing an image, comprises: a first buffer for storing, independently for each of the levels except for the lowest band, a part of coefficients from the results of synthesizing filtering in the horizontal direction of the frequency components; a second buffer for storing, independently for each of the levels, a part of coefficients generated in the computation process of synthesizing filtering in the vertical direction as to the frequency components; a vertical filtering unit for performing the vertical direction synthesizing filtering, using coefficients read out from the first and second buffers; and a horizontal filtering unit for performing synthesizing filtering in the horizontal direction, using coefficients from the results of the vertical direction synthesizing filtering as the input of the horizontal direction synthesizing filtering for the next level, except for the final level of the levels.

The vertical filtering unit and the horizontal filtering unit may be realized by a lifting scheme of the wavelet inverse transformation.

The lifting scheme may be a scheme wherein vertical direction synthesizing filtering is performed divided into a plurality of stages of computations, with the vertical filtering unit performing vertical direction synthesizing filtering for a preset number of lines with the lifting scheme.

The vertical filtering unit may store, in the second buffer, a part of coefficients obtained in the process of the plurality of stages of computation with the lifting scheme, and generate the image by performing the plurality of stages of computation to the final stage, wherein, in the event of performing vertical direction synthesizing filtering for the next stage, only as many lines worth as necessary are read out of the coefficients from horizontal direction synthesizing filtering results from the horizontal filtering unit, and further, coefficients stored in the second buffer in the process of the plurality of stages of computation are read out, and the plurality of stages of computation with the lifting scheme are performed.

The vertical filtering unit may perform vertical direction synthesizing filtering with the lifting scheme until the number of lines in the vertical direction are all gone.

The number of lines read out from the first buffer may be three lines, and the number of coefficients stored in the second buffer, three.

The first buffer may be configured having within itself independent buffers of as many lines as necessary for performing the vertical direction synthesizing filtering.

The second buffer may be configured having within itself independent buffers of as many coefficients necessary for performing the plurality of stages of computation.

The lifting scheme may be a scheme for performing horizontal direction synthesizing filtering in multiple stages of computation, with the horizontal filtering unit performing a preset number of columns worth of horizontal direction synthesizing filtering with the lifting scheme.

The horizontal filtering unit may further comprise a holding unit for holding a part of coefficients obtained in the process of the plurality of stages of computation with the lifting scheme, and generate the image by performing the plurality of stages of computation to the final stage, wherein, when performing horizontal direction synthesizing filtering for the next stage, only as many columns worth as necessary of the coefficients from vertical direction synthesizing filtering results from the vertical filtering unit are input, and further, coefficients held in the holding unit in the process of the plurality of stages of computation with the previous lifting scheme are read out, and the plurality of stages of computation with the lifting scheme are performed.

The horizontal filtering unit may perform horizontal direction synthesizing filtering with the lifting scheme until the number of columns in the horizontal direction are all gone.

The number of columns which can be input to the lifting scheme at once may be three columns, and the number of coefficients held in the holding unit, three.

The horizontal filtering unit may store, in the first buffer corresponding to the levels, highband component and lowband component coefficients generated by performing the plurality of stages of computation with the lifting scheme to the final stage.

The horizontal filtering unit may input the frequency components in increments of lines, and perform the horizontal direction lowband synthesizing filtering and highband synthesizing filtering each time the number of samples in the horizontal direction reaches a predetermined number, with the vertical filtering unit performing the vertical direction lowband synthesizing filtering and highband synthesizing filtering each time the number of lines in the vertical direction of the frequency component in the results of the horizontal direction synthesizing filtering performed by the horizontal filtering unit reach a predetermined number.

The image signals may be video signals comprising a plurality of pictures, divided into a plurality of frequency components by performing analysis filtering on the lowest frequency components in a hierarchical manner, with the vertical filtering unit and the horizontal filtering unit performing synthesizing filtering in a hierarchical manner from, of a plurality of frequency components, a predetermined number of frequency components including the lowest frequency components, ultimately generating a picture.

The wavelet inverse transformation device may further comprise a vertical synchronizing signal insertion unit for inserting vertical synchronizing signals between the pictures generated by the vertical filtering unit and the horizontal filtering unit.

According to an embodiment of the present invention, a wavelet inverse transformation method for performing wavelet inverse transformation at a plurality of levels as to frequency components, generated by wavelet transformation having been performed as to image signals, thereby reconstructing an image, comprises the steps of: storing a part of coefficients from the results of synthesizing filtering in the horizontal direction in first buffers independent for each of the levels except for the lowest band; storing a part of coefficients generated in the process of synthesizing filtering in the vertical direction in second buffers independent for each of the levels; performing the vertical direction synthesizing filtering, using coefficients read out from the first and second buffers; and taking coefficients from the results of the vertical direction synthesizing filtering as the input of the horizontal direction synthesizing filter for the next level, except for the final level of the levels.

According to an embodiment of the present invention, with a program for causing a computer to execute processing of wavelet inverse transformation at a plurality of levels as to frequency components, generated by wavelet transformation having been performed as to image signals, thereby reconstructing an image, the processing comprises the steps of: storing a part of coefficients from the results of synthesizing filtering in the horizontal direction in first buffers independent for each of the levels, except for the final level of the levels; storing a part of coefficients generated in the process of synthesizing filtering in the vertical direction in second buffers independent for each of the levels; performing vertical direction synthesizing filtering, using coefficients read out from the first and second buffers; and taking coefficients from the results of the vertical direction synthesizing filtering as the input of the horizontal direction synthesizing filter for the next level.

According to an embodiment of the present invention, a recording medium stores a program for causing a computer to execute processing of wavelet inverse transformation at a plurality of levels as to frequency components, generated by wavelet transformation having been performed as to image signals, thereby reconstructing an image, the processing comprising the steps of: storing a part of coefficients from the results of synthesizing filtering in the horizontal direction in first buffers independent for each of the levels; storing a part of coefficients generated in the process of synthesizing filtering in the vertical direction in second buffers independent for each of the levels; performing vertical direction synthesizing filtering, using coefficients read out from the first and second buffers; and taking coefficients from the results of the vertical direction synthesizing filtering as the input of the horizontal direction synthesizing filter for the next level, except for the final level of the levels.

According to the above-described arrangement, a part of coefficients from the results of synthesizing filtering are stored in the horizontal direction in first buffers independent for each of the levels, except for the final level of the levels, and a part of coefficients generated in the process of synthesizing filtering in the vertical direction are stored in second buffers independent for each of the levels. Vertical direction synthesizing filtering is performed, using coefficients read out from the first and second buffers, and coefficients from the results of the vertical direction synthesizing filtering are taken as the input of the horizontal direction synthesizing filter for the next level. Thus, only a small configuration is needed for memory for storing the coefficients. Consequently, high-speed wavelet transformation can be performed without requiring external memory.

BRIEF DESCRIPTION OF THE DRAWINGS

FIG. 29 is a schematic drawing illustrating an example of applying the wireless transmission system shown in FIG. 28 to a home gaming console; and FIG. 30 is a block diagram illustrating a configuration example of an embodiment a computer to which an embodiment of the present invention has been applied.

DESCRIPTION OF THE PREFERRED EMBODIMENTS

Before describing an embodiment of the present invention, the correspondence between the features of the claims and the specific elements disclosed in an embodiment of the present invention, with or without reference to drawings, is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

Figure 1:
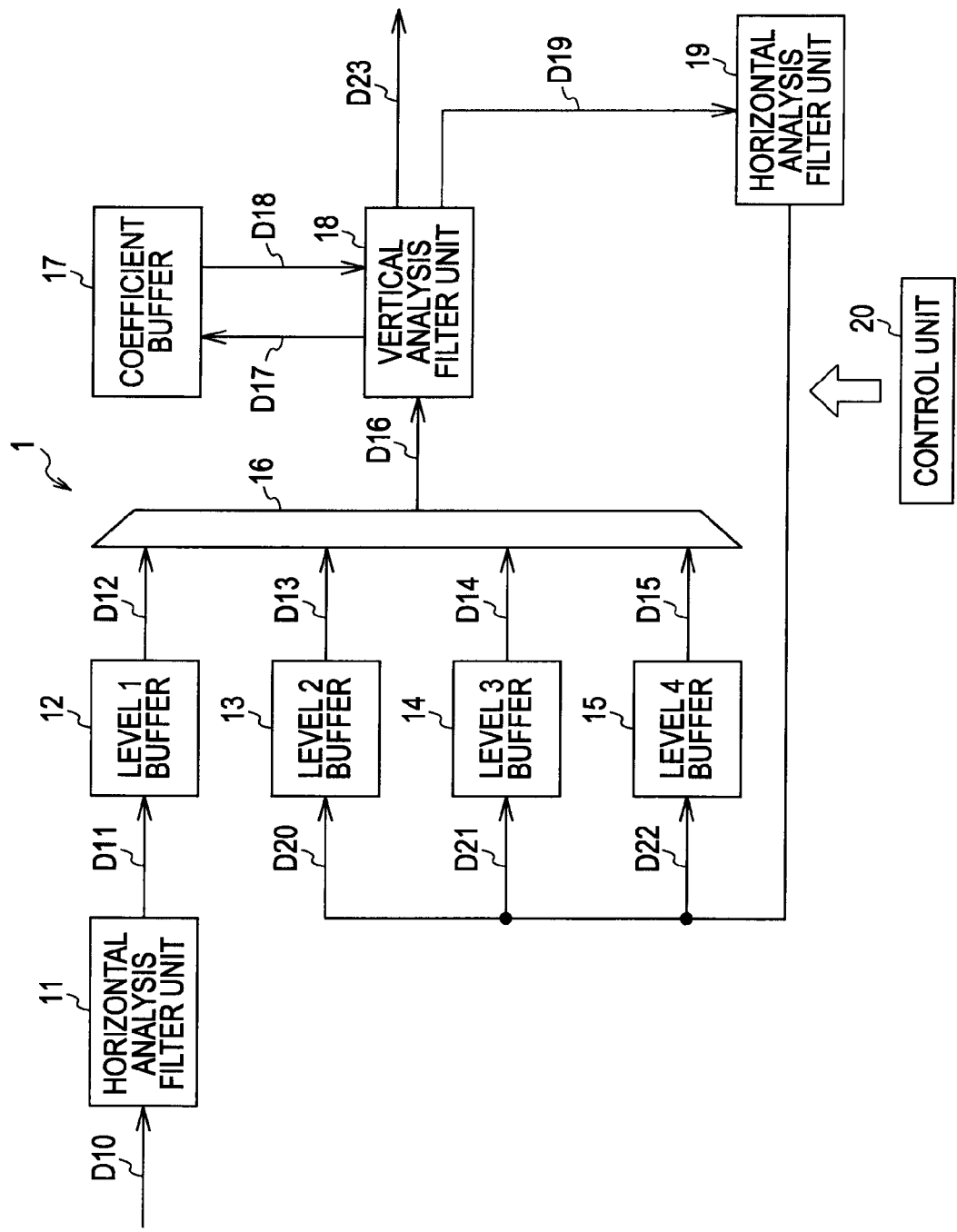
FIG. 1 is a diagram illustrating a configuration example of an embodiment of a wavelet transformation device to which an embodiment of the present invention has been applied.

A wavelet transformation device according to an embodiment of the present invention, is a wavelet transformation device (e.g., the wavelet transformation device 1 shown in FIG. 1) for performing wavelet transformation at a plurality of levels as to image signals, including: a first buffer (e.g., level 1 buffer 12 through level 4 buffer 15 shown in FIG. 1) for storing, independently for each of the levels, a part of coefficients from the results of analysis filtering in the horizontal direction of the image signals; a second buffer (e.g., coefficient buffer 17 shown in FIG. 1) for storing, independently for each of the levels, a part of coefficients generated in the computation process of analysis filtering in the vertical direction of the image signals; a vertical filtering unit (e.g., vertical analysis filter unit 18 shown in FIG. 1) for performing the vertical direction analysis filtering, using coefficients read out from the first and second buffers; and a horizontal filtering unit (e.g., horizontal analysis filter unit 11 or horizontal analysis filter unit 19 shown in FIG. 1) for performing analysis filtering in the horizontal direction, using coefficients from the results of the vertical direction analysis filtering as the input of the horizontal direction analysis filtering for the next level, except for the final level of the levels.

Figure 6:
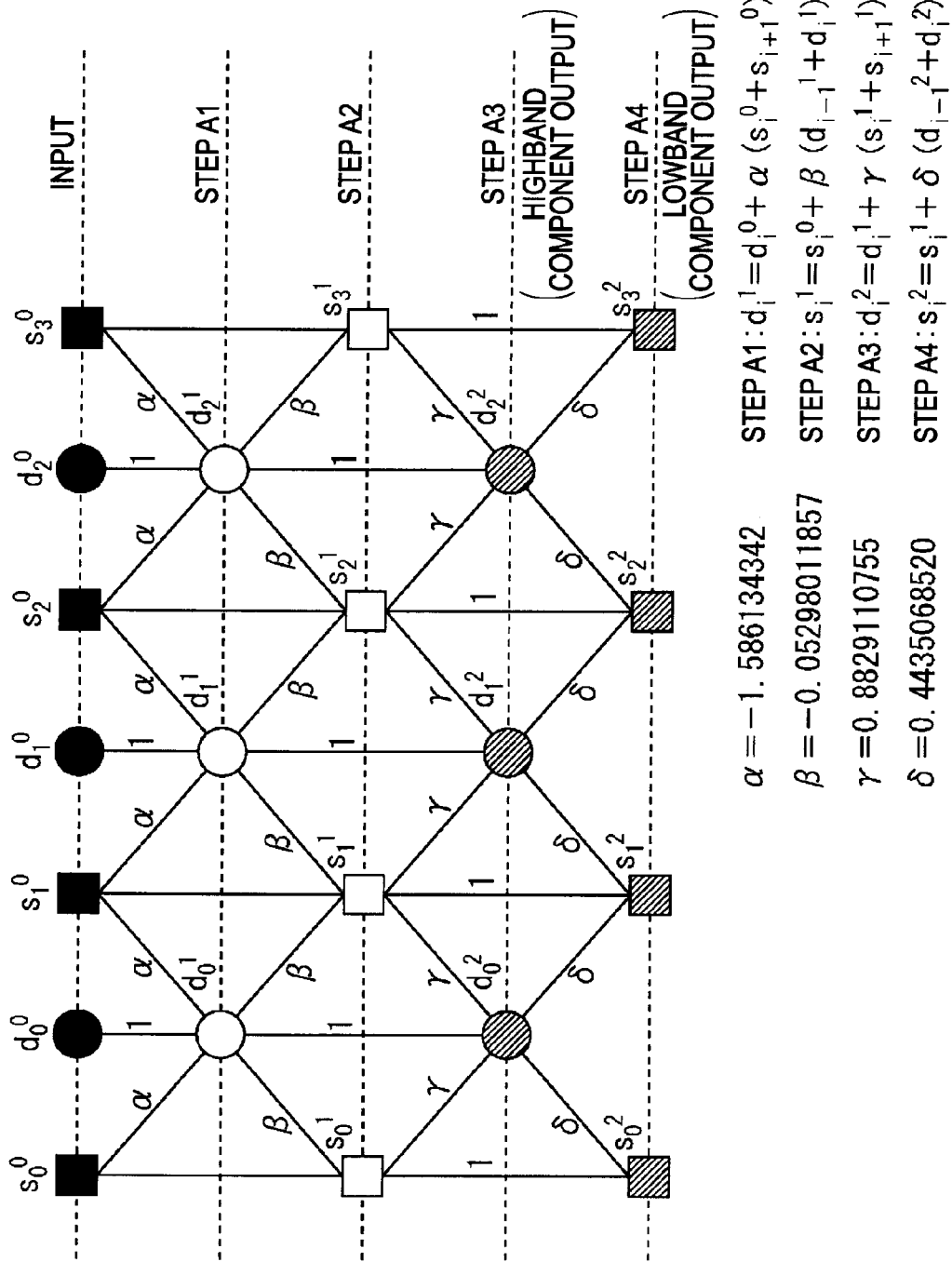
FIG. 6 is a diagram of r describing an example of a lifting scheme with a 9×7 analysis filter.

The horizontal filtering unit and the vertical filtering unit may be realized by a lifting scheme of the wavelet transformation (e.g., the lifting scheme shown in FIG. 6).

The lifting scheme (e.g., the lifting scheme shown in FIG. 7) may be a scheme wherein horizontal direction analysis filtering is performed divided into a plurality of stages of computations, with the horizontal filtering unit performing horizontal direction analysis filtering for a preset number of columns.

The horizontal filtering unit may further comprise a holding unit (e.g., a flip-flop) for holding a part of coefficients obtained in the process of the plurality of stages of computation with the lifting scheme, and generate coefficients of highband components and lowband components by performing the plurality of stages of computation to the final stage; wherein, in the event of performing horizontal direction analysis filtering for the next stage, only as many columns worth as necessary are input of the coefficients from vertical direction analysis filtering results from the vertical filtering unit, and further, coefficients held in the holding unit in the process of the plurality of stages of computation by the previous lifting scheme are read out, and the plurality of stages of computation with the lifting scheme are performed.

The lifting scheme (e.g., the lifting scheme shown in FIG. 9) may be a scheme for performing vertical direction analysis filtering in multiple stages of computation, with the vertical filtering unit performing a preset number of lines worth of vertical direction analysis filtering with the lifting scheme.

The first buffer (e.g., level 1 buffer 12 through level 4 buffer 15 shown in FIG. 10) may be configured having within itself independent buffers of as many lines as necessary for performing the vertical direction analysis filtering.

The second buffer (e.g., coefficient buffer 17 shown in FIG. 11) may be configured having within itself independent buffers of as many coefficients necessary for performing the plurality of stages of computation.

Figure 17:
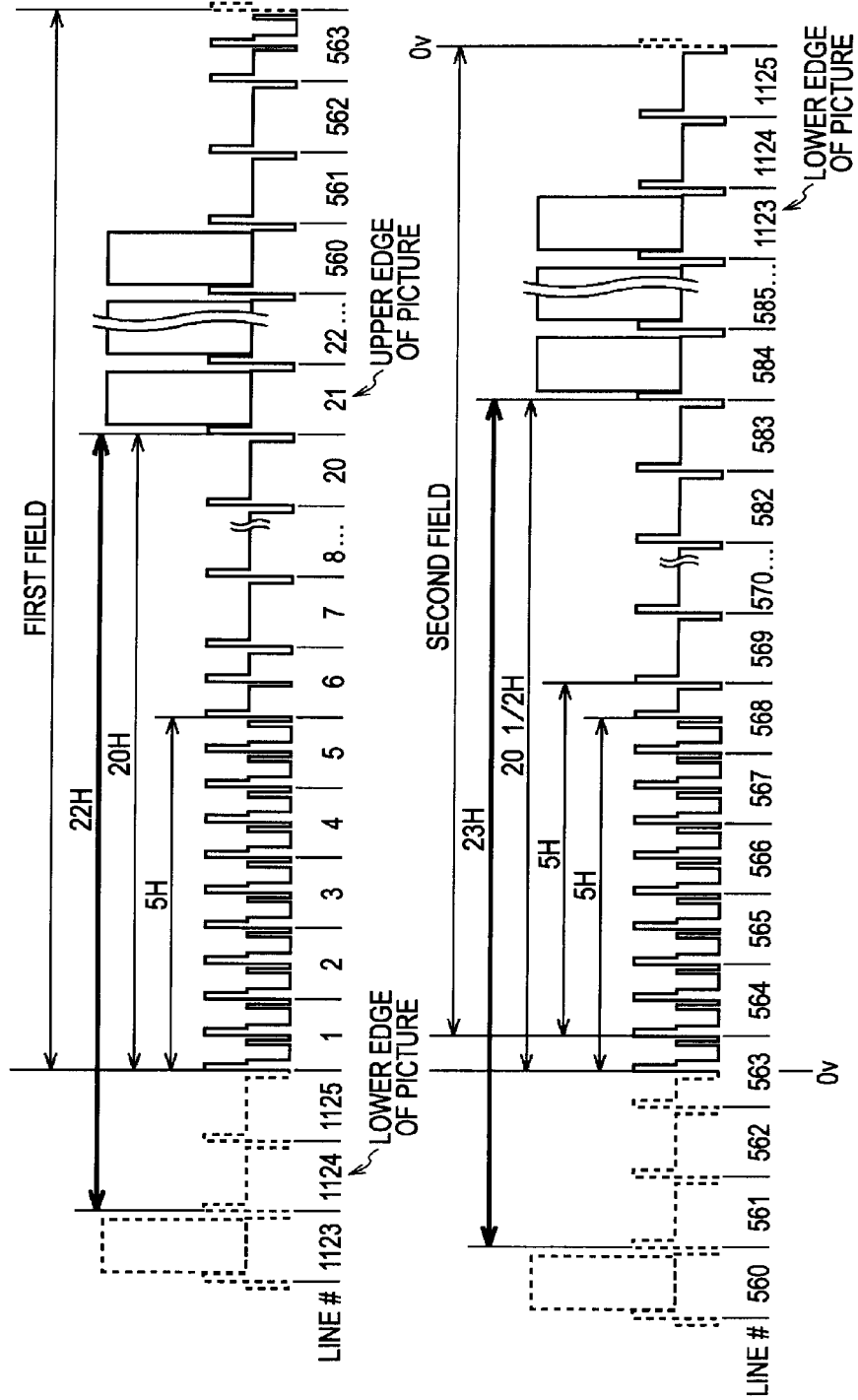
FIG. 17 is a diagram for describing vertical synchronizing signals in video signals.

The image signals may be video signals comprising a plurality of pictures, with the wavelet transformation device further comprising detecting unit (e.g., a vertical synchronizing signal detecting unit for detecting the vertical synchronizing signals shown in FIG. 17) for detecting the end of each picture by detecting vertical synchronization signals of the video signals, and the horizontal filtering unit and the vertical filtering unit performing analysis filtering for each picture.

Figure 2:
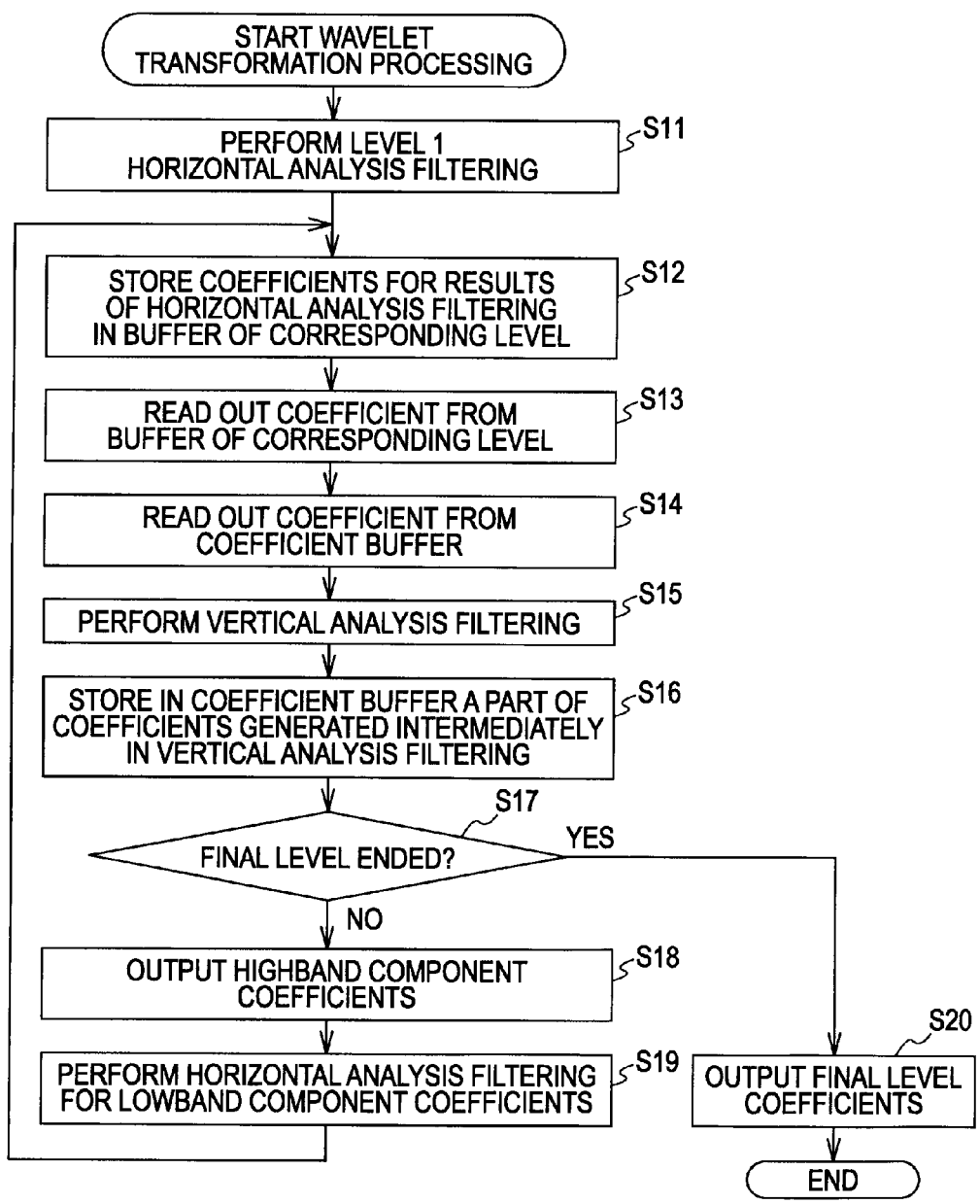
FIG. 2 is a flowchart for describing wavelet transformation processing with the wavelet transformation device shown in FIG. 1.

According to an embodiment of the present invention, a wavelet transformation method of a wavelet transformation device for performing wavelet transformation at a plurality of levels as to image signals, and a program, comprise the steps of: storing a part of coefficients from the results of analysis filtering in the horizontal direction in first buffers independent for each of the levels (e.g., step S12 in FIG. 2); storing a part of coefficients generated in the process of computation of analysis filtering in the vertical direction in second buffers independent for each of the levels (e.g., step S16 in FIG. 2); performing vertical direction analysis filtering, using coefficients read out from the first and second buffers (e.g., step S15 in FIG. 2); and taking coefficients from the results of the vertical direction analysis filtering as the input of the horizontal direction analysis filter for the next level, except for the final level of the levels (e.g., step S19 in FIG. 2).

A wavelet inverse transformation device according to an embodiment of the present invention is a wavelet inverse transformation device (e.g., wavelet inverse transformation device 51 shown in FIG. 18) for performing wavelet inverse transformation at a plurality of levels as to frequency components, generated by wavelet transformation having been performed as to image signals, thereby reconstructing an image, comprises: a first buffer (e.g., level 3 buffer 61 through level 1 buffer 63 shown in FIG. 18) for storing, independently for each of the levels except for the lowest band, a part of coefficients from the results of synthesizing filtering in the horizontal direction of the frequency components; a second buffer (e.g., coefficient buffer 66 shown in FIG. 18) for storing, independently for each of the levels, a part of coefficients generated in the computation process of synthesizing filtering in the vertical direction as to the frequency components; a vertical filtering unit (e.g., vertical synthesizing filter unit 65 shown in FIG. 18) for performing the vertical direction synthesizing filtering, using coefficients read out from the first and second buffers; and a horizontal filtering unit (e.g., horizontal synthesizing filter unit 67 shown in FIG. 18) for performing synthesizing filtering in the horizontal direction, using coefficients from the results of the vertical direction synthesizing filtering as the input of the horizontal direction synthesizing filtering for the next level, except for the final level of the levels.

The vertical filtering unit and the horizontal filtering unit may be realized by a lifting scheme (e.g., the lifting scheme shown in FIG. 20) of the wavelet inverse transformation.

The lifting scheme (e.g., the lifting scheme shown in FIG. 21) may be a scheme wherein vertical direction synthesizing filtering is performed divided into a plurality of stages of computations, with the vertical filtering unit performing vertical direction synthesizing filtering for a preset number of lines.

The lifting scheme (e.g., the lifting scheme shown in FIG. 22) may be a scheme for performing horizontal direction synthesizing filtering in multiple stages of computation, with the horizontal filtering unit performing a preset number of columns worth of horizontal direction synthesizing filtering with the lifting scheme.

The horizontal filtering unit may further comprise a holding unit (e.g., a flip-flop) for holding a part of coefficients obtained in the process of the plurality of stages of computation with the lifting scheme, and generate the image by performing the plurality of stages of computation to the final stage, wherein, when performing horizontal direction synthesizing filtering for the next stage, only as many columns worth as necessary of the coefficients from vertical direction synthesizing filtering results from the vertical filtering unit are input, and further, coefficients held in the holding unit in the process of the plurality of stages of computation with the previous lifting scheme are read out, and the plurality of stages of computation with the lifting scheme are performed.

The wavelet inverse transformation device may further comprise a vertical synchronizing signal insertion unit (e.g., a vertical synchronizing signal insertion unit for inserting the vertical synchronizing signals shown in FIG. 17) for inserting vertical synchronizing signals between the pictures generated by the vertical filtering unit and the horizontal filtering unit.

Figure 19:
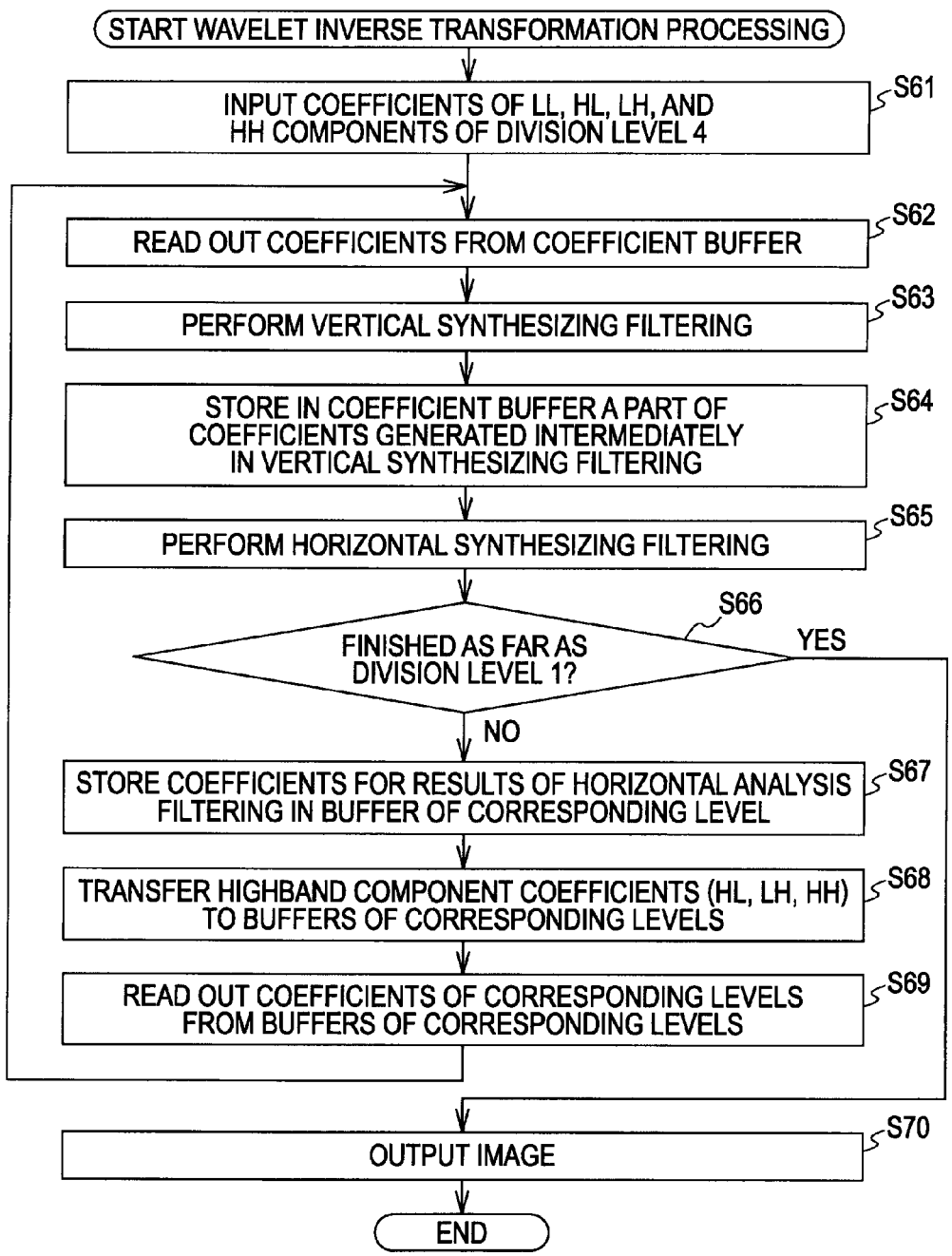
FIG. 19 is a flowchart for describing wavelet inverse transformation processing of the wavelet inverse transformation device shown in FIG. 18.

According to an embodiment of the present invention, a wavelet inverse transformation method for performing wavelet inverse transformation at a plurality of levels as to frequency components, generated by wavelet transformation having been performed as to image signals, thereby reconstructing an image, and a program comprise the steps of: storing a part of coefficients from the results of synthesizing filtering in the horizontal direction in first buffers independent for each of the levels except for the lowest band (e.g., step S67 in FIG. 19); storing a part of coefficients generated in the computation process of synthesizing filtering in the vertical direction in second buffers independent for each of the levels (e.g., step S64 in FIG. 19); performing the vertical direction synthesizing filtering, using coefficients read out from the first and second buffers (e.g., step S63 in FIG. 19); and taking coefficients from the results of the vertical direction synthesizing filtering as the input of the horizontal direction synthesizing filter for the next level, except for the final level of the levels (e.g., step S65 in FIG. 19).

An embodiment of the present invention will now be described with reference to the drawings.

FIG. 1 is a diagram illustrating a configuration example of an embodiment of a wavelet transformation device to which an embodiment of the present invention has been applied. The wavelet transformation device 1 is a band analysis device which takes image data as input, and performs horizontal direction filtering and vertical direction filtering, in which lowband components are hierarchically divided to a predetermined division level (in the example shown in FIG. 1, to division level 4).

The wavelet transformation device 1 shown in FIG. 1 is configured of a horizontal analysis filter unit 11, level 1 buffer 12, level 2 buffer 13, level 3 buffer 14, level 4 buffer 15, selector 16, coefficient buffer 17, vertical analysis filter unit 18, horizontal analysis filter unit 19, and control unit 20.

An image signal D10 is input to the horizontal analysis filter unit 11. The horizontal analysis filter unit 11 subjects the image signal D10 to lowband analysis filtering and highband analysis filtering in the horizontal direction of the division level 1, and generates frequency components coefficients made up of lowband component coefficients and highband component coefficients obtained as the result of the horizontal analysis filtering (hereafter also referred to as lowband component, highband component and frequency components, as appropriate).

Now, the horizontal analysis filter unit 11 performs lowband analysis filtering and highband analysis filtering in the horizontal direction, while reading out the data of pixels at adjacent positions on a baseband rendered at an unshown internal memory (or register).

The level 1 buffer 12 stores and holds the results of the division level 1 horizontal analysis filtering. That is to say, the level 1 buffer 12 stores and holds the coefficients D11 of the frequency components (lowband components and highband components) as results of the division level 1 horizontal analysis filtering obtained by the horizontal analysis filter unit 11. Once data (coefficients) for a predetermined number of vertical lines enabling vertical direction analysis filtering has been accumulated in the level 1 buffer 12, the predetermined number of vertical lines worth of coefficients D12 are read out via the selector 16.

The level 2 buffer 13 stores and holds the results of the division level 2 horizontal analysis filtering. That is to say, the level 2 buffer 13 stores and holds the coefficients D20 of the frequency components (lowband components and highband components) as results of the division level 2 horizontal analysis filtering obtained by the horizontal analysis filter unit 19. Once data (coefficients) for a predetermined number of vertical lines enabling vertical direction analysis filtering has been accumulated in the level 2 buffer 13, the predetermined number of vertical lines worth of coefficients D13 are read out via the selector 16.

The level 3 buffer 14 stores and holds the results of the division level 3 horizontal analysis filtering. That is to say, the level 3 buffer 14 stores and holds the coefficients D21 of the frequency components (lowband components and highband components) as results of the division level 3 horizontal analysis filtering obtained by the horizontal analysis filter unit 19. Once data (coefficients) for a predetermined number of vertical lines enabling vertical direction analysis filtering has been accumulated in the level 3 buffer 14, the predetermined number of vertical lines worth of coefficients D14 are read out via the selector 16.

The level 4 buffer 15 stores and holds the results of the division level 4 horizontal analysis filtering. That is to say, the level 4 buffer 15 stores and holds the coefficients D22 of the frequency components (lowband components and highband components) as results of the division level 4 horizontal analysis filtering obtained by the horizontal analysis filter unit 19. Once data (coefficients) for a predetermined number of vertical lines enabling vertical direction analysis filtering has been accumulated in the level 4 buffer 15, the predetermined number of vertical lines worth of coefficients D15 are read out via the selector 16.

Under control of the vertical analysis filter unit 18, the selector 16 selects from the level 1 buffer 12 through level 4 buffer 14, the output of the corresponding division level buffer, and outputs the selected output to the vertical analysis filter unit 18 as coefficients D16.

The coefficient buffer 17 stores and holds part of the coefficients generated intermediately during the vertical analysis filtering. That is to say, of the coefficients generated intermediately during the vertical analysis filtering performed by the vertical analysis filter unit 18, the coefficient buffer 17 stores and holds coefficients necessary for the next vertical analysis filtering processing, as coefficients for intermediate computation. These are read out by the vertical analysis filter unit 18 at the time of the next vertical analysis filtering.

Upon the predetermined number of vertical lines worth of coefficients D16 being input, the vertical analysis filter unit 18 reads out the coefficients for intermediate computation D18 from the coefficient buffer 17 (i.e., the coefficients necessary for the current vertical analysis filtering), and performs the vertical analysis filtering using the coefficients D16 and coefficients D18. The vertical analysis filter unit 18 then outputs, of the frequency components of the vertical analysis filtering results, only the lowband component coefficients D19 which are lowband in both the horizontal direction and vertical direction to the horizontal analysis filter unit 19, and outputs other highband components D23 outside of the wavelet transformation device 1 (not shown in FIG. 1, hereafter referred to simply as "external").

The horizontal analysis filter unit 19 has basically the same configuration as that of the horizontal analysis filter unit 11, except that the division level of the frequency components to be processed differs. That is to say, with the horizontal analysis filter unit 19, the coefficients D19 at an adjacent position on the baseband rendered at unshown internal memory (or register) are read out with horizontal direction lowband analysis filtering and highband analysis filtering being performed on the coefficients D19.

The horizontal analysis filter unit 19 then stores and holds any one of the frequency components (lowband components and highband components) D20 through D22 which are results of the horizontal analysis filtering, in the corresponding level buffer (one of the level 2 buffer 13 through level 4 buffer 15).

The control unit 20 is configured of a microcomputer or the like including, for example, a CPU (Central Processing Unit), ROM (Read Only Memory), and RAM (Random Access Memory), and controls the processing of the units of the wavelet transformation device 1 by executing various types of programs.

Note that the detailed configuration of level 1 buffer 12 through level 4 buffer 15 will be described later with reference to FIG. 10. Also, the detailed configuration of the coefficients buffer 17 will be described later with reference to FIG. 11.

Next, the operations of the wavelet transformation device 1 shown in FIG. 1 will be described with reference to the flowchart in FIG. 2. That is to say, FIG. 2 illustrates the wavelet transformation processing executed by the wavelet transformation device 1.

Image signals D10 are input to the horizontal analysis filter unit 11 externally (e.g., from a later-described video camera unit 303 shown in FIG. 27). In step S12, the horizontal analysis filter unit 11 performs division level 1 horizontal analysis filtering on the image signals D10.

Figure 3:
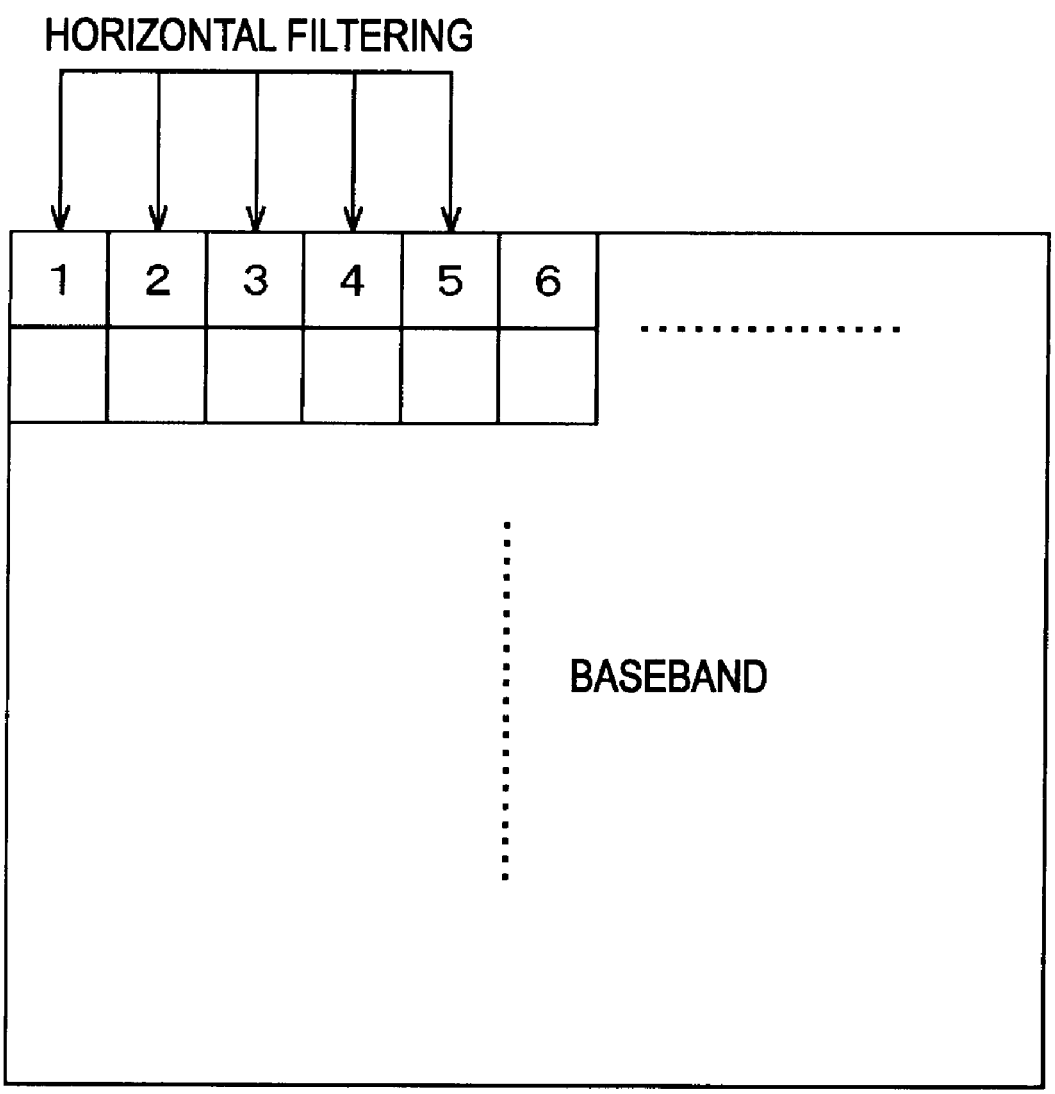
FIG. 3 is a diagram for describing an example of horizontal analysis filtering of image signals.

That is to say, the horizontal analysis filter unit 11 has unshown internal memory (or a register), and the pixels of the input image signals are rendered in the internal memory in the order of numbers shown in FIG. 3. Note that with the example in FIG. 3, a baseband image obtained as the result of pixels, indicated by squares, being rendered in order.

The horizontal analysis filter unit 11 reads out data of a predetermined number of pixels at adjacent positions on the baseband rendered in the internal memory (in the case in FIG. 3, this number is five columns (samples)), while shifting the position, with horizontal direction lowband analysis filtering and highband analysis filtering being performed in order.

The horizontal direction data is readily rendered to memory addresses. Accordingly, horizontal analysis filtering is executed in order at the horizontal analysis filter unit 11 while reading out data form the memory. Note that details of the horizontal direction lowband analysis filtering and highband analysis filtering will be described later with reference to FIG. 7.

In step S12, the horizontal analysis filter unit 11 stores the coefficients D11 of the frequency components obtained as a result of the division level 1 horizontal analysis filtering to the corresponding level buffer (in this case, the level 1 buffer 12).

Figure 4:
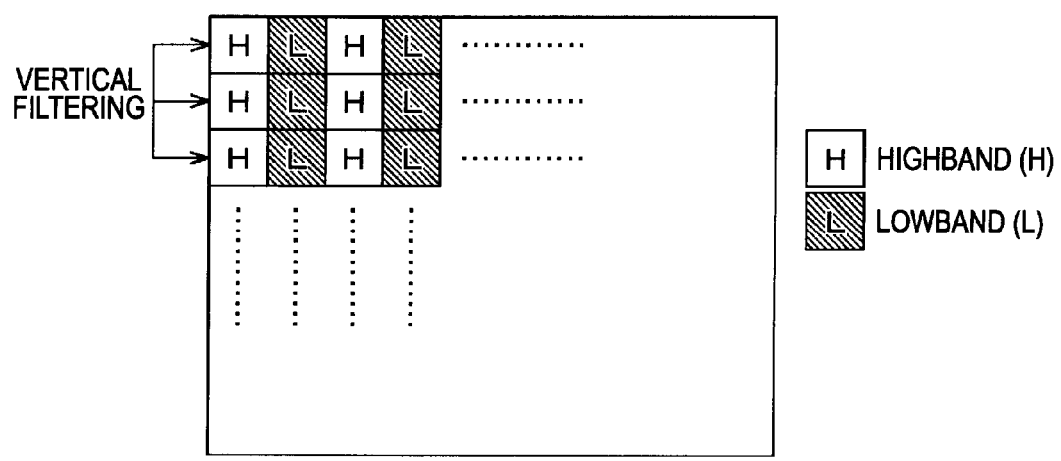
FIG. 4 is a diagram for describing an example of vertical analysis filtering.

At this time, the horizontal analysis filter unit 11 interleaves the highband components (H) and lowband components (L) which are the results of the horizontal analysis filtering, and stores in the level 1 buffer 12, as shown in FIG. 4.

With known arrangements, the results of the horizontal analysis filtering were divided into the highband components and lowband components, and thus stored in the buffer. However, mapping the highband components and lowband components to different addresses in the buffer as with the known arrangements requires a separate controller for distribution thereof.

Conversely, with the example shown in FIG. 4 according to the present embodiment, the highband components (H) and lowband components (L) are alternately stored in the level 1 buffer 12. That is to say, the highband components (H) and lowband components (L) which are the results of the horizontal analysis filtering are stored in the level 1 buffer 12 in an interleaved manner by the horizontal analysis filter unit 11, so at the time of reading out the coefficients stored in the level 1 buffer 12, all that is to necessary is to read out from the front of the level 1 buffer 12, thereby simplifying control.

Now, returning to FIG. 2, upon coefficients of the frequency components obtained as a result of the horizontal analysis filtering being accumulated in the level 1 buffer 12 shown in FIG. 4 for a predetermined number of vertical lines (three lines in the case shown in FIG. 4) whereby vertical analysis filtering can be performed, for example, in step S13 the vertical analysis filter unit 18 reads out the coefficients of the frequency components of the necessary number of vertical lines from the level 1 buffer 12, by controlling the selector 16 so as to select the output of the level 1 buffer 12. The frequency component coefficients read out are input to the vertical analysis filter unit 18 as coefficients D16, via the selector 16.

In step S14, the vertical analysis filter unit 18 reads out the coefficients D18 for intermediate calculation that have been stored in the coefficients buffer 17 in the process for obtaining the frequency components one step back, and in step S15 uses the three lines worth of frequency component coefficients D16 and intermediate calculation coefficients D18 to perform vertical analysis filtering of the corresponding division level (in the current case, the division level 1). Details of the vertical direction lowband analysis filtering and highband analysis filtering will be described later with reference to FIG. 9.

In step S15, the vertical analysis filter unit 18 stores a part of the coefficients generated intermediately during division level 1 vertical analysis filtering (in the computation process of vertical analysis filtering), i.e., coefficients necessary for the next vertical analysis filtering, in the coefficient buffer 17 as coefficients D17 for intermediate calculation.

Figure 5:
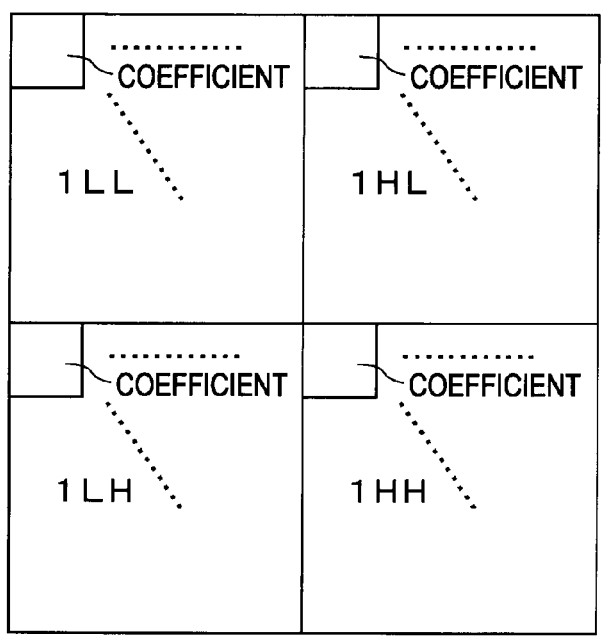
FIG. 5 is a diagram illustrating he results of performing analysis filtering to division level 1.

As a result of the division level 1 vertical analysis filtering (i.e., the results of division level 1 analysis filtering), coefficients of four frequency components are generated, made up of the lowband component (1LL) coefficient and highband component (1HH, 1LH, 1HL) coefficients, as shown in FIG. 5. Note that in the example shown in FIG. 5, the squares each represent one coefficient, the order of "L" and "H" indicate the bandwidth (lowband or highband) as the result of performing horizontal analysis filtering previously, and the bandwidth (lowband or highband) as the result of performing vertical analysis filtering, in that order. Further, the numeral in front of the "L" or "H" indicates the division level.

This is the division level 1 analysis filtering, whereby lowband components (1LL) D19 and highband components (1HH, 1LH, 1HL) D23 are generated at the vertical analysis filter unit 18 as a result. Of these, only the lowband components (1LL) are analyzed again to the set division level (final level), but the highband components are not analyzed any further. That is to say, the lowband components are further divided to the final level, so the final level can also be said to be the lowest band level outputting the lowest band.

In step S17, the vertical analysis filter unit 18 determines whether or not the analysis filtering has been computed to the final level of the set division levels (in the case shown in FIG. 1, division level 4). In the case of division level 1, the flow has not reached the final level yet, so the processing proceeds to step S18.

In step S18, the vertical analysis filter unit 18 outputs the highband components (1HH, 1LH, 1HL) D23 externally (e.g., to the quantizing unit 112 described later, shown in FIG. 23).

In the other hand, the lowband components (1LL) D19 are output to the horizontal analysis filter unit 19. In step S19, the horizontal analysis filter unit 19 performs horizontal analysis filtering (horizontal direction lowband analysis filtering and highband analysis filtering) of the corresponding division level (in this case, division level 2) on the lowband components D19 rendered to the internal memory, and generates lowband components and highband components which are the results of the horizontal analysis filtering. Note that the processing in step S19 is basically the same as the processing in the above-described step S13, with the only difference being the division level of the frequency components to be processed.

Following step S19, the flow returns to step S12, and the subsequent processing is repeated. That is to say, in step S12, the horizontal analysis filter unit 19 stores and holds the coefficients D20 of the frequency components (lowband and highband components) obtained as the result of horizontal analysis filtering, in the buffer of the corresponding level (in this case, level 2 buffer 13).

Upon coefficients of the frequency components obtained as a result of the horizontal analysis filtering being accumulated in the level 2 buffer 13 for a predetermined number of vertical lines whereby vertical analysis filtering can be performed, in step S13 the coefficients D16 of the frequency components of the necessary number of vertical lines are read out from the level 2 buffer 13, and are input to the vertical analysis filter unit 18, via the selector 16. In step S14, intermediate calculation coefficients D18 are read out form the coefficient buffer 17, and in step S15, division level 2 vertical analysis filtering is performed using coefficients D16 of a predetermined number of vertical lines and the intermediate calculation coefficients D18.

In step S16, a part of intermediate coefficients D17 of the division level 2 vertical analysis filtering are stored in the coefficient buffer 17, as a result of the division level 2 vertical analysis filtering, coefficients of four frequency components are generated, made up of the lowband component (2LL) coefficient and highband component (2HH, 2LH, 2HL) coefficients. In step S17, determination is made that the flow has not reached the final level yet, so in step S18 the highband components (2HH, 2LH, 2HL) D23 are externally output.

In step S19, horizontal analysis filtering of the corresponding division level is performed on the lowband components (2LL) D19, lowband components and highband components D21 which are the results of the horizontal analysis filtering are generated, the flow returns to step S12 again, the generated lowband components and highband components D21 are stored and saved in the level 3 buffer 14, and the subsequent processing is repeated until the final level of the preset division levels.

The above-described series of processing is performed in the same manner up to storing of the intermediate coefficients of the vertical analysis filtering at the final level (division level 4) of the preset division levels. Subsequently, in step S17, determination is made that the final level has finished, and the flow proceeds to step S20.

In step S20, the vertical analysis filter unit 18 externally outputs the final level frequency components (4LL, 4HL, 4LH, 4HH) D23. Thus, the division level 4 image signal wavelet transformation ends.

As described above, the wavelet transformation device 1 shown in FIG. 1 has buffers for each division level from level 1 to a predetermined number of levels, and stores the horizontal analysis filtering results in buffers of each division level while performing the horizontal analysis filtering. Accordingly, vertical direction filtering can be performed while reading out the results of the horizontal analysis filtering from the buffer of each division level. That is to say, horizontal direction and vertical direction analysis filtering can be performed simultaneously in parallel.

Thus, wavelet transformation can be performed at high speed for moving images and images with high resolution, as well.

Also, with the wavelet transformation device 1 shown in FIG. 1, a coefficient buffer is provided along with the buffers for each division level from level 1 to a predetermined number of levels, and coefficients necessary for the next processing are held when performing vertical direction analysis filtering, and the coefficients are read out at the time of the next vertical analysis filtering, so there is no need to configure external memory as with the arrangement described in Japanese Unexamined Patent Application Publication No. 10-283342.

Accordingly, there is no need to exchange data with external memory, and wavelet transformation can be performed at high speeds. Consequently, there is no need to raise the clock frequency in order to increase speed of data between the external memory and the wavelet transformation device, thereby conserving electric power.

Next, the computation method in the above-described analysis filtering will be described in detail. The most common computation method in analysis filtering computation methods is a method called convolution computation. This convolution computation the most basic way to realize digital filters, with convolution multiplication being performed on actual input data on filter tap coefficients. However, with convolution computation, if the tap length is great, there cases wherein the calculation load increases accordingly.

Wavelet transformation lifting, introduced in the paper "W. Swelden, 'The lifting scheme: A custom-design construction of biorthogonal wavelets', Appl. Comput. Harmon. Anal., Vol 3, No. 2, pp. 186-200, 1996", is a known technique for handling this.

FIG. 6 illustrates a lifting scheme of a 9×7 analysis filter used with the JPEG (Joint Photographic Experts Group) 2000 standard as well. Analysis lifting in a case of applying the lifting technique to this 9×7 analysis filter will be described.

In the example shown in FIG. 6, the first tier (highest tier) illustrates a sample group of an input image (pixel row), and the second and third tiers indicate components (coefficients) generated at a step A1 and step A2, respectively. Also, the fourth tier indicates highband component output generated at the processing in step A3, and the fifth tier indicates lowband component output generated at the processing in step A4. The top tier is not restricted to a sample group of an input image, and may be coefficients obtained from previous analysis filtering. Note that here, top tier is a sample group of an input image, with the solid squares representing even samples or lines, and the solid circles representing odd samples or lines.

With the analysis filtering applying the lifting technique to the 9×7 analysis filter, highband components are obtained by the processing in step A3, and lowband components are obtained by the processing in step A4. The processing of step A1 through step A4 can be represented by the following expressions.

$$\text{Step A1: } d_i^1 = d_i^0 + \alpha(s_i^0 + s_{i+1}^0) \quad (1)$$

$$\text{Step A2: } s_i^1 = s_i^0 + \beta(d_{i-1}^1 + d_i^1) \quad (2)$$

$$\text{Step A3: } d_i^2 = d_i^1 + \gamma(s_i^1 + s_{i+1}^1) \quad (3)$$

$$\text{Step A4: } s_i^s = s_i^1 + \delta(d_{i-1}^2 + s_i^2) \quad (4)$$

wherein $\alpha = -1.586134342$, $\beta = -0.05298011857$, $\gamma = 0.8829110755$, and $\delta = 0.4435068520$ Thus, with the analysis filtering applying the lifting technique, the processing of step A1 and step A2 is performed, highband component coefficients are generated at step A3, following which lowband component coefficients are generated at step A4. The filter bank used at this time can be realized with addition and shift computations alone, as can be seen from Expressions (1) through (4). Accordingly, the amount of calculations can be markedly reduced. Thus, this lifting technique will be applied to the horizontal analysis filtering and the vertical analysis filtering with the wavelet transformation device 1 as well, as described next.

Figure 7:
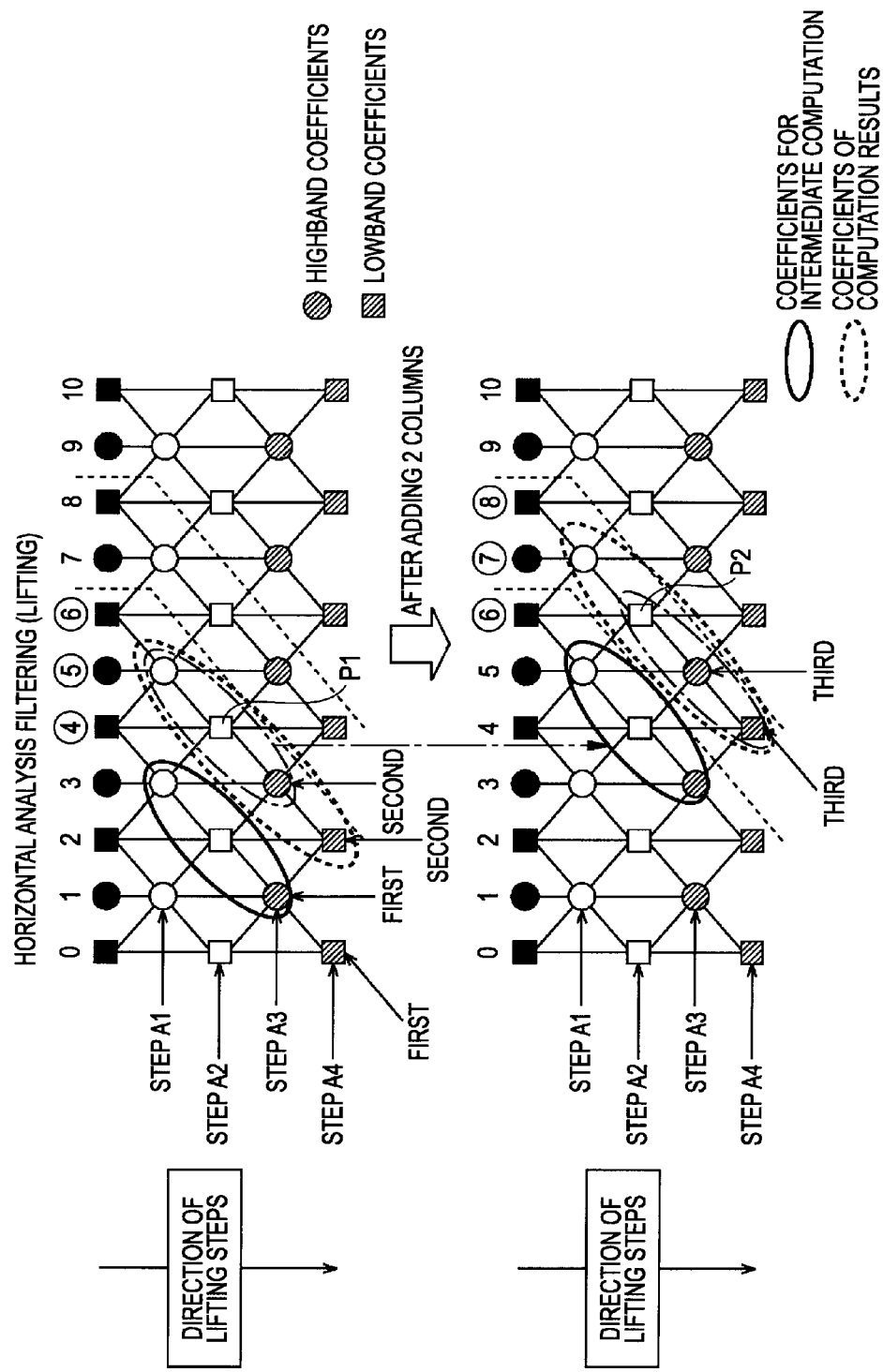
FIG. 7 is a diagram for describing a case of executing horizontal analysis filtering as to a coefficient group in the horizontal direction, with the lifting scheme shown in FIG. 6.

First, the horizontal analysis filtering performed by the horizontal analysis filter units 11 and 19 will be described in detail. FIG. 7 illustrates an example of performing horizontal analysis filtering as to a coefficients group in the horizontal direction as described above with reference to FIG. 2, with the lifting scheme shown in FIG. 6.

The example shown in FIG. 7 shows an example of the horizontal direction coefficients that are input being subjected to the processing of the four steps (Steps A1 through A4) described above with FIG. 6 whereby the highband component coefficients (hereafter also referred to as "highband coefficients") and the lowband component coefficients (hereafter also referred to as "lowband coefficients") are generated, with the direction of lifting steps proceeding downwards from the top in the drawing. Also, the numbers shown above the coefficients in the horizontal direction are column Nos.

Further, the circles and squares at the first tier at the top represent the input highband coefficients and lowband coefficients, respectively, and the circles and squares at the subsequent tiers represent the highband coefficients and lowband coefficients generated in the process of lifting computation, respectively. Particularly, the hatched circles and squares represent the highband coefficients and lowband coefficients which are the results of the lifting computation, respectively.

The following is a description of operations in order from the top. The top tier in FIG. 7 illustrates a case wherein three columns of coefficients, column Nos. 4 through 6 in the horizontal direction, are input, and computation with a lifting scheme in the horizontal direction (hereafter referred to as "horizontal lifting computation") is performed.

In order to obtain the first highband coefficient in step A3 of the horizontal lifting computation and obtain the first lowband coefficient in step A4, there is the need to input the coefficients of the four columns of Nos. 0 through 3.

Subsequently, in order to obtain the second highband coefficients and lowband coefficients, there is the need for the three coefficients indicated by the heavy solid lines and the coefficients of the two columns of Nos. 5 and 6 indicated by circled numbers, and further, in order to calculate the coefficient indicated by P1 at step A2, the coefficient of the column No. 4 indicated by a circled number is also necessary.

The three coefficients indicated by the heavy solid lines are a part of the coefficients generated in the process of the horizontal lifting computation for obtaining the first highband coefficient and lowband coefficient (hereafter also referred to as "first horizontal lifting computation").

That is to say, in order to obtain the second highband coefficient and lowband coefficient, there is ultimately the need to input the coefficients of the three columns of Nos. 4 through 6, and further, latch the three coefficients indicated by the heavy solid lines that are generated in the process of the first horizontal lifting computation as intermediate calculation coefficients. Actually, with this being no more than three coefficients, a flip-flop which is often used as a latch can be built into the horizontal analysis filter unit 11 and the horizontal analysis filter unit 19.

Accordingly, performing horizontal lifting computation using the three coefficients indicated by the heavy solid line that have been latched at the first horizontal lifting computation, and the coefficients of the three columns of Nos. 4 through 6 that have been input, generates four coefficients (indicated by the heavy dotted line) including the second highband coefficient and lowband coefficient at the point that the computation process thereof ends. Of these, the three coefficients indicated by the single-dot broken line are coefficients necessary for obtaining the third highband coefficient and lowband coefficient, and accordingly are latched at a built-in flip-flop as intermediate calculation coefficients.

An example of a case wherein, following input of the coefficient of column No. 6, two columns in the horizontal direction are to be additionally input, i.e., the coefficients of the three columns of Nos. 6 through 8 in the horizontal direction are input and horizontal lifting computation is performed, is shown at the lower half of FIG. 7.

In the same way as with the second case, in order to obtain the third highband coefficient and lowband coefficient, there is the need for the three coefficients indicated by the heavy solid lines and the coefficients of the two columns of Nos. 7 and 8 indicated by circled numbers, and further, in order to calculate the coefficient indicated by P2 at step A2, the coefficient of the column No. 6 indicated by a circled number is also necessary.

Note that the three coefficients indicated by the heavy solid line at the lower half have been latched at a flip-flop in the second horizontal lifting computation, as indicated by the single-dot broken line at the upper half of the diagram.

Accordingly, performing horizontal lifting computation using the three coefficients indicated by the heavy solid line that have been latched at the second horizontal lifting computation, and the coefficients of the three columns of Nos. 6 through 8 that have been input, generates four coefficients (indicated by the heavy dotted line) including the third highband coefficient and lowband coefficient. Of these, the three coefficients indicated by the single-dot broken line are coefficients necessary for obtaining the fourth highband coefficient and lowband coefficient, and accordingly are latched at a built-in flip-flop.

Thus, the horizontal lifting computation is performed to the far right column of the screen while sequentially inputting three columns worth of coefficients and holding the three intermediate computation coefficients, thereby completing horizontal direction analysis filtering.

Note that while the above has been description of an example of one line worth of horizontal analysis filtering using a lifting scheme, operations of using the above operations to perform horizontal analysis filtering by the lifting scheme while sequentially inputting lines of coefficients from the top toward the bottom, will be described with reference to FIG. 8. Coefficients corresponding to those in FIGS. 6 and 7 are indicated in the same way in FIG. 8, and description thereof would be redundant and accordingly will be omitted.

Figure 8:
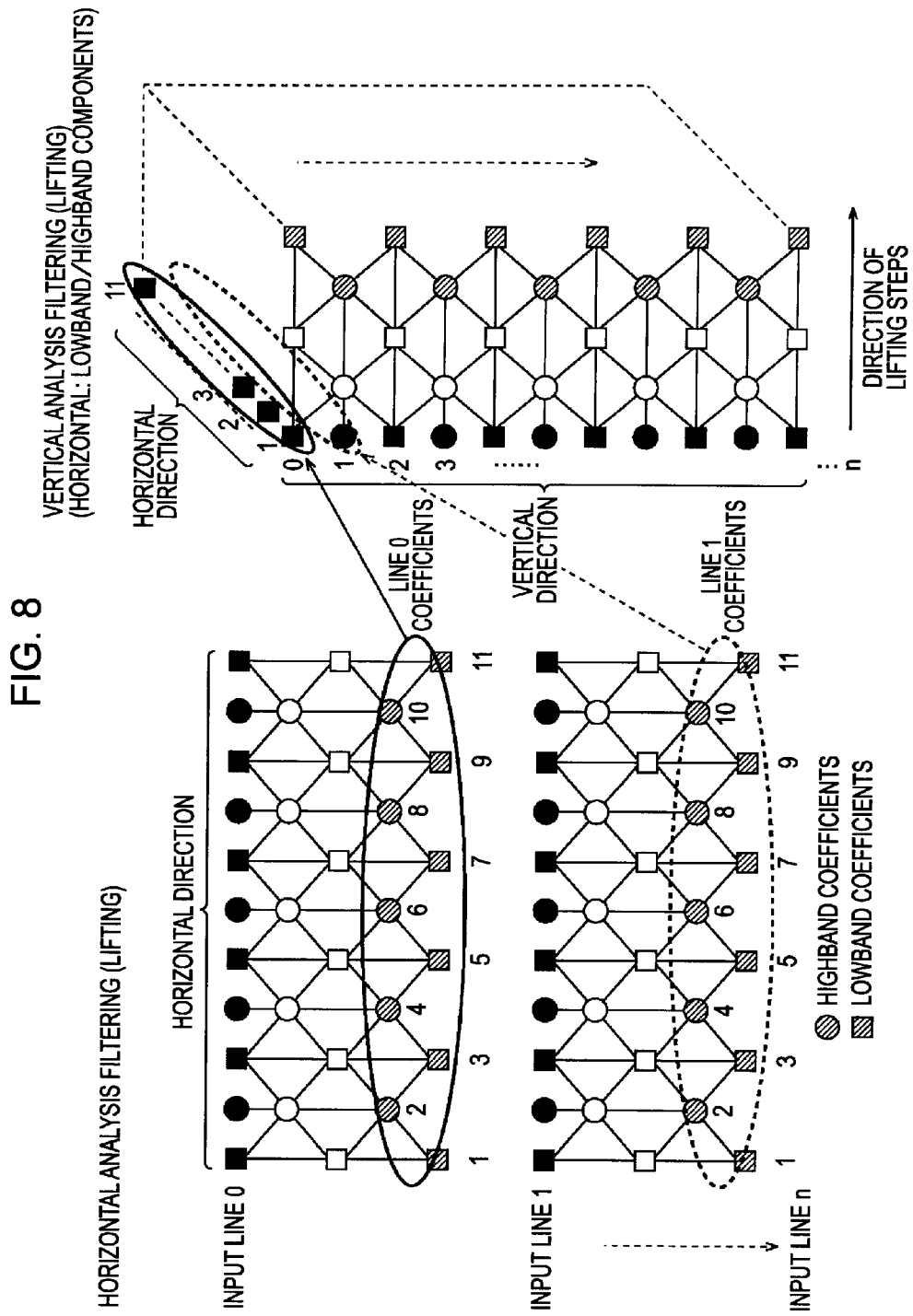
FIG. 8 is a diagram for describing the operation of performing horizontal analysis filtering with the lifting scheme, sequentially inputting lines of coefficients from the top downwards.

FIG. 8 schematically shows at the left side thereof, an example of horizontal lifting computation being performed on each input line, and at the right side thereof, an example of vertical lifting computation being performed as to the coefficients obtained as the results of the horizontal lifting computation of each input line, sequentially rendered in the vertical direction from top to bottom.

Describing the diagram in order, the coefficients at the first input line 0 are subjects to horizontal lifting computation of four steps, whereby lowband coefficients and highband coefficients, indicated by Nos. 1 through 11, are generated. Of these, the coefficients to which the odd numbers (1, 3, 5, 7, 9, 11) are assigned are lowband coefficients, and the coefficients to which the even numbers (2, 4, 6, 8, 10) are assigned are highband coefficients.

Though only the input line 1 is illustrated, this holds true for input line 1 through input line n. That is to say, the coefficients at the first input line 1 are subjected to horizontal lifting computation of four steps, whereby lowband coefficients and highband coefficients, indicated by Nos. 1 through 11, are generated, and of these, the coefficients to which the odd numbers (1, 3, 5, 7, 9, 11) are assigned are lowband coefficients, and the coefficients to which the even numbers (2, 4, 6, 8, 10) are assigned are highband coefficients.

As shown to the right in FIG. 8, the coefficients to which 1 through 11, as the results of the horizontal filtering of the input line 0 are assigned, are rendered in the first tier from the top, from the near side to the far side in the horizontal direction. The coefficients to which 1 through 11, as the results of the horizontal filtering of the input line 1 are assigned, are rendered in the second tier from the top, from the near side to the far side in the horizontal direction. The coefficients to which 1 through 11, as the results of the horizontal filtering of the input line 2 are assigned, are rendered in the third tier from the top, from the near side to the far side in the horizontal direction.

As described above, the coefficients obtained as the results of the horizontal filtering of the input line 0 through input line n are rendered sequentially in the vertical direction from top to bottom, as shown to the right side of FIG. 8. Note that in reality, the coefficients to which 1 through 11, as the results of the horizontal filtering of the input lines are assigned, have the lowband and highband alternately arrayed from the near side to the far side.

As soon as a predetermined number of vertical direction coefficients have been accumulated, i.e., as soon as a predetermined number of lines are accumulated, computation with a lifting scheme in the vertical direction (i.e., vertical lifting computation) is performed from the left to the right, as in indicated by the direction of lifting steps at the right side of FIG. 8.

Figure 9:
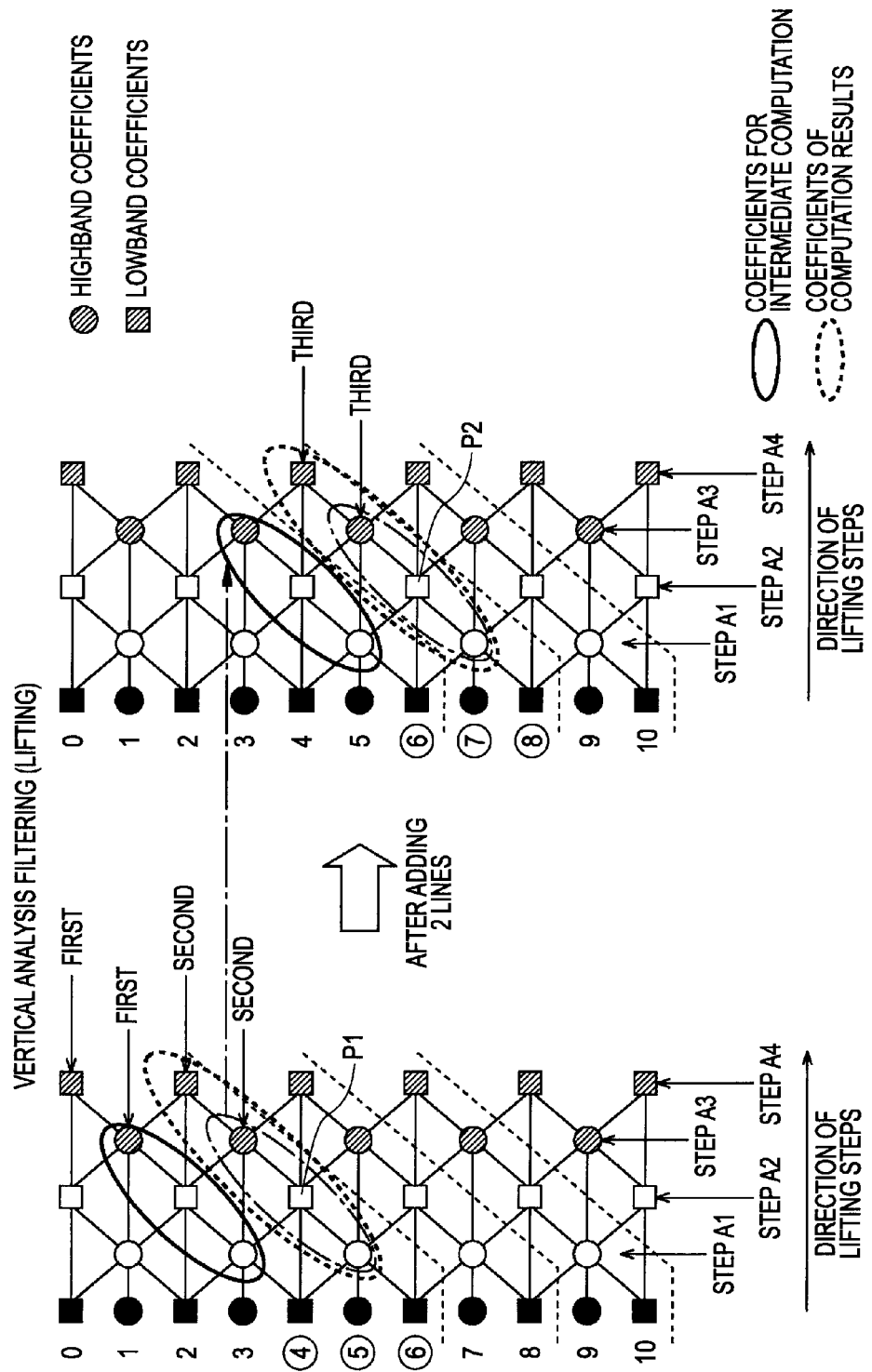
FIG. 9 is a diagram for describing a case of executing the lifting scheme shown in FIG. 6 with vertical analysis filtering as to a coefficient group in the vertical direction.

Next, the vertical analysis filtering executed by the vertical analysis filter unit 18 will be described in detail. FIG. 9 illustrates a case of arraying coefficients obtained by horizontal analysis filtering in the vertical direction as described with reference in FIG. 3, and executing vertical analysis filtering with the lifting scheme shown in FIG. 6.

Note that this diagram only takes note of one of the coefficients rendered and arrayed in the horizontal direction as conceptually shown to the right side of FIG. 8, and it is clearly evident that in actual two-dimensional wavelet transformation the vertical direction analysis filtering calculation needs to be performed as many times as the number of frequency component (sub-band) horizontal direction coefficients, generated in the processes of wavelet transformation.

The example shown in FIG. 9 illustrates an example wherein the coefficients in the vertical direction are subjected to the four steps (step A1 through step A4) described above with FIG. 6, whereby lowband coefficients and highband coefficients are generated, with the direction of lifting steps proceeding form the left to the right in the drawing. Also, the numbers shown to the left of the coefficients in the vertical direction indicate the line Nos.

Further, the circles and squares at the first column from the left indicate the input highband coefficients and lowband coefficients respectively, the circles and squares at the second column and subsequent columns indicate the highband coefficients and lowband coefficients respectively generated in the process of lifting computation, and particularly, the hatched circles and squares indicate the highband coefficients and lowband coefficients generated as the results of lifting computation, respectively.

The operations will now be described in order from left to right. The left side of FIG. 9 illustrates an example wherein the coefficients of the three lines of line Nos. 4 through 6 are input in the vertical direction, and vertical lifting computation is performed.

In order to obtain the first highband coefficient in step A3 of the vertical lifting computation, and obtain the first lowband coefficient in step A4, the coefficients of the four lines, line Nos. 0 through 3, are necessary.

Subsequently, in order to obtain the second highband coefficients and lowband coefficients, there is the need for the three coefficients indicated by the heavy solid lines and the coefficients of the two lines of Nos. 5 and 6 indicated by circled numbers, and further, in order to calculate the coefficient indicated by PI at step A2, the coefficient of the line No. 4 indicated by a circled number is also necessary The three coefficients indicated by the heavy solid lines are a part of the coefficients generated in the process of the vertical lifting computation for obtaining the first highband coefficient and lowband coefficient (hereafter also referred to as "first vertical lifting computation").

That is to say, in order to obtain the second highband coefficient and lowband coefficient, there is ultimately the need to input the coefficients of the three lines of Nos. 4 through 6, and further, store the three coefficients indicated by the heavy solid lines that are generated in the process of the first vertical lifting computation as intermediate calculation coefficients, in the coefficient buffer 17 shown in FIG. 1. At this time, the coefficients of the three lines in the vertical direction are read out for each level, from a buffer of the corresponding level, shown in FIG. 1. That is to say, in the event that the current wavelet transformation division level is 2, the coefficients are read out from the level 2 buffer 13.

Accordingly, performing horizontal lifting computation using the three coefficients indicated by the heavy solid line that have been stored in the coefficient buffer 17 at the first vertical lifting computation, and the coefficients of the three lines of Nos. 4 through 6 that have been input, obtains four coefficients (indicated by the heavy dotted line) including the second highband coefficient and lowband coefficient at the point that the computation process thereof ends. Of these, the three coefficients indicated by the single-dot broken line are coefficients necessary for obtaining the third highband coefficient and lowband coefficient, and accordingly are stored in the coefficient buffer 17.

An example of a case wherein, following input of the coefficient of line No. 6, two lines in the vertical direction are to be additionally read out, i.e., the coefficients of the three lines of Nos. 6 through 8 in the horizontal direction are input and horizontal lifting computation is performed, is shown at the right in FIG. 9.

In the same way as with the second case, in order to obtain the third highband coefficient and lowband coefficient, there is the need for the three coefficients indicated by the heavy solid lines and the coefficients of the two lines of Nos. 7 and 8 indicated by circled numbers, and further, in order to calculate the coefficient indicated by P2 at step A2, the coefficient of the line No. 6 indicated by a circled number is also necessary.

Note that the three coefficients indicated by the heavy solid line at the lower half have been latched at the coefficient buffer 17 in the second vertical lifting computation, as indicated by the single-dot broken line at the left of the diagram.

Accordingly, performing vertical lifting computation using the three coefficients indicated by the heavy solid line that have been stored at the second horizontal lifting computation, and the coefficients of the three lines of Nos. 6 through 8 that have been read out from corresponding level buffers and input, obtains four coefficients (indicated by the heavy dotted line) including the third highband coefficient and lowband coefficient. Of these, the three coefficients indicated by the single-dot broken line are coefficients necessary for obtaining the fourth highband coefficient and lowband coefficient, and accordingly are stored in the coefficient buffer 17.

Thus, the vertical lifting computation is performed to the bottom line of the screen while sequentially inputting three lines worth of coefficients and holding the three intermediate computation coefficients, thereby completing vertical direction analysis filtering.

Figure 10:
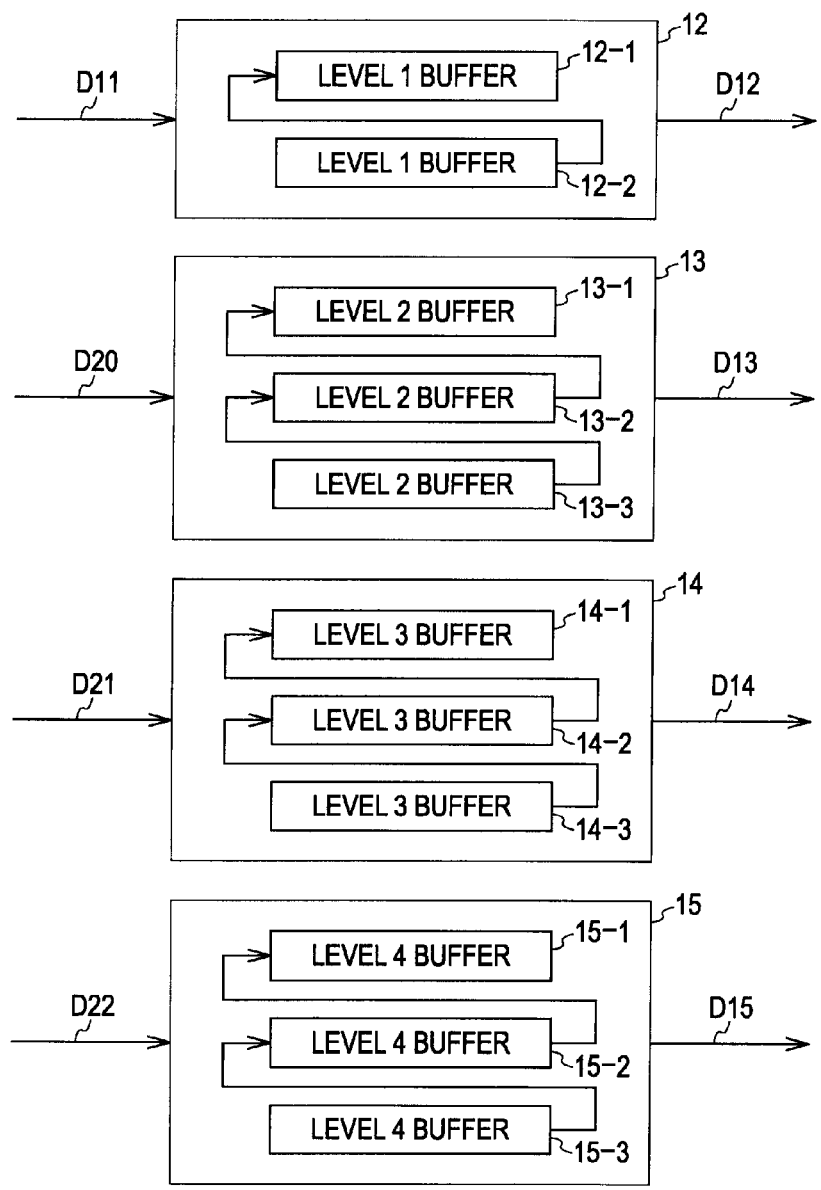
FIG. 10 is a block diagram illustrating a configuration example of level 1 buffers through level 4 buffers shown in FIG. 1.

FIG. 10 illustrates a configuration example of level 1 buffer 12 through level 4 buffer 15 shown in FIG. 1, where the coefficients from the horizontal analysis filtering results are stored.

The level 1 buffer 12 is configured from a level 1 buffer 12-1 and level 1 buffer 12-2 where one line worth of coefficients read out from the vertical analysis filter unit 18 are stored.

That is to say, the level 1 buffer 12-2 stores one line worth of coefficients from the horizontal analysis filter unit 11, and at the time of the next one line being input, transfers the one line worth of coefficients which had been stored therein to the level 1 buffer 12-1. The level 1 buffer 12 stores the one line worth of coefficients transferred from the level 1 buffer 12-2. Note that with the level 1 buffer 12-1, the one line worth of coefficients that had been stored therein are overwritten at the time of the next one line worth being input.

The level 2 buffer 13 is configured from a level 2 buffer 13-1 and level 2 buffer 13-2 where one line worth of coefficients input from the horizontal analysis filter unit 19 and read out from the vertical analysis filter unit 18 are stored.

That is to say, the level 2 buffer 13-3 stores one line worth of coefficients read out from the horizontal analysis filter unit 19, and at the time of the next one line being input, transfers the one line worth of coefficients which had been stored therein to the level 2 buffer 13-2. The level 2 buffer 13-2 stores one line worth of coefficients read out from the 2 buffer 13-3, and at the time of the next one line being input, transfers the one line worth of coefficients which had been stored therein to the level 2 buffer 13-1. The level 2 buffer 13-1 stores the one line worth of coefficients transferred from the level 2 buffer 13-2. Note that with the level 2 buffer 13-1, the one line worth of coefficients that had been stored therein are overwritten at the time of the next one line worth being input.

The level 3 buffer 14 is configured from a level 3 buffer 14-1 and level 3 buffer 14-3 where one line worth of coefficients input from the horizontal analysis filter unit 19 and read out from the vertical analysis filter unit 18 are stored.

That is to say, the level 3 buffer 14-3 stores one line worth of coefficients from the horizontal analysis filter unit 19, and at the time of the next one line being input, transfers the one line worth of coefficients which had been stored therein to the level 3 buffer 14-2. The level 3 buffer 14-2 stores one line worth of coefficients read out from the 3 buffer 14-3, and at the time of the next one line being input, transfers the one line worth of coefficients which had been stored therein to the level 3 buffer 14-1. The level 3 buffer 14-1 stores the one line worth of coefficients transferred from the level 3 buffer 14-2. Note that with the level 3 buffer 14-1, the one line worth of coefficients that had been stored therein are overwritten at the time of the next one line worth being input.

The level 4 buffer 15 is configured from a level 4 buffer 15-1 through level 4 buffer 15-3 where one line worth of coefficients input from the horizontal analysis filter unit 19 and read out from the vertical analysis filter unit 18 are stored.

That is to say, the level 4 buffer 15-3 stores one line worth of coefficients read out from the horizontal analysis filter unit 19, and at the time of the next one line being input, transfers the one line worth of coefficients which had been stored therein to the level 4 buffer 15-2. The level 4 buffer 15-2 stores one line worth of coefficients read out from the horizontal analysis filter unit 11, and at the time of the next one line being input, transfers the one line worth of coefficients which had been stored therein to the level 4 buffer 15-1. The level 4 buffer 15 stores the one line worth of coefficients transferred from the level 4 buffer 15-2. Note that with the level 4 buffer 15-1, the one line worth of coefficients that had been stored therein are overwritten at the time of the next one line worth being input.

These buffer configurations will be described in detail. As described above with reference to FIG. 9, a lifting scheme of a 9×7 wavelet transformation filter is used for the vertical analysis filtering, so buffers capable of storing three lines worth of coefficients (e.g., level 2 buffer 13-1 through level 2 buffer 13-3) are necessary as the buffers of corresponding dividing levels.

It should be noted, however, that the level 1 buffer 12 can assume a configuration wherein the first line is not accumulated in the buffer but rather the results of horizontal direction analysis filtering are immediately output to the vertical analysis filter unit 18, so the level 1 buffer 12-1 and level 1 buffer 12-2, for two lines worth, are sufficient.

Also, in order to obtain the coefficients at P1 and P2 in FIG. 9 for example, the coefficients used in all lines are necessary for vertical lifting computation at the next vertical lifting computation. Accordingly, as described above, within the buffers at the corresponding levels, the coefficients stored in a buffer for one line worth of coefficients are consecutively transferred to the buffer for the coefficients of the adjacent line.

As described above, it is sufficient to store coefficients for three lines worth (coefficients for two lines worth for the level 1 buffer 12) for buffers of each level. Accordingly, the storage capacity necessary for buffers of each level, can be calculated as follows, for a case wherein the resolution of the input image is 1920×1080 (also known as "full-spec HDTV") for example. Note that in the following, N represents the bit precision of coefficients (e.g., 16).

(1) Case of Level 1 buffer 12

Storage capacity necessary for level 1 buffer 12-1=1920×$N$ bits

Storage capacity necessary for level 1 buffer 12-2=1920×$N$ bits (2) Case of Level 2 buffer 13

Storage capacity necessary for level 2 buffer 13-1=960×$N$ bits

Storage capacity necessary for level 2 buffer 13-2=960×$N$ bits

Storage capacity necessary for level 2 buffer 13-3=960×$N$ bits (3) Case of Level 3 buffer 14

Storage capacity necessary for level 3 buffer 14-1=480×$N$ bits

Storage capacity necessary for level 3 buffer 14-2=480×$N$ bits

Storage capacity necessary for level 3 buffer 14-3=480×$N$ bits (4) Case of Level 4 buffer 15

Storage capacity necessary for level 4 buffer 15-1=240×$N$ bits

Storage capacity necessary for level 4 buffer 15-2=240×$N$ bits

Storage capacity necessary for level 4 buffer 15-3=240×$N$ bits

Now, calculating with N=16 and the bit precision of the original image as 12 bits yields:

Data amount of original image=1920×1080×12 bits=24,883,200 bits

Above data capacity total=(1920×2+960×3+480×3+240×3)×16 bits=142,080 bits

Accordingly, 142,080/24,883,200=0.0057, which is approximately 1/175.

As can be seen from the above, buffers with a memory capacity vastly smaller (1/175) than the data size of the original image can suffice for the buffers of each level, so the level 1 buffer 12 through level 4 buffer 15 can be configured as internal memory of the wavelet transformation device 1 without using external memory.

Figure 11:
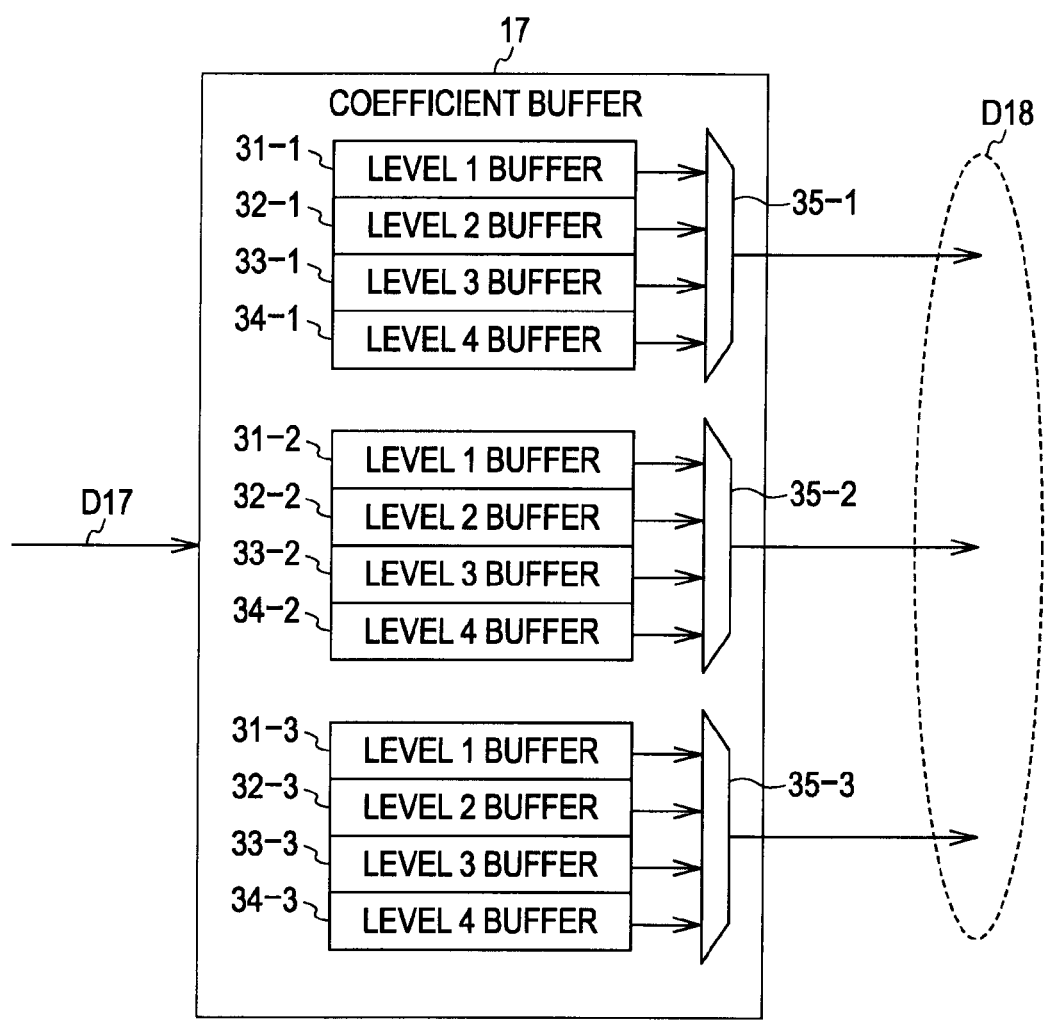
FIG. 11 is a block diagram illustrating a configuration example of a coefficient buffer shown in FIG. 1.

FIG. 11 illustrates a configuration example of the coefficient buffer 17 shown in FIG. 1, where a part of the coefficients generated in the process of vertical analysis filtering is stored.

The coefficient buffer 17 is configured of level 1 buffers 31-1 through 31-3, level 2 buffers 32-1 through 32-3, level 3 buffers 33-1 through 33-3, level 4 buffers 34-1 through 34-3, and selectors 35-1 through 35-3, and as describe earlier with reference to FIG. 9, three intermediate computation coefficients generated in the process of the vertical lifting processing (i.e., the three coefficients necessary for the next vertical lifting processing) are stored therein.

The level 1 buffers 31-1 through 31-3 store the respective three coefficients generated in the process of the level 1 vertical lifting computation. The level 2 buffers 32-1 through 32-3 store the respective three coefficients generated in the process of the level 2 vertical lifting computation. The level 3 buffers 33-1 through 33-3 store the respective three coefficients generated in the process of the level 3 vertical lifting computation. The level 4 buffers 34-1 through 34-3 store the respective coefficients generated in the process of the level 4 vertical lifting computation.

The selector 35-1 selects, under the control of the vertical analysis filter unit 18, the buffer of the corresponding division level, from the level 1 buffer 31-1, the level 2 buffer 32-1, the level 3 buffer 33-1, and the level 4 buffer 34-1, and reads out the coefficient of the corresponding division level from the selected buffer.

The selector 35-2 selects, under the control of the vertical analysis filter unit 18, the buffer of the corresponding division level, from the level 1 buffer 31-2, the level 2 buffer 32-2, the level 3 buffer 33-2, and the level 4 buffer 34-2, and reads out the coefficient of the corresponding division level from the selected buffer.

The selector 35-3 selects, under the control of the vertical analysis filter unit 18, the buffer of the corresponding division level, from the level 1 buffer 31-3, the level 2 buffer 32-3, the level 3 buffer 33-3, and the level 4 buffer 34-3, and reads out the coefficient of the corresponding division level from the selected buffer.

The three coefficients from the selectors 35-1 through 35-3 are input to the vertical analysis filter unit 18 as coefficients D18.

Note that at the upper half in FIG. 9, the three coefficients indicated by the single-dot broken line stored in the second vertical lifting computation are not identical coefficients with the three coefficients indicated by the single-dot broken line stored in the third vertical lifting computation at the lower half in FIG. 9. Accordingly, there is no need to transfer coefficients as with the buffers of each level in FIG. 10, and the buffers making up the coefficient buffer 17 are such that new coefficients are simply overwritten on the past coefficients.

As described above, there is no need to store any more than the three coefficients for each level in the coefficient buffer 17, and accordingly the coefficient buffer 17 can be configured with relatively small memory. Note that as described above, buffers of each level can be configured with relatively small memory capacity. Accordingly, the level 1 buffer 12 through level 4 buffer 15, and the coefficient buffer 17, can be configured as internal memory of the wavelet transformation device 1, without using external memory.

Accordingly, there is no need to configure memory externally, so there is no need for data exchange with external memory, and wavelet transformation can be performed at high speed. Consequently, there is no need to raise the clock frequency in order to increase speed of data between the external memory and the wavelet transformation device, thereby conserving electric power.

Now, while the above description has been made regarding the configuration and operations of the wavelet transformation device 1 shown in FIG. 1 using common image signals; next, a case will be described wherein video signals, which are moving images, are input to the wavelet transformation device 1.

Video signals are normally stipulated by standards, and television broadcast signals which are generally used in Japan, the USA, and several other countries, are NTSC (National Television Standards Committee) signals. Also, HDTV signals are standardized under a standard known as SMPTE274M, by a USA standardization entity, SMPTE (The Society of Motion Picture and Television Engineers). Description will be made here regarding HDTV signals (resolution of 1920×1080).

Figure 12:
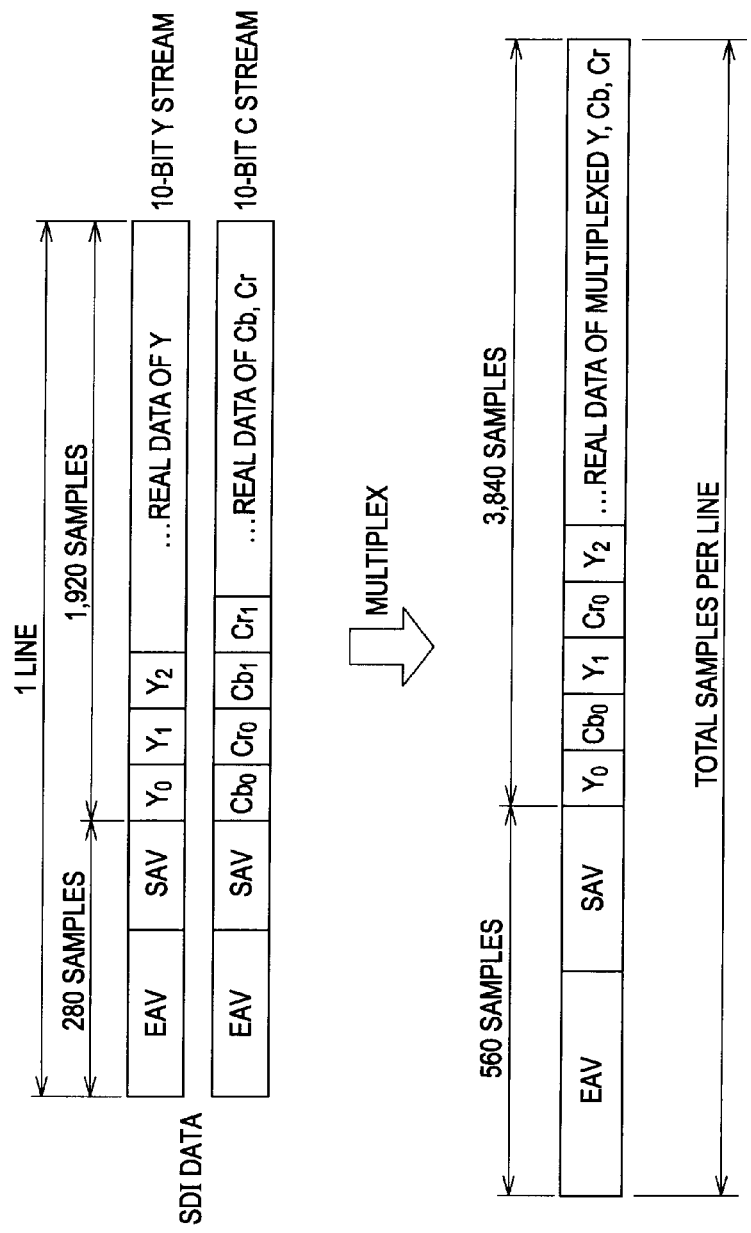
FIG. 12 is a diagram illustrating an example of a data array of brightness and color difference signals with the HDTV standard.

FIG. 12 illustrates the components of HDTV video signal data. Of the video signals, the number of real sample data of brightness component Y is 1920 samples per line, with sample data of EAV (End of Active Video), SAV (Start of Active Video) being positioned before the Y real sample data. These are made up of a total of 280 samples. This configuration is also the same for color difference components Cb and Cr, but the format is 4:2:2 with the number of real sample data of Cb and Cr each being half of Y, so the total of Cb and Cr is the same as Y.

Multiplexing the Y and CB, Cr generates data of a total of 560 samples for EAV and SAV, and a total of 3840 samples for Y, Cb, and Cr. Accordingly, in the event of inputting HDTV SMPTE274M standard (normally called "HD-SDI (High Definition Serial Data Interface) standard") video signals to the wavelet transformation device 1, the image signals D10 in the example shown in FIG. 1 are multiplexed sample data. Description will be made below assuming this situation.

In the event that video signals are input as image signals to the wavelet transformation device 1, the video signals are input as 60 fields being input per second, or each picture being input at 1/60 seconds, so the wavelet transformation described earlier with reference to FIG. 2 must be completed in this short time. That is to say, wavelet transformation must be completed at high speed.

One way of dealing with this is to input video signals (image signals D10) at the horizontal analysis filter unit 11, and at the point that the number of columns in the horizontal direction (number of samples) reach the predetermined number, to immediately perform horizontal direction lowband analysis filtering and highband analysis filtering.

For example, the horizontal analysis filter unit 11 stands by until M columns worth of image signals D10 are input and rendered to the unshown built-in memory. The value of M corresponds to the number of taps for horizontal analysis filtering, and the greater the number of taps is, the greater the value of M is, accordingly.

The horizontal analysis filter unit 11 immediately performs horizontal analysis filtering at the point that M columns worth of image signals are accumulated in the built-in memory. That is to say, the horizontal analysis filter unit 11 sequentially reads out the M columns worth (e.g., M=3 in the case of FIG. 3) from the built-in memory, and performs horizontal direction lowband analysis filtering and highband analysis filtering. The lowband components and highband components which are the results of the horizontal analysis filtering are interleaved, and stored in the level 1 buffer 12. The lowband components and highband components which are stored in the level 1 buffer 12 are read out and input to the vertical analysis filter unit 18 at the point that the number of lines reaches N lines.

Figure 13:
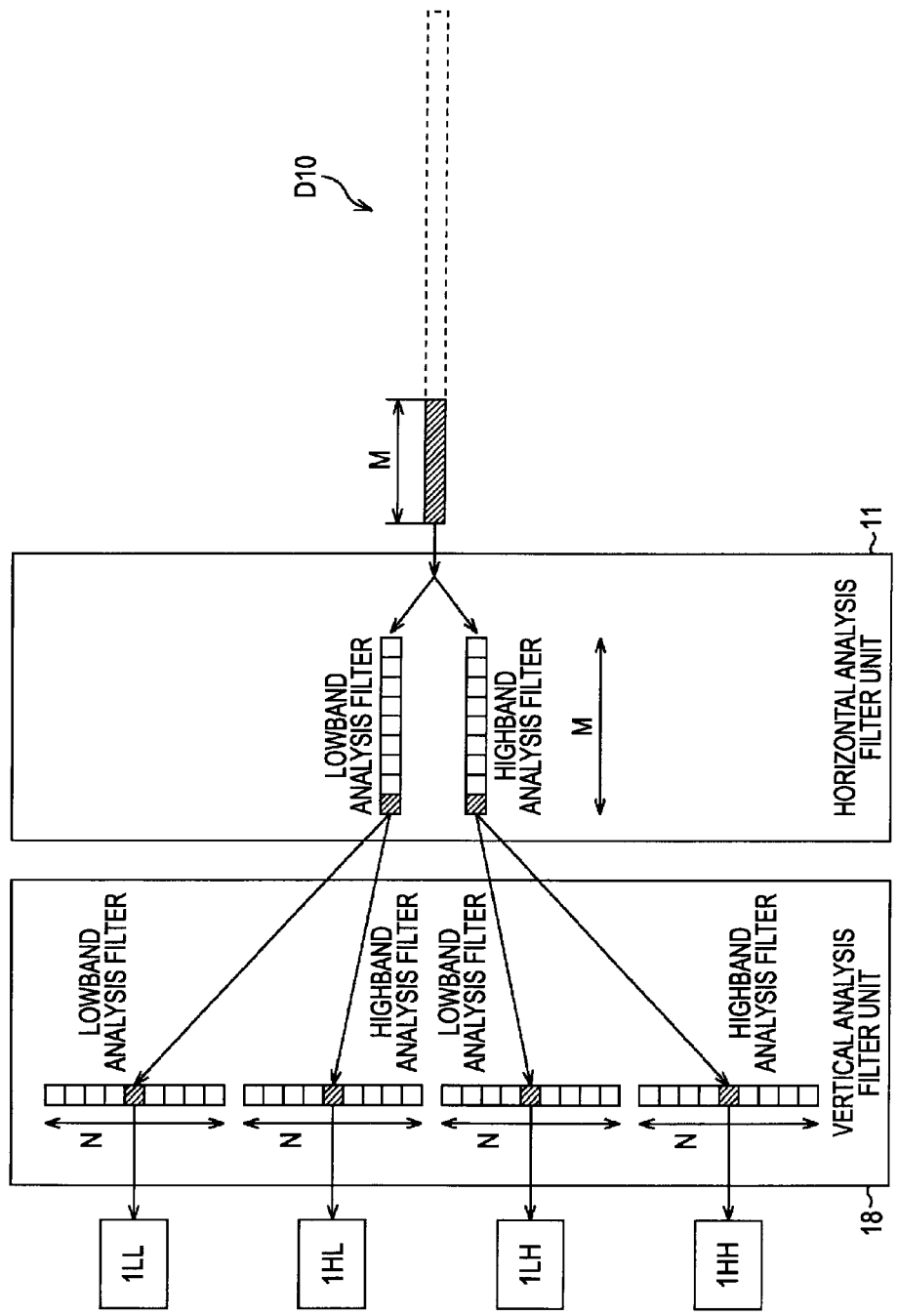
FIG. 13 is a diagram for describing analysis filtering in increments of lines.
Figure 14:
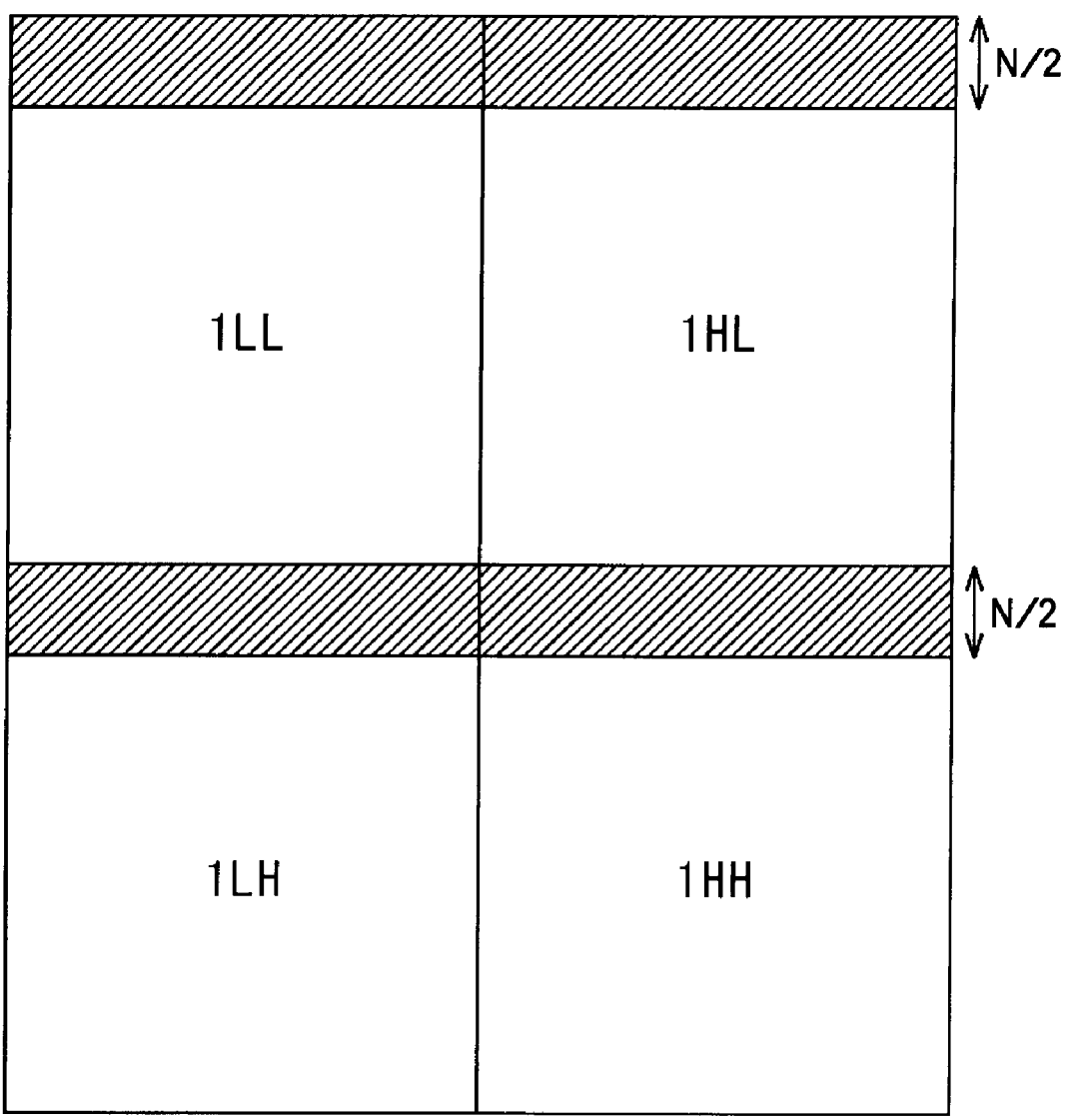
FIG. 14 is a diagram for describing vertical filtering in division level 1 analysis filtering.

The vertical analysis filter unit 18 immediately performs vertical direction lowband analysis filtering and highband analysis filtering at the point that N lines worth (e.g., N=3 in the case of FIG. 4) of lowband and highband components are accumulated. The value of N corresponds to the number of taps for vertical analysis filtering, and the greater the number of taps is, the greater the value of N is, accordingly. As shown in FIGS. 13 and 14, this vertical analysis filtering generates, as the results of the vertical analysis filtering, lowband components (1LL) D19, and highband components (1HL, 1LH, 1HH) D23.

Following the vertical analysis filtering, at the point that the lowband components D19 are accumulated in the internal memory to a number of columns enabling horizontal direction analysis filtering, the horizontal analysis filter unit 19 immediately performs division level 2 horizontal analysis filtering. The reason that the lowband components are repeatedly analyzed in this way is that the greater portion of energy of image signals are concentrated in the lowband components.

That is to say, the horizontal analysis filter unit 19 sequentially reads out M columns from the internal memory, and performs horizontal direction lowband analysis filtering and highband analysis filtering, as the division level 2 horizontal analysis filtering. The lowband components and highband components which are the results of the horizontal analysis filtering are interleaved, and stored in the level 2 buffer 13.

Figure 15:
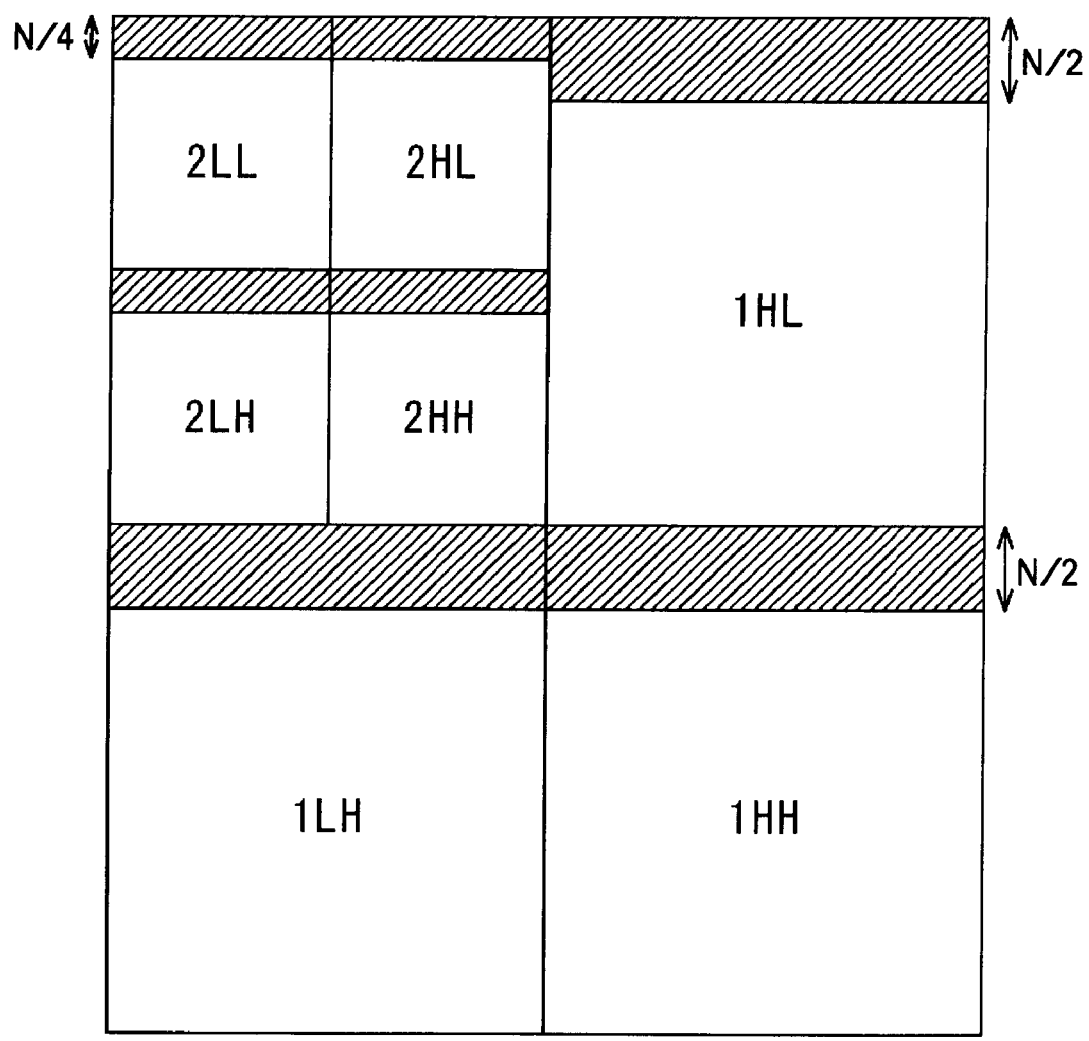
FIG. 15 is a diagram illustrating the results of performing analysis filtering to division level 2.

The vertical analysis filter unit 18 immediately performs vertical direction lowband analysis filtering and highband analysis filtering at the point that N/2 lines worth of lowband and highband components are accumulated at the level 2 buffer 13, as shown in FIG. 14. As shown in FIG. 15, this vertical filtering generates lowband components (2LL) and highband components (2HL, 2LH, 2HH). That is to say, in the example shown in FIG. 15, the frequency components of the division level 1 1LL are divided into the four frequency components of 2LL, 2HL, 2LH, AND 2HH.

As described above, wavelet transformation which is repeatedly performed unit a predetermined division level is repeatedly performed while inputting subsequently video signals to the end of one picture of video signals, whereby one image is subjected to band division to a predetermined division level.

Figure 16:
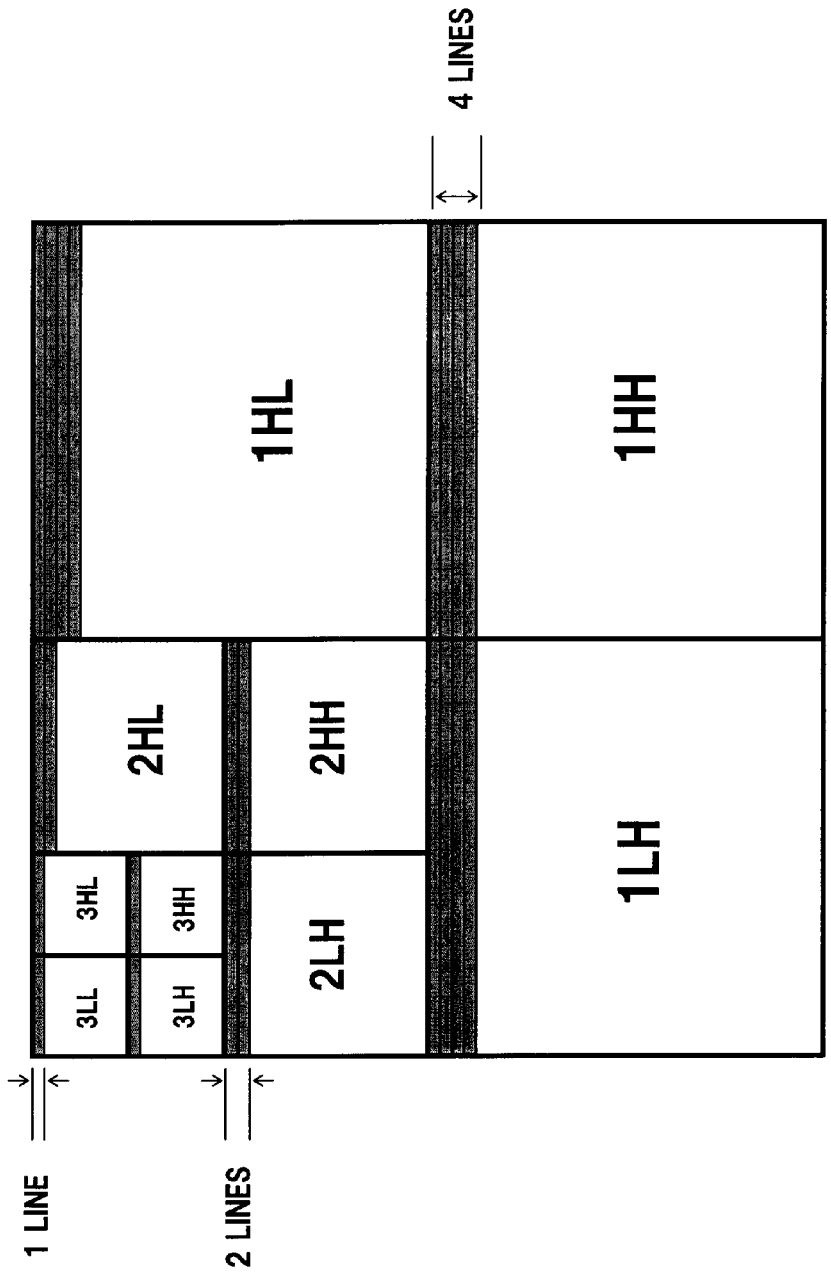
FIG. 16 is a diagram illustrating the results of performing analysis filtering to division level 3 with an actual image.

In the event of further increasing the number of division levels, analysis filtering can be repeatedly performed on the lowband components. FIG. 16 is a diagram illustrating an example wherein an actual image has been divided to division level 3 by analysis filtering wherein N=4.

That is to say, with this image, in the division level 1 vertical analysis filtering, as soon as four lines worth of frequency components are accumulated, vertical analysis filtering is performed; in the division level 2 vertical analysis filtering, as soon as two lines worth of frequency components are accumulated, vertical analysis filtering is performed; and in the division level 3 vertical analysis filtering, as soon as one line worth of frequency components are accumulated, vertical analysis filtering is performed; whereby it can be understood that division has been performed to division level 3.

As described above, analysis filtering is performed as soon as a predetermined number of columns or a predetermined number of lines worth of frequency components are accumulated, so analysis filtering of video pictures of one picture worth can be effectively performed. That is to say, wavelet transformation can be performed at high speed.

Also, performing analysis filtering for obtaining coefficient data for at least one line of lowband components, multiple times in stages for all lines of the entire screen, enables decoded image to be obtained with little delay in a system wherein, for example, post-wavelet-transformation frequency components are encoded and transferred, and decoded, as described later with reference to FIG. 27.

Also, analysis filtering performed on video signals as described above is performed in increments of pictures (fields or frames) making up video signals, so there is the need to detect the end of a picture, and stop and reset the analysis filtering operations. In this case, while illustrating in the drawings will be omitted, the wavelet transformation device 1 is configured having a vertical synchronizing signal detecting unit built in for detecting vertical synchronizing signals in the video signals, provided upstream of the horizontal analysis filter unit 11 for example.

FIG. 17 is a signal distribution diagram of SMPTE274M standard interlaced signals. The upper half shows the first field, and the lower half shows the second field. There are 22 lines worth of vertical synchronizing signals are at the front of the first field, and 23 lines worth of vertical synchronizing signals are at the front of the second field.

Accordingly, the wavelet transformation device 1 has a vertical synchronizing signal detecting unit for detecting vertical synchronizing signals in the video signals, built in upstream of the horizontal analysis filter unit 11 for example, and detects the vertical synchronizing signals with the built-in vertical synchronizing signal detecting unit.

Thus, the end of a picture can be readily detected, and analysis filtering operations can be stopped upon detection. That is to say, analysis filtering can be performed on video signals in increments of pictures (fields or frames) making up the video signals.

Figure 18:
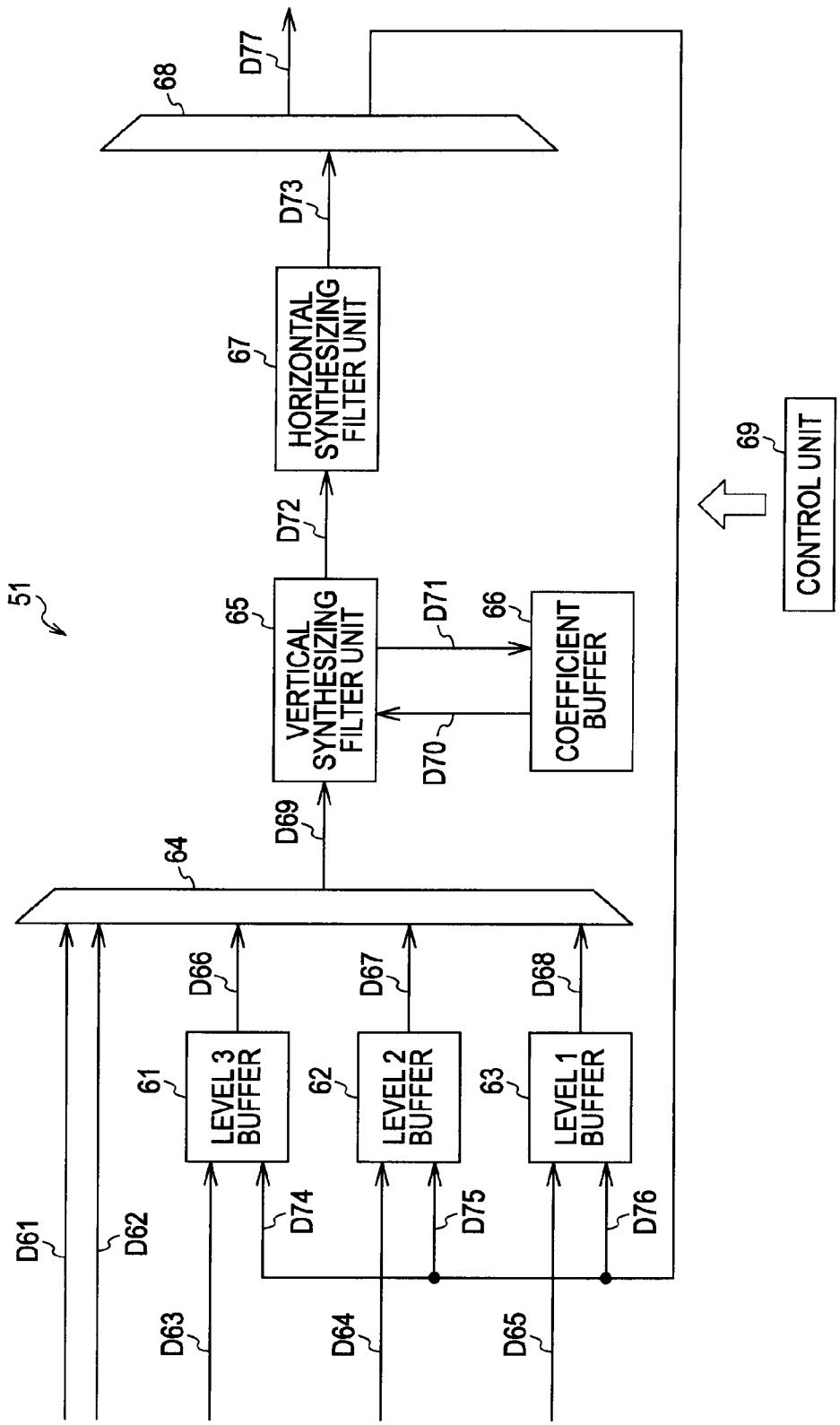
FIG. 18 is diagram illustrating a configuration example relating to a wavelet inverse transformation device corresponding to the wavelet transformation device shown in FIG. 1.

FIG. 18 is a diagram illustrating a configuration example of an embodiment of a wavelet inverse transformation device corresponding to the wavelet transformation device shown in FIG. 1. The wavelet inverse transformation device 51 is a band synthesizing device which takes frequency components obtained by image signals being subjected to wavelet transformation and divided to a predetermined level (in the case shown in FIG. 18, division level 4) by the wavelet transformation device 1 shown in FIG. 1. Of course, if the number of wavelet transformation division levels differs, wavelet inverse transformation is performed corresponding to the number of division levels.

The wavelet inverse transformation device 51 shown in FIG. 18 is configured of a level 3 buffer 61, level 2 buffer 62, level 1 buffer 63, selector 64, vertical synthesizing filter unit 65, coefficient buffer 66, horizontal synthesizing filter unit 67, selector 68, and control unit 69. That is to say, the wavelet inverse transformation device 51 has buffers (level 3 buffer 61 through level 1 buffer 63) independent for each level other than the lowest band level (division level 4).

The division level 4 lowband component coefficients (4LL) D61 and highband component coefficients (4HL, 4LH,

4HH) D62 are input to the selector 64 from an unshown external portion (e.g., from a digital decoding unit 313 shown in FIG. 27, which will be described later). The division level 3 highband component coefficients (3HL, 3LH, 3HH) D63 are input to the level 3 buffer 61. The division level 2 highband component coefficients (2HL, 2LH, 2HH) D64 are input to the level 2 buffer 62. The division level 1 highband component coefficients (1HL, 1LH, 1HH) D65 are input to the level 1 buffer 63.

With regard to the vertical synthesizing filtering results of the division level 4, the level 3 buffer 61 stores and holds the coefficient (3LL) D74 of the division level 3 lowband components obtained as a result of horizontal synthesizing filtering, and the externally obtained division level 3 highband component coefficients (3HL, 3LH, 3HH) D63. The division level 3 lowband component coefficient (3LL) D74 and the division level 3 highband component coefficients (3HL, 3LH, 3HH) D63 are multiplexed at the level 3 buffer 61, and output from the level 3 buffer 61 as division level 3 frequency component coefficients (3LL, 3HL, 3LH, 3HH) D66, With regard to the vertical synthesizing filtering results of the division level 3, the level 2 buffer 62 stores and holds the coefficient (2LL) D75 of the division level 2 lowband components obtained as a result of horizontal synthesizing filtering, and the externally obtained division level 2 highband component coefficients (2HL, 2LH, 2HH) D64. The division level 2 lowband component coefficient (2LL) D75 and the division level 2 highband component coefficients (2HL, 2LH, 2HH) D64 are multiplexed at the level 2 buffer 62, and output from the level 2 buffer 62 as division level 2 frequency component coefficients (2LL, 2HL, 2LH, 2HH) D67.

With regard to the vertical synthesizing filtering results of the division level 2, the level 1 buffer 63 stores and holds the coefficient (1LL) D76 of the division level 1 lowband components obtained as a result of horizontal synthesizing filtering, and the externally obtained division level 1 highband component coefficients (1HL, 1LH, 1HH) D65. The division level 1 lowband component coefficient (1LL) D76 and the division level 1 highband component coefficients (1HL, 1LH, 1HH) D64 are multiplexed at the level 1 buffer 63, and output from the level 1 buffer 63 as division level 1 frequency component coefficients (1LL, 1HL, 1LH, 1HH) D68.

Note that the level 3 buffer 61 through level 1 buffer 63 are configured basically the same as with the level 2 buffer 13 through level 4 buffer 15 shown in FIG. 15. That is to say, as described earlier with reference to FIG. 10, the level 3 buffer 61 through level 1 buffer 63 are each configured of three buffers for storing one line worth of coefficients read out by the vertical analysis filter unit 18, corresponding to the level to be processed.

Under control of the vertical synthesizing filter unit 65, the selector 64 selects from an external source and from the level 3 buffer 61 through level 1 buffer 63, the external source or the output of the corresponding division level buffer, and outputs the selected output to the vertical analysis filter unit 65 as coefficients D69.

The vertical synthesizing filter unit 65 reads out the frequency component coefficients from external source or corresponding division level buffer via the selector 64, reads out the intermediate computation coefficients D70 stored in the coefficient buffer 66, performs vertical synthesizing filtering using the coefficient D69 and coefficient D70 from the selector 64, and while performing vertical synthesizing filtering, stores in the coefficient buffer 66 a part of the coefficients generated intermediately during the vertical synthesizing filtering (coefficients necessary for the next calculation process), as intermediate computation coefficients D71.

The coefficient buffer 66 stores and holds part of the coefficients generated intermediately during the vertical synthesizing filtering. That is to say, of the coefficients generated intermediately during the vertical synthesizing filtering performed by the vertical synthesizing filter unit 65, the coefficient buffer 66 stores and holds coefficients necessary for the next vertical synthesizing filtering processing, as coefficients for intermediate computation. These are read out by the vertical synthesizing filter unit 65 at the time of the next vertical synthesizing filtering.

Note that the coefficient buffer 66 is configured basically the same as the first coefficient buffer 17, for example. That is to say, as described above with reference to FIG. 11, the coefficient buffer 66 is configured of three buffers for storing the three intermediate computation coefficients generated in the process of vertical lifting computation at each level.

The horizontal synthesizing filter unit 67 performs horizontal synthesizing filtering arraying, in the horizontal direction, the coefficients D72 generated as the result of the vertical synthesizing filtering. Consequently, lowband components lines are generated in order from the top line of the image, and the generated lowband component (or image) D73 is output to the selector 68.

Under control of the horizontal synthesizing filter unit 67, in the event of proceeding to the next division level the selector 68 outputs one of the lowband components D74 through D76 to the buffer side of the level corresponding to the next division level, so as to store in the buffer of the level corresponding to the next division level, and in the event that wavelet inverse transformation has ended the final level (i.e., the division level 1 which is the initial division level in the wavelet transformation), the baseband image D77 is externally output.

The control unit 69 is configured of a microcomputer or the like including, for example, a CPU, ROM, and RAM, and controls the processing of the units of the wavelet inverse transformation device 51 by executing various types of programs.

Next, the operations of the wavelet inverse transformation device 51 shown in FIG. 18 will be described with reference to the flowchart in FIG. 19. That is to say, FIG. 19 illustrates the wavelet inverse transformation processing executed by the wavelet inverse transformation device 51, in which wavelet inverse transformation processing inverse transformation is performed from the lowband component with the smallest resolution in order to the highband components. In terms of division levels, this is executed in the order of level 4, level 3, level 2, and level 1.

In step S61, the selector 64 externally inputs division level 4 lowband component coefficient (4LL) D61 and highband component coefficients (4HL, 4LH, 4HH) D62. The selector 64 then selects, under control of the vertical synthesizing filter unit 65, output from this external source, and outputs the selected output (lowband component coefficient (4LL) D61 and highband component coefficients (4HL, 4LH, 4HH) D62) to the vertical analysis filter unit 65 as frequency component coefficients D69.

In step S62, the vertical synthesizing filter unit 65 reads out the intermediate calculation coefficients D70 stored in the coefficient buffer 66 in the preceding processing for obtaining the frequency components. Note that these coefficients have been generated in prior vertical synthesizing filtering processing, and stored in the previous step S65.

In step S63, the vertical synthesizing filter unit 65 uses the frequency component coefficients D69 and read out coefficients D70 to perform division level 4 vertical synthesizing filtering. Details of this vertical synthesizing filtering will be described later with reference to FIG. 21.

In step S64, the vertical synthesizing filter unit 65 stores a part of the coefficients generated intermediately during the vertical synthesizing filtering (i.e., intermediate computation coefficients) D71 in the coefficient buffer 66. Also, the coefficients D72 generated as the result of the vertical synthesizing filtering are input to the horizontal synthesizing filter unit 67.

In step S65, the horizontal synthesizing filter unit 67 performs horizontal synthesizing filtering arraying, in the horizontal direction, the coefficients D72 generated as the result of the vertical synthesizing filtering, and performs division level 4 horizontal synthesizing filtering. Details of this horizontal synthesizing filtering will be described later with reference to FIG. 22. A part of the coefficients generated intermediately during the horizontal synthesizing filtering is stored in unshown built-in flip-flops.

As a result of the horizontal synthesizing filtering, wavelet inverse transformation of the division level 4 lowband and highband components is completed, thereby generating division level 3 lowband component coefficient (3LL) D73.

In step S66, the control unit 69 determines whether or not the wavelet inverse transformation has proceeded to the division level 1, which is the initial level for wavelet transformation (in other words, the final level for wavelet inverse transformation), and in the event that determination is made that the division level 1 is not ended, the processing advances to step S67.

In step S67, the control unit 69 controls the selector 68 so as to select output to the level 3 buffer 61, and stores the division level 3 lowband component coefficients (3LL) D73 obtained as the result of the horizontal synthesizing filtering, as lowband component coefficients (3LL) D74, in the corresponding level buffer (in this case, the level 3 buffer 61).

In step S68, the control unit 69 transfers the division level 3 highband component coefficients (3HL, 3LH, 3HH) from the external source to the level 3 buffer 61, so as to be stored.

In step S69, the vertical synthesizing filter unit 65 controls the selector 64 so as to select output from the level 3 buffer 61, whereby the frequency component coefficients D66 are read out from the level 3 buffer 61 and the frequency component coefficients that have been read out are input as frequency component coefficients D65.

That is to say, at the level 3 buffer 61, the division level 3 lowband component coefficient (3LL) D74 and the division level 3 highband component coefficients (3HL, 3LH, 3HH) D63 are multiplexed, and output from the level 3 buffer 61 as division level 3 frequency component coefficients (3LL, 3HL, 3LH, 3HH) D66. Accordingly, the division level 3 frequency component coefficients (3LL, 3HL, 3LH, 3HH) D66 are output to the vertical synthesizing filter unit 65 as frequency component coefficients D69 from the selector 64.

Subsequently, the processing returns to step S62, and subsequent processing is repeated. That is to say, in step S62, coefficients are read out from the coefficient buffer 66, division level 3 vertical synthesizing filtering is performed at step S63. In step S64, coefficients obtained in the process of computation are stored in the coefficient buffer 66, and in step S65 division level 3 horizontal synthesizing filtering is performed and division level 2 lowband components (2LL) are generated.

In this case, in step S66 determination is made that the division level 1 has not yet ended, so the division level 2 lowband component (2LL) D75 obtained as the result of horizontal analysis filtering is stored in the corresponding level buffer (in this case, the level 2 buffer 62). In the same way, the division level 2 highband component coefficients (2HL, 2LH, 2HH) D64 from the external source are transferred to the level 2 buffer 62.

At this time, in the same way as with the case of the level 3 buffer 61, at the level 2 buffer 62 the division level 2 lowband component coefficient (2LL) D75 and the division level 2 highband component coefficients (2HL, 2LH, 2HH) D64 are multiplexed, and output from the level 2 buffer 62 as division level 2 frequency component coefficients (2LL, 2HL, 2LH, 2HH) D67.

The above series of processing is performed until the division level 1 frequency components are stored in the level 1 buffer 63 and read out. Subsequently, in step S62, coefficients are read out from the coefficient buffer 66, and division level 1 vertical synthesizing filtering is performed at step S63. In step S64, coefficients obtained in the process of computation are stored in the coefficient buffer 66, and in step S65 division level 1 horizontal synthesizing filtering is performed and the base band image wherein synthesizing filtering has indeed to division level 1 is consequently generated. In step S66, determination is made that through division level 1 has ended.

Accordingly, the flow proceeds to step S70, and in step S70 the baseband image D77 from the horizontal synthesizing filter unit 67 is output externally (e.g., to a later-described inverse quantization unit 162 shown in FIG. 25), via the selector 68.

As described above, the wavelet inverse transformation device 51 shown in FIG. 18 also is configured to be able to handle buffers for each division level other than the lowest band level with internal memory, so the horizontal synthesizing filtering results can be stored in buffers of each division level while performing the horizontal synthesizing filtering. Accordingly, vertical synthesizing filtering can be performed while reading out the results of the horizontal synthesizing filtering from the buffer of each division level. That is to say, horizontal direction and vertical direction filtering can be performed simultaneously in parallel.

Thus, wavelet transformation can be performed at high speed for moving images and images with high resolution, as well.

Also, with the wavelet inverse transformation device 51 shown in FIG. 18, a coefficient buffer is provided along with the buffers for each division level other than the lowest band level, and coefficients necessary for the next processing are held when performing vertical direction synthesizing filtering, and the coefficients are read out at the time of the next vertical synthesizing filtering and executed, so there is no need to configure external memory as with known arrangements.

Accordingly, there is no need to exchange data with external memory, and wavelet inverse transformation can be performed at high speeds.

Next, the computation method in the above-described synthesizing filtering will be described in detail. Effective filtering can be executed corresponding to the analyzing filtering applying the lifting technique described above with reference to FIG. 6, so the lifting technique can be used in wavelet inverse transformation synthesizing filtering in the same way.

Figure 20:
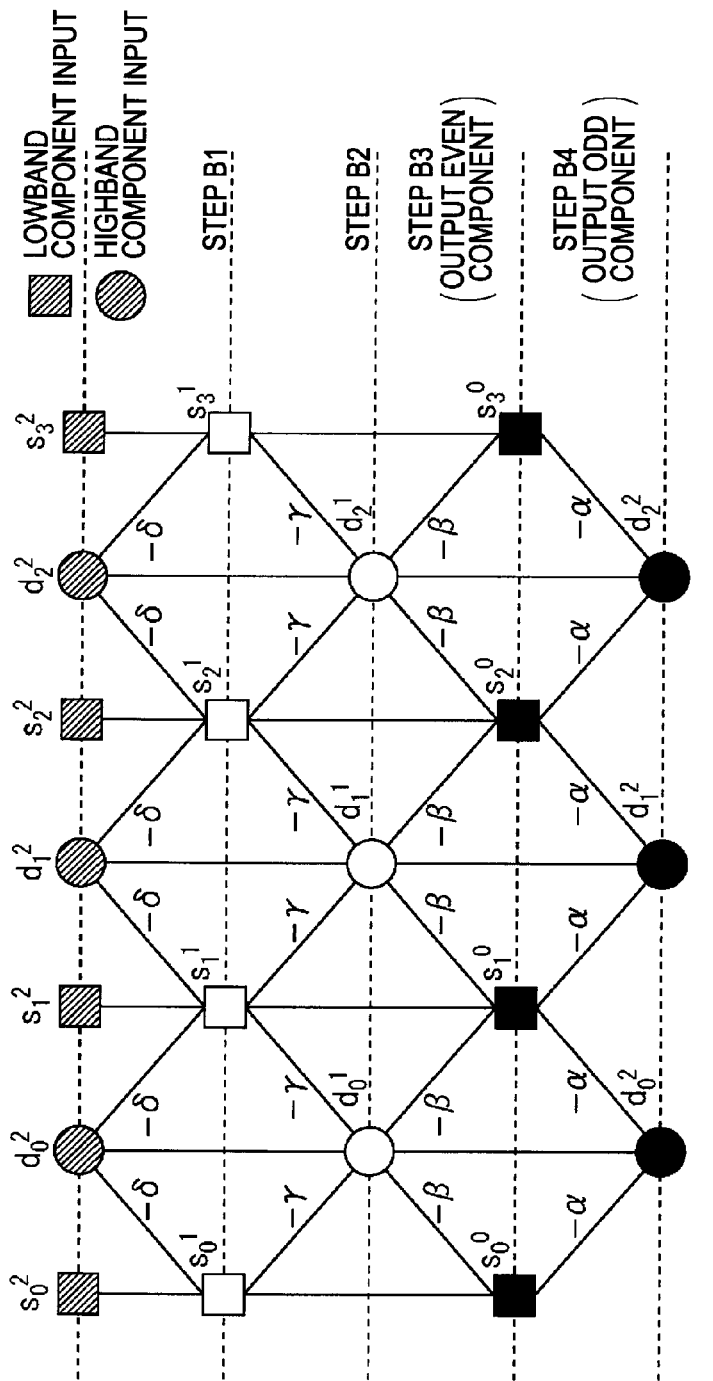
FIG. 20 is a diagram for describing another example of a lifting scheme with a 9×7 analysis filter.

FIG. 20 illustrates a lifting scheme of a 9×7 analysis filter used with the JPEG 2000 standard as well. Synthesizing filtering in a case of applying the lifting technique to this 9×7 analysis filter will be described.

In the example shown in FIG. 20, the first tier (highest tier) is coefficients generated by wavelet transformation, with the solid circles representing highband component coefficients, and the solid squares representing lowband component coefficients. The second and third tiers indicate components (coefficients) generated at a step B1 and step B2, respectively. Also, the fourth tier indicates even-numbered component output generated at the processing in step 53, and the fifth tier indicates odd-numbered component output generated at the processing in step 4.

With the synthesizing filtering applying the lifting technique to the 9×7 synthesizing filter, even-numbered components are obtained by the processing in step 23, and odd-numbered components are obtained by the processing in step 54. The processing of step B1 through step B4 can be represented by the following expressions.

$$\text{Step B1: } s_i^1 = s_i^2 - \delta(d_{i-1}^2 + d_i^2) \quad (5)$$

$$\text{Step B2: } d_i^1 = d_i^2 - \gamma(s_i^1 + s_{i+1}^1) \quad (6)$$

$$\text{Step B3: } s_i^0 = s_i^1 - \beta(d_{i-1}^1 + d_i^1) \quad (7)$$

$$\text{Step B4: } d_i^0 = d_i^1 - \alpha(s_i^0 + s_{i+1}^0) \quad (8)$$

wherein $\alpha = -1.586134342$, $\beta = -0.05298011857$, $\gamma = 0.8829110755$, and $\delta = 0.4435068520$ Thus, with the synthesizing filtering applying the lifting technique, the processing of step B1 and step 52 is performed, even-numbered component coefficients are generated at step B3, following which odd-numbered component coefficients are generated at step B4. The filter bank used at this time can be realized with subtraction and shift computations alone, as can be seen from Expressions (5) through (8). Accordingly, the amount of calculations can be markedly reduced.

Thus, this lifting technique will be applied to the horizontal synthesizing filtering and the vertical synthesizing filtering with the wavelet inverse transformation device 51 as well, as described next. Note that only the expressions used are different, and that vertical synthesizing filtering performs basically the same operations as the vertical analysis filtering described above with reference to FIG. 9, and that horizontal synthesizing filtering performs basically the same operations as the horizontal analysis filtering described above with reference to FIG. 7.

Figure 21:
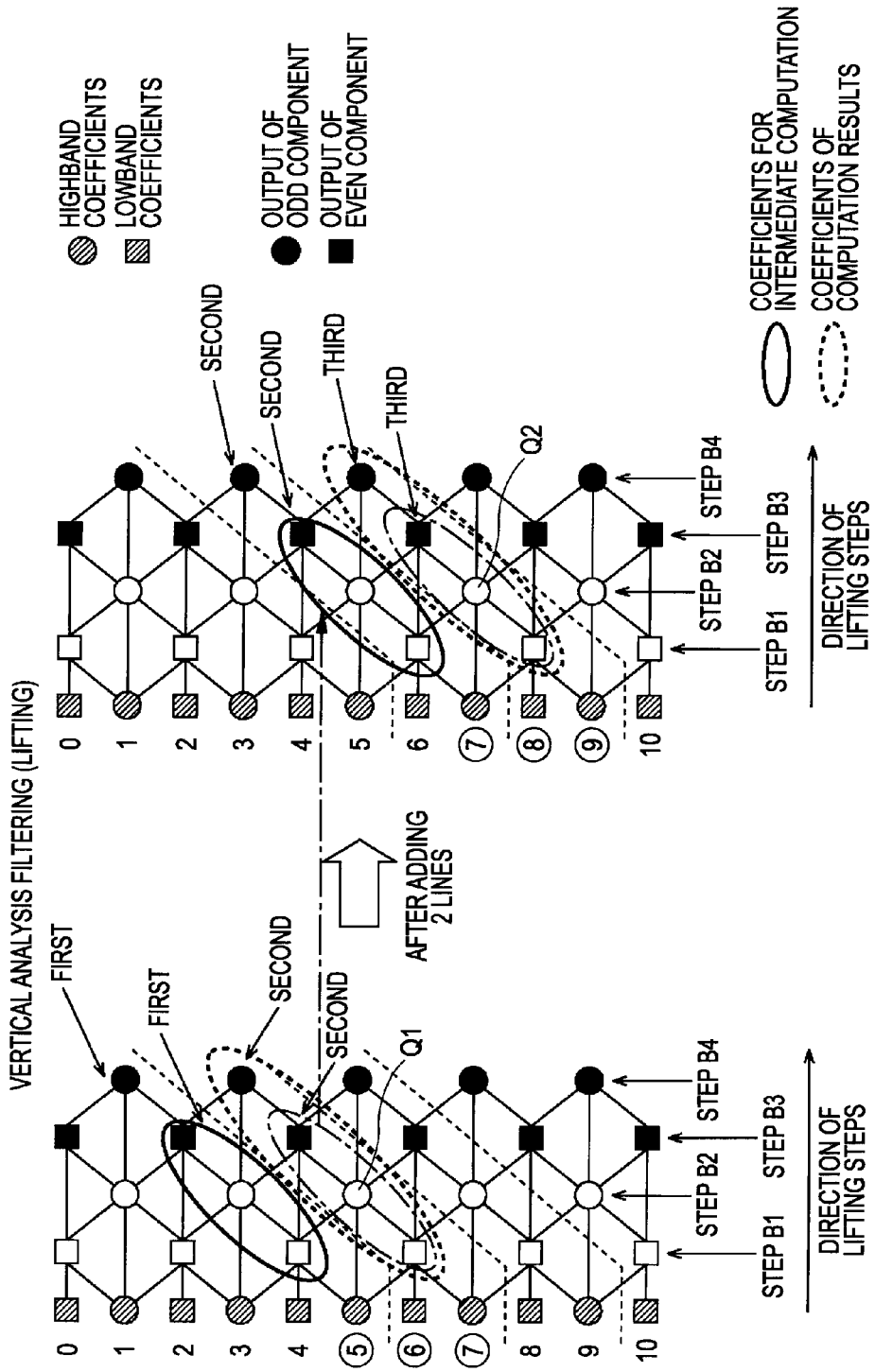
FIG. 21 is a diagram for describing a case of executing vertical synthesizing filtering as to a coefficient group in the vertical direction, with the lifting scheme shown in FIG. 20.

First, the vertical synthesizing filtering performed by the vertical synthesizing filter unit 65 will be described in detail. FIG. 21 illustrates an example of performing vertical synthesizing filtering as to a coefficients group in the vertical direction with the lifting scheme shown in FIG. 20.

The example shown in FIG. 21 shows an example of the vertical direction coefficients being subjected to the processing of the four steps (Steps B1 through B4) described above with FIG. 20 whereby the odd-numbered component coefficients (hereafter also referred to as "odd-numbered coefficients") and the even-numbered component coefficients (hereafter also referred to as "even-numbered coefficients") are generated, with the direction of lifting steps proceeding from the left to the right in the drawing.

Also, the numbers shown to the left of the coefficients in the vertical direction indicate line Nos., with the hatched circles and squares at the first column from the left representing the highband input and lowband input, respectively, and the circles and squares at the subsequent columns represent the highband coefficients and lowband coefficients generated in the process of lifting computation, respectively. Particularly, the solid circles and solid squares represent the odd coefficients and even coefficients which are the results of the lifting computation, respectively.

The following is a description of operations in order from the left. The left side of FIG. 21 illustrates a case wherein three lines of coefficients, lines Nos. 4 through 6 in the vertical direction, are input, and computation with a lifting scheme in the vertical direction (i.e., "vertical lifting computation") is performed. Note that in this case, the even coefficient at the highest tier is not paired with an odd coefficient, and accordingly description thereof will be omitted.

In order to obtain the first even coefficient in step B3 of the vertical lifting computation and obtain the first odd coefficient in step B4, there is the need to input the coefficients of the six lines of Nos. 0 through 5.

Subsequently, in order to obtain the second even-numbered coefficient and odd-numbered coefficient, there is the need for the three coefficients indicated by the heavy solid lines and the coefficients of the two lines of Nos. 6 and 7 indicated by circled numbers, and further, in order to calculate the coefficient indicated by Q1 at step B2, the coefficient of the line No. 5 indicated by a circled number is also necessary.

The three coefficients indicated by the heavy solid lines are a part of the coefficients generated in the process of the vertical lifting computation for obtaining the first even coefficient and odd coefficient (hereafter also referred to as "first vertical lifting computation").

Accordingly, in order to obtain the second even-numbered coefficient and odd-numbered coefficient, there is ultimately the need to input the coefficients of the three lines of Nos. 5 through 7, and further, store the three coefficients indicated by the heavy solid lines that are generated in the process of the first vertical lifting computation performed to obtain the first even-numbered coefficient and odd-numbered coefficient, in the coefficient buffer 66 shown in FIG. 18. At this time, the three lines of coefficients in the vertical direction are read out from the corresponding level buffer in FIG. 18 for each level. That is to say, if the division level of the current wavelet transformation is 2, the coefficients are read out form the level 2 buffer 62.

Accordingly, performing vertical lifting computation using the three coefficients indicated by the heavy solid line that have been stored at the first vertical lifting computation, and the coefficients of the three lines of Nos. 5 through 7 that have been read out from corresponding level buffers, generates four coefficients (indicated by the heavy dotted line) including the second even coefficient and odd coefficient. Of these, the three coefficients indicated by the single-dot broken line are coefficients necessary for obtaining the third even coefficient and odd coefficient, and accordingly are stored in the coefficient buffer 66.

An example of a case wherein, following reading out the line No. coefficient No. 7, two lines in the vertical direction are to be additionally input, i.e., the coefficients of the three lines of Nos. 7 through 9 in the vertical direction are input and vertical lifting computation is performed, is shown to the right in FIG. 21.

In the same way as with the second case, in order to obtain the third even coefficient and off coefficient, there is the need for the three coefficients indicated by the heavy solid lines and the coefficients of the two lines of Nos. 8 and 9 indicated by circled numbers, and further, in order to calculate the coefficient indicated by Q2 at step B2, the coefficient of the line No. 7 indicated by a circled number is also necessary.

Note that the three coefficients indicated by the heavy solid line at the right half have been stored at the coefficient buffer 66 in the second vertical lifting computation, as indicated by the single-dot broken line at the left half of the diagram.

Accordingly, performing vertical lifting computation using the three coefficients indicated by the heavy solid line that have been stored at the second vertical lifting computation, and the coefficients of the three lines of Nos. 7 through 9 that have been read out and input from the buffers of corresponding levels, generates four coefficients (indicated by the heavy dotted line) including the third even coefficient and odd coefficient. Of these, the three coefficients indicated by the single-dot broken line are coefficients necessary for obtaining the third even coefficient and odd coefficient, and accordingly are stored at the coefficient buffer 66.

Thus, the vertical lifting computation is performed to the bottom column of the screen while sequentially inputting three lines worth of coefficients and holding the three intermediate computation coefficients, thereby completing vertical direction synthesizing filtering.

Figure 22:
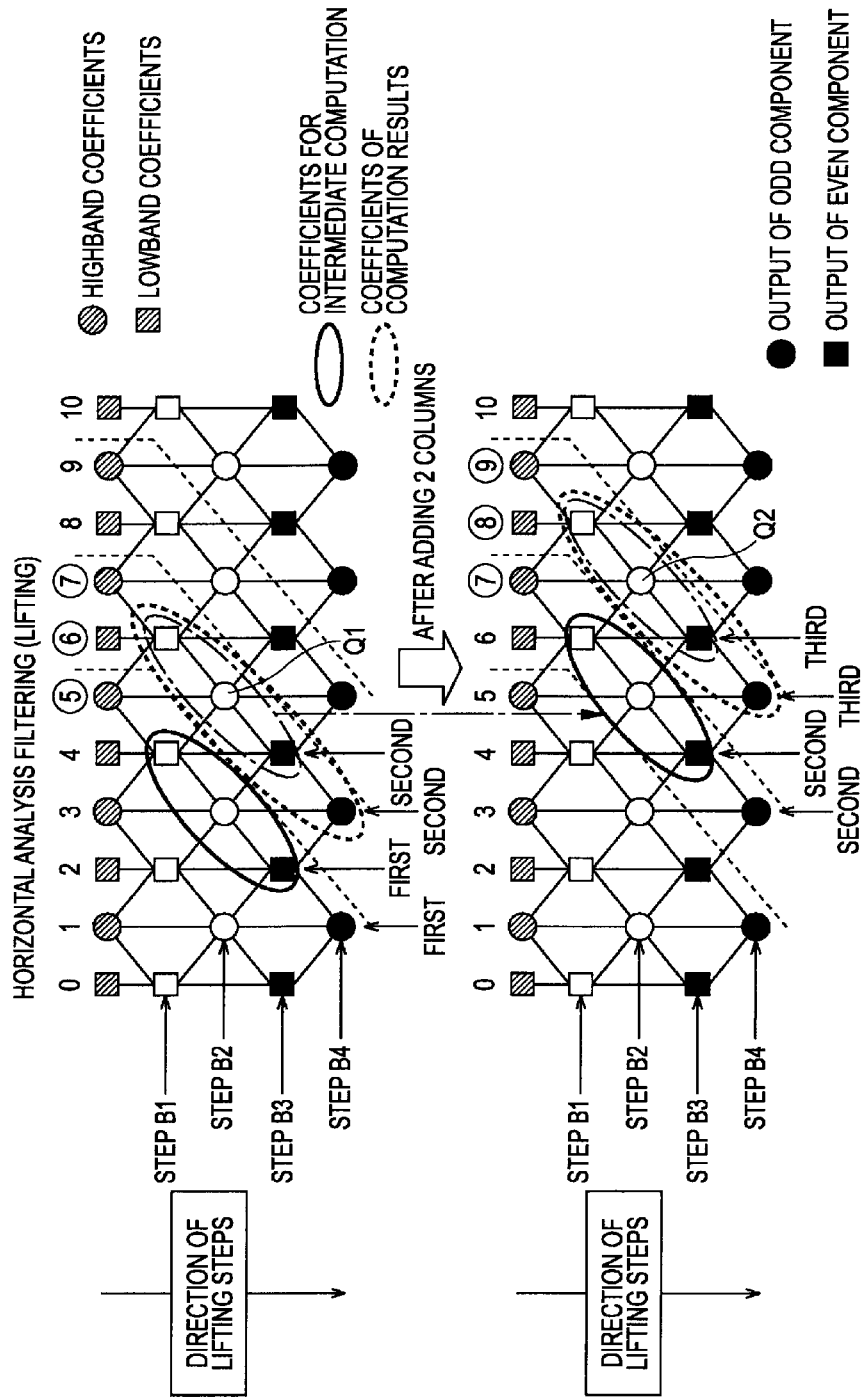
FIG. 22 is a diagram for describing a case of executing horizontal synthesizing filtering as to a coefficient group in the horizontal direction, with the lifting scheme shown in FIG. 20.

Next, the horizontal synthesizing filtering performed by the horizontal synthesizing filter unit 67 will be described in detail. FIG. 22 illustrates an example of arraying coefficients obtained by vertical direction synthesizing filtering in the horizontal direction, and performing horizontal synthesizing filtering with the lifting scheme shown in FIG. 20.

The example shown in FIG. 22 shows an example of the horizontal direction coefficients being subjected to the processing of the four steps (Steps B1 through B4) described above with FIG. 20 whereby the odd-numbered component coefficients and the even-numbered component coefficients are generated, with the direction of lifting steps proceeding from the top to the bottom in the drawing.

Also, the numbers shown above the coefficients in the horizontal direction indicate column Nos., with the hatched circles and squares at the first tier from the top representing the highband input and lowband input, respectively, and the circles and squares at the subsequent tiers represent the highband coefficients and lowband coefficients generated in the process of lifting computation, respectively. Particularly, the solid circles and solid squares represent the odd coefficients and even coefficients which are the results of the lifting computation, respectively.

The following is a description of operations in order from the top. The upper side of FIG. 22 illustrates a case wherein three lines of coefficients, columns Nos. 5 through 7 in the horizontal direction, are input, and computation with a lifting scheme in the horizontal direction (i.e., "horizontal lifting computation") is performed. Note that in this case, the even coefficient at the far left is not paired with an odd coefficient, and accordingly description thereof will be omitted.

In order to obtain the first even coefficient in step B3 of the horizontal lifting computation and obtain the first odd coefficient in step B4, there is the need to input the coefficients of the six columns of Nos. 0 through 5.

Subsequently, in order to obtain the second even-numbered coefficient and odd-numbered coefficient, there is the need for the three coefficients indicated by the heavy solid lines and the coefficients of the two columns of Nos. 6 and 7 indicated by circled numbers, and further, in order to calculate the coefficient indicated by Q1 at step B2, the coefficient of the column No. 5 indicated by a circled number is also necessary.

The three coefficients indicated by the heavy solid lines are a part of the coefficients generated in the process of the horizontal lifting computation for obtaining the first odd coefficient and even coefficient (hereafter also referred to as "first horizontal lifting computation").

That is to say, in order to obtain the second odd coefficient and even coefficient, there is ultimately the need to input the coefficients of the three columns of Nos. 5 through 7 indicated by circled numbers, and further, latch the three coefficients indicated by the heavy solid lines that are generated in the process of the first horizontal lifting computation as intermediate calculation coefficients. Actually, with this being no more than three coefficients, a flip-flop which is often used as a latch can be built into the horizontal analysis filter unit 67.

Accordingly, performing horizontal lifting computation using the three coefficients indicated by the heavy solid line that have been latched at the first horizontal lifting computation, and the coefficients of the three columns of Nos. 5 through 7 that have been input, generates four coefficients (indicated by the heavy dotted line) including the second odd coefficient and even coefficient at the point that the computation process thereof ends. Of these, the three coefficients indicated by the single-dot broken line are coefficients necessary for obtaining the third odd coefficient and even coefficient, and accordingly are latched at a built-in flip-flop as intermediate calculation coefficients.

An example of a case wherein, following input of the column No. 7 coefficient, two columns in the horizontal direction are to be additionally input, i.e., the coefficients of the three columns of Nos. 7 through 9 in the horizontal direction are input and horizontal lifting computation is performed, is shown at the lower half of FIG. 22.

In the same way as with the second case, in order to obtain the third odd coefficient and even coefficient, there is the need for the three coefficients indicated by the heavy solid lines and the coefficients of the two columns of Nos. 8 and 9 indicated by circled numbers, and further, in order to calculate the coefficient indicated by Q2 at step B2, the coefficient of the column No. 7 indicated by a circled number is also necessary.

Note that the three coefficients indicated by the heavy solid line at the lower half have been latched in the second horizontal lifting computation, as indicated by the single-dot broken line at the upper half of the diagram.

Accordingly, performing horizontal lifting computation using the three coefficients indicated by the heavy solid line that have been latched at the second horizontal lifting computation, and the coefficients of the three columns of Nos. 7 through 9 that have been newly input, generates four coefficients (indicated by the heavy dotted line) including the third odd coefficient and even coefficient. Of these, the three coefficients indicated by the single-dot broken line are coefficients necessary for obtaining the fourth highband coefficient and lowband coefficient, and accordingly are latched at a built-in flip-flop as intermediate calculation coefficients.

Thus, the horizontal lifting computation is performed to the far right column of the screen while sequentially inputting three columns worth of coefficients and holding the three intermediate computation coefficients, thereby completing horizontal direction analysis filtering.

As described above, a lifting scheme of a 9×7 wavelet transformation filter is used for the vertical synthesizing filtering and horizontal synthesizing filtering as well, so buffers capable of storing three lines worth of coefficients are necessary as the buffers of corresponding dividing levels, as described earlier with reference to FIG. 10, and further, the coefficients of the lines already used for the vertical lifting computation are necessary for the next vertical lifting computation, in order to obtain the Q1 and Q2 in FIG. 21.

Accordingly, as described above, within the buffers at the corresponding levels, the coefficients stored in a buffer for one line worth of coefficients are consecutively transferred to the buffer for the coefficients of the adjacent line. That is to say, the level 3 buffer 61 through level 1 buffer 63 shown in FIG. 18 are configured basically the same as with the level 2 buffer 13 through level 4 buffer 15 shown in FIG. 10.

Further, in vertical synthesizing filtering as well, a lifting scheme of a 9×7 wavelet transformation filter is used for the coefficient buffer 66 in FIG. 18, so there is the need to stored each of the three coefficients generated in the process of vertical lifting computation for each level. Accordingly, the coefficient buffer 66 shown in FIG. 18 has basically the same configuration as the coefficient buffer 17 shown in FIG. 11.

As described above, the level 3 buffer 61 through level 1 buffer 63 and the coefficient buffer 66 shown in FIG. 18 can all be configured with relatively small memory capacity. Accordingly, the level 3 buffer 61 through level 1 buffer 63, and the coefficient buffer 66, can be configured as internal memory of the wavelet transformation device 51 shown in FIG. 18, without providing external memory.

Accordingly, there is no need for data exchange with external memory, and wavelet transformation can be performed at high speed. Consequently, there is no need to raise the clock frequency in order to increase speed of data between the external memory and the wavelet transformation device, thereby conserving electric power.

Now, while the above description has been made with reference to FIGS. 12 through 16 regarding an example of performing wavelet transformation on video signals which are moving images, there is also the need to perform wavelet inverse transformation at high speeds in cases of performing wavelet inverse transformation of frequency component coefficients generated (divided) by wavelet transformation in increments of pictures making up the video signals, as well.

Accordingly, as with the case of the vertical analysis filter unit 18 in the wavelet transformation device 1, the vertical synthesizing filter unit 65 of the wavelet inverse transformation device 51 also performs vertical direction synthesizing filtering immediately at the point that a predetermined number of frequency component coefficients are accumulated in the vertical direction (i.e., as many as are necessary for executing the vertical synthesizing filtering) Moreover, as with the case of the horizontal analysis filter unit 11 in the wavelet transformation device 1, the horizontal synthesizing filter unit 67 of the wavelet inverse transformation device 51 also performs horizontal direction synthesizing filtering immediately at the point that a predetermined number of frequency component coefficients are accumulated in the horizontal direction (i.e., as many as are necessary for executing the horizontal synthesizing filtering).

As described above, synthesizing filtering is performed as soon as a predetermined number of frequency component coefficients are accumulated in the vertical direction and in the horizontal direction, so synthesizing filtering of one picture of video signals can be effectively performed. That is to say, wavelet inverse transformation can be performed at high speed.

Also, description has been made above with reference to FIG. 17 regarding a case wherein, in the event of performing wavelet transformation of video signals which are moving images, with the wavelet transformation device 1 shown in FIG. 1, the end of a picture is detected by having an arrangement for detecting vertical synchronizing signals of video signals.

In the event of detecting the end of a picture as described in FIG. 17, and performing wavelet inverse transformation of frequency components generated by wavelet transformation in increments of pictures making up the video signals, an arrangement not shown in the drawings is provided downstream of the selector 68 of the wavelet inverse transformation device 51, as a vertical synchronizing signal insertion portion for inserting video vertical synchronizing signals after picture signals generated by wavelet inverse transformation (i.e., the above-described baseband image D77).

That is to say, a vertical synchronizing signal insertion portion is provided downstream of the selector 68 of the wavelet inverse transformation device 51, so as to insert video vertical synchronizing signals after picture signals, e.g., after the baseband image D77 from the selector 68, and the generated video signals are externally output.

Thus, continuously inserting video vertical synchronizing signals for subsequent pictures as well, enables generated video signals to be sequentially output. Accordingly, moving images can be reproduced.

As described above, with the wavelet transformation device of an embodiment of the invention, buffers are provided for each division level from level 1 to a predetermined number of levels, and the horizontal analysis filtering results are stored in each division level buffer while performing the horizontal analysis filtering, so vertical direction filtering can be performed while reading out the results of the horizontal analysis filtering from the buffer of each division level. That is to say, horizontal direction and vertical direction filtering can be performed simultaneously in parallel.

Thus, wavelet transformation can be performed at high speed for moving images and images with high resolution, as well.

Also, each type of analysis filtering is arranged to be performed by lifting, so the buffers for each level for storing the horizontal analysis filtering results, and coefficient buffers for storing a part of the intermediate vertical analysis filtering coefficients can be configured with a small capacity. Thus, these buffers can be built into the wavelet transformation device, and accordingly there is no need to configure external memory.

Accordingly, there is no need to exchange data with external memory, and wavelet transformation can be performed at high speeds. Consequently, there is no need to raise the clock frequency in order to increase speed of data between the external memory and the wavelet transformation device, thereby conserving electric power.

On the other hand, with the wavelet inverse transformation device of an embodiment of the invention, buffers are provided for each division level except for the lowest level, and the horizontal synthesizing filtering results are stored in each division level buffer while performing the horizontal synthesizing filtering, so vertical direction filtering can be performed while reading out the results of the horizontal synthesizing filtering from the buffer of each division level. That is to say, horizontal direction and vertical direction filtering can be performed simultaneously in parallel.

Thus, wavelet transformation can be performed at high speed for moving images and images with high resolution, as well.

Also, each type of synthesizing filtering is arranged to be performed by lifting, so the buffers for each level for storing the horizontal synthesizing filtering results, and coefficient buffers for storing a part of the intermediate vertical synthesizing filtering coefficients can be configured with a small capacity. Thus, these buffers can be built into the wavelet inverse transformation device, and accordingly there is no need to configure external memory.

Accordingly, there is no need to exchange data with external memory, and wavelet transformation can be performed at high speeds. Consequently, there is no need to raise the clock frequency in order to increase speed of data between the external memory and the wavelet inverse transformation device, thereby conserving electric power.

Further, with the wavelet transformation device and wavelet inverse transformation device according to an embodiment of the present invention, analysis filtering and synthesizing filtering is performed as soon as a predetermined number of frequency component coefficients are accumulated, so analysis filtering and synthesizing filtering can be effectively performed. That is to say, wavelet transformation and wavelet inverse transformation can be performed at high speed, so as to be capable of handling wavelet transformation and wavelet inverse transformation of video signals input at 60 fields per second, which is each picture being input at 1/60 seconds.

Thus, parallel processing per line is enabled in a later-described transmission system including encoding processing using wavelet transformation and decoding processing using wavelet inverse transformation, thereby obtaining a decoded image with little delay.

Also, a vertical synchronizing signal detecting arrangement is provided to the wavelet transformation device according to an embodiment of the present invention, and a vertical synchronizing signal insertion arrangement is provided to the wavelet inverse transformation device according to an embodiment of the present invention, so analysis filtering can be performed on video signals in increments of pictures (fields or frames) making up the video signals.

The embodiment of the present invention as described above relates to a device or method for performing wavelet transformation of images or video signals, and also relates to a device or method for performing wavelet inverse transformation wherein synthesizing filtering of band divided information is performed so as to restore into images or video signals. Various applications can be conceived for such a device or method.

That is to say, description has been made above regarding the wavelet transformation device 1 which performs wavelet transformation of images of video signals to divide image signals and video signals into multiple frequency components, and also a wavelet inverse transformation device 51 for performing wavelet inverse transformation of the frequency components generated by the wavelet transformation device 1, but wavelet transformation is widely used as pre-processing for image compression. Accordingly, description will now be made regarding an image encoding device for performing compression encoding of frequency components generated by wavelet transformation (hereafter also referred to as "coefficient data"), and an image decoding device for decoding the coefficient data subjected to compression encoding by the image encoding device.

Figure 23:
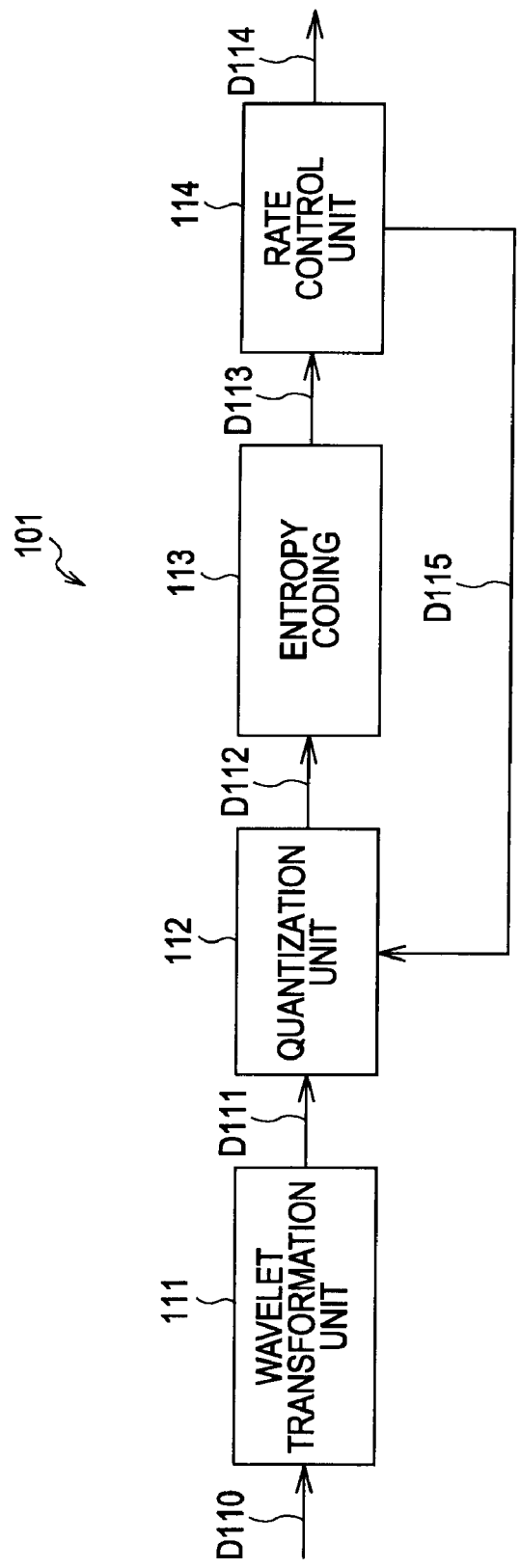
FIG. 23 is a diagram for illustrating a configuration example of an embodiment of an image encoding device to which an embodiment of the present invention has been applied.

FIG. 23 is a diagram illustrating a configuration example according to an embodiment of an image encoding device to which an embodiment of the present invention has been applied. With this image encoding device, wavelet transformation according to an embodiment of the present invention is performed as pre-processing for compression.

In the example shown in FIG. 23, the image encoding device 101 is configured of a wavelet transformation unit 111, a quantization unit 112, an entropy encoding unit 113, and a rate control unit 114.

The wavelet transformation unit 111 is configured basically in the same way as the wavelet transformation device 1 shown in FIG. 1. That is to say, the wavelet transformation device 111 has independent buffers for each division level (level 1 buffer 12 through level 4 buffer 15), and a coefficient buffer 17 for storing a part of coefficients intermediately through vertical analysis filtering, wherein, at the point that input video signals D110 (equivalent to image signals D10) being accumulated to a predetermined number of columns, horizontal analysis filtering is immediately performed on the video signals D110, and the coefficient data (frequency components) obtained as a result of the horizontal analysis filtering is stored in the buffers corresponding to each level. Upon the coefficient data which has been obtained as a result of the horizontal analysis filtering being accumulated to a predetermined number of lines of the buffers corresponding to each level, vertical analysis filtering is performed using the coefficient data of the results and the coefficient data in the coefficient buffer 17, a part of the coefficients intermediately during the vertical analysis filtering is stored in the coefficients buffer 17, the vertical analysis filtering results are taken as the input of the horizontal analysis filtering, and this process is repeated to a predetermined division level, with the post-analysis coefficient data D111 being supplied to the quantization unit 112.

For example, with the division level 2 analysis filtering, as shown in FIG. 16, wavelet transformation is performed of the four lines of 1LL generated by division level 1 analysis filtering, thereby yielding the two lines of 2LL, 2HL, 2LH, and 2HH. At the division level 3 analysis filtering, two lines of 2LL are subjected to wavelet transformation, thereby yielding one line of 3LL, 3HL, 3LH, and 3HH. In the event that the division level 3 is the final analysis filtering, 3LL is the lowest band.

Note that as described above with reference to FIG. 17, when inputting video signals, detecting vertical synchronizing signals (i.e., picture end) in the video signals stops the analysis filtering operations at the end of the picture, with wavelet transformation being performed for each picture.

The quantization unit 112 quantizes the coefficient data D111 generated by the wavelet transformation unit 111, by dividing by a quantization step size for example, thereby generating quantized coefficient data D112.

At this time, the quantization unit 112 takes, as a line block, an increment configured of one line worth of the lowest band frequency component generated (3LL in the case in FIG. 16) and multiple lines of other frequency components necessary for generating that one line, and can set the quantization step size for each such line block. This line block comprehensively includes the coefficients of all frequency components for a certain image region (in the case of FIG. 16, the 10 frequency components of 3LL through 1HH), so performing quantization for each line block enables the feature of wavelet transformation, which is the advantage of multiple resolution analysis, to be utilized. Also, only the number of line blocks needs to be determined for the entire screen, reducing the load on the image encoding device 101.

Further, energy of image signals generally is concentrated at the lowband components, and also, deterioration in lowband components tends to be more conspicuous to human visual perception, so quantization can be advantageously weighted such that the quantization step sizes of lowband component sub-bands are ultimately smaller. This weighting appropriates a relatively greater amount of information to the lowband comments, consequently improving the overall impression of image quality.

The entropy encoding unit 113 performs source coding on the quantized coefficient data D112 generated at the quantization unit 112, thereby generating compressed encoded code stream data D113. As for source coding, Huffman coding used with JPEG or MPEG (Moving Picture Experts Group), or even higher-efficiency arithmetic coding used with JPEG 2000, can be used.

Now, coefficients of which range to apply the entropy encoding to is an extremely important issue, directly related to compression efficiency. With the JPEG and MPEG methods for example, DCT (Discrete Cosine Transform) is performed on blocks of 8×8, and Huffman encoding is performed on the generated 64 DCT coefficients, thereby compressing the information. That is to say, the 64 DCT coefficients is the range of entropy encoding.

With the wavelet transformation unit 111, wavelet transformation is performed in increments of lines, unlike DCT which is performed on blocks of 8×8, so at the entropy encoding unit 113, source coding is performed independently for each frequency band, and for each P line within each frequency band.

One line is the minimum for P, but the fewer number of lines, the less reference information is required, meaning that the memory capacity can be reduced that much. Conversely, the more lines there are, the more information amount there is accordingly, so encoding efficiency can be improved. However, in the event that P exceeds the number of lines of the line block within the frequency bands, this will require lines of the next line block. Accordingly, the processing will need to wait for quantization coefficient data for this line block to be generated by wavelet transformation and quantization, and this wait time will become delay time.

Accordingly, if reducing delay time is desired, there is the need to keep P within the number of lines of the line block. For example, in the case shown in FIG. 16, for the frequency bands of 3LL, 3HL, 3LH, and 3LL, the number of lines of the line blocks is 1, so P=1. Also, for the sub-bands of 2HL, 2LH, and 2HH, the number of lines of the line blocks is 2, so P=1 or 2.

The rate control unit 114 performs control for ultimately matching the target bit rate or compression rate, and externally outputs the post-rate-control encoded code stream D114. For example, the rate control unit 114 transmits control signals D115 to the quantization unit 112 so as to reduce the quantization step size in the event of raising the bit rate, and increase the quantization step size in the event of lowering the bit rate.

Figure 24:
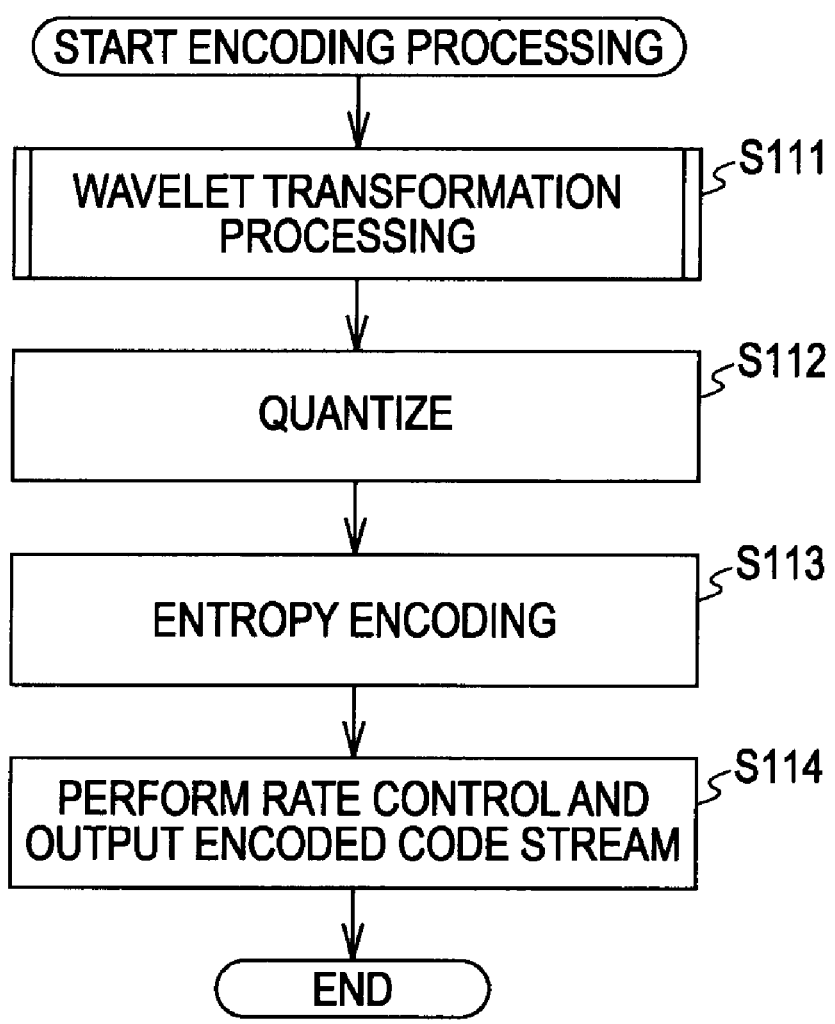
FIG. 24 is a flowchart for describing image encoding processing with the image encoding device shown in FIG. 23.

Next, the image encoding processing of the image encoding device 101 shown in FIG. 23 will be described with reference to the flowchart shown in FIG. 24.

Video signals D110 are input to the wavelet transformation unit 111 externally (e.g., from a later-described video camera unit 303 shown in FIG. 27). In step S111, the wavelet transformation unit 111 performs wavelet transformation processing on the image signals D110. Note that this wavelet transformation processing is processing which is performed for each picture from which a vertical synchronizing signal is detected form the video signals D110, in increments of lines, but the processing is generally the same as the wavelet transformation processing described above with reference to FIG. 2, so description thereof will be omitted.

With the wavelet transformation processing of step S111, at the point that input video signals D110 (equivalent to image signals Die) are accumulated to a predetermined number of columns, horizontal analysis filtering is immediately performed on the video signals D110, and the coefficient data (frequency components) obtained as a result of the horizontal analysis filtering is stored in the buffers corresponding to each level. Upon the coefficient data which has been obtained as a result of the horizontal analysis filtering being accumulated to a predetermined number of lines of the buffers corresponding to each level, vertical analysis filtering is performed using the coefficient data of the results and the coefficient data in the coefficient buffer 17, a part of the coefficients intermediately during the vertical analysis filtering is stored in the coefficients buffer 17, the vertical analysis filtering results are taken as the input of the horizontal analysis filtering, and this process is repeated to a predetermined division level, with the post-analysis coefficient data D111 being supplied to the quantization unit 112.

That is to say, as described above with reference to FIGS. 13 through 16, the wavelet transformation unit 111 performs filtering processing whereby coefficient data of one line of the lowest band can be obtained, multiple times in stages for all lines of the entire screen.

In step S112, the quantization unit 112 quantizes the coefficient data D111 generated by the wavelet transformation unit 111, by dividing by a quantization step size for example, thereby generating quantized coefficient data D112.

At this time, the quantization unit 112 takes, as a line block, an increment configured of one line worth of the lowest band frequency component generated (3LL in the case in FIG. 16) and multiple lines of other frequency components necessary for generating that one line, and sets the quantization step size for each such line block. That is to say, upon the predetermined number of lines being accumulated, the quantization unit 112 also performs quantization immediately, for each line block.

In step S113, the entropy coding unit 113 performs entropy encoding (source coding) of the quantization coefficient data D112 generated at the quantization unit 112, and generates a compressed encoded code stream D113.

Now, at the wavelet transformation unit 111, wavelet transformation is performed in increments of lines, so the entropy encoding unit 113 also performs source coding independently for each frequency band, and for each P line within each frequency band. That is to say, upon P lines (within the number of lines in a line block) being accumulated, the entropy encoding unit 113 also performs source coding immediately, for each line block.

In step S114, the rate control unit 114 performs rate control (i.e., control for ultimately matching the target bit rate or compression rate,) and externally outputs the post-rate-control encoded code stream D114.

As described above, with the image encoding device, wavelet transformation is performed in increments of lines, quantization is performed in increments of line blocks, and source coding is performed for every P lines which is a number within the number of lines in a line block, and the encoded code stream D114 which has been encoded for each P line, is externally output. That is to say, wavelet transformation processing, quantization processing, and source coding processing, can be operated in parallel in predetermined increments of lines.

Accordingly, in the event that encoded data encoded by the information encoding device is transmitted for example, data encoded every P lines is sequentially transmitted, so a decoded image can be obtained at the image decoding device which receives and decodes the encoded data (image decoding device 151 in FIG. 25), with little delay.

Figure 25:
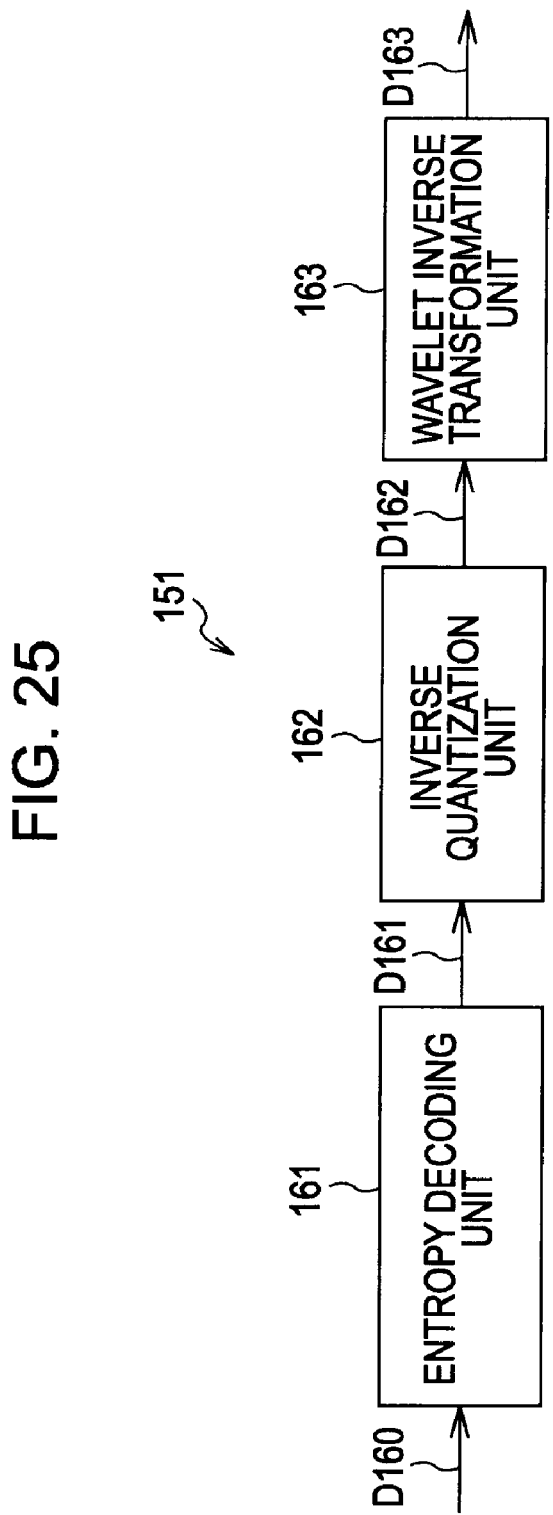
FIG. 25 is a diagram illustrating a configuration example of an embodiment of an image decoding device corresponding to the image encoding device shown in FIG. 23.

FIG. 25 is a diagram illustrating a configuration example according to an embodiment of an image decoding device, corresponding to the image encoding device.

In the example shown in FIG. 25, the image decoding device 151 is configured of an entropy decoding unit 161, an inverse quantization unit 162, and a wavelet inverse transformation unit 163.

The entropy decoding unit 161 performs source decoding on the input encoded code stream D160, and generates quantized coefficient data D161. As for source decoding, Huffman coding, or even higher-efficiency arithmetic coding, or the like can be used corresponding to the source coding performed by the image encoding device 101. In the event that source coding has been performed at the image encoding device 101 independently for each P line, the entropy decoding unit 161 also performs source decoding independently for each frequency band, and for each P line within each frequency band.

The inverse quantization unit 162 performs inverse quantization by multiplying the quantized coefficient data D161 by the quantization step size, thereby generating coefficient data D162. This quantization step size is normally described in the header of the encoded code stream or the like. Note that, in the event that the quantization step size is set at the image encoding device 101 for each line block as described above with reference to FIG. 23, the inverse quantization unit 162 correspondingly sets the inverse quantization step size for each line block, and performs inverse quantization.

The wavelet inverse transformation unit 163 is configured basically in the same way as the wavelet inverse transformation device 51 shown in FIG. 18. That is to say, the wavelet inverse transformation device 163 has independent buffers for each division level (level 3 buffer 61 through level 1 buffer 63), and a coefficient buffer 66 for storing a part of coefficients intermediately through vertical synthesizing filtering, wherein vertical synthesizing filtering and horizontal synthesizing filtering is performed on the coefficient data D162, a part of the coefficients obtained intermediately during the vertical synthesizing filtering are stored in the coefficient buffer 66, and coefficient data obtained as a result of the horizontal synthesizing filtering is stored in the buffers corresponding to each level. Upon the coefficient data being accumulated to a predetermined number in the buffers corresponding to each level, the wavelet inverse transformation device 163 immediately performs vertical synthesizing filtering and horizontal synthesizing filtering using the coefficient data of the results and the coefficient data in the coefficient buffer 66, which is repeated to level 1, thereby generating the baseband image. Further, the wavelet inverse transformation device 163 inserts vertical synchronizing signals in the baseband image so as to generate video signals D163, which are externally output.

Figure 26:
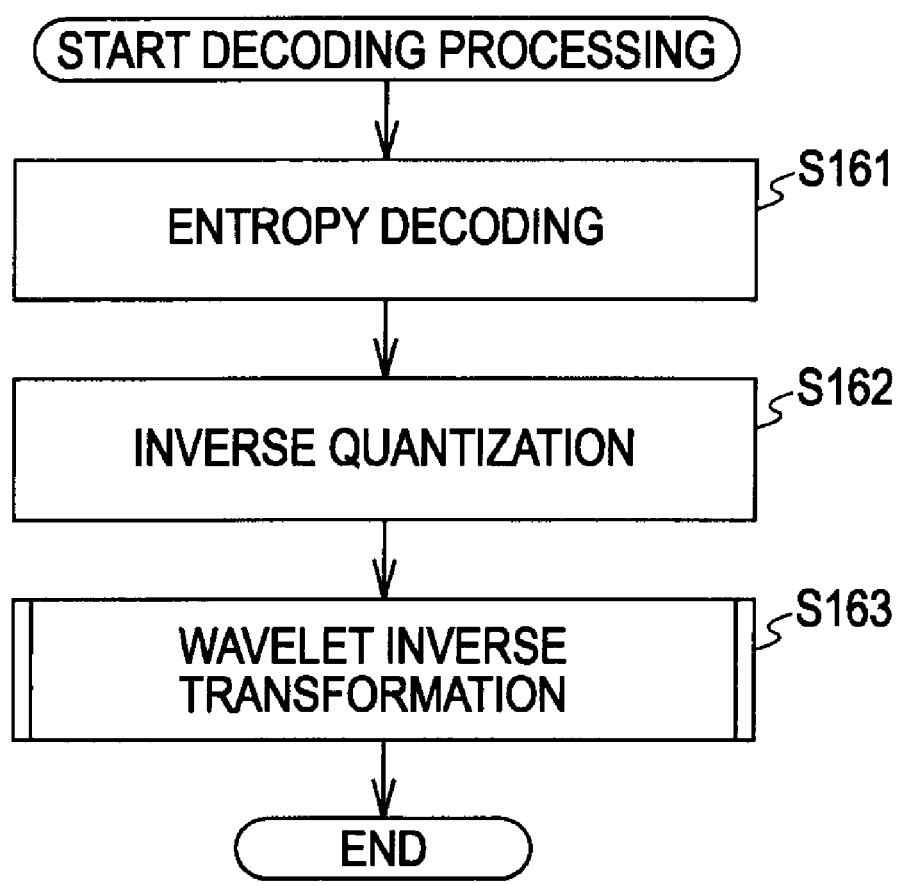
FIG. 26 is a flowchart for describing image decoding processing with the image decoding device shown in FIG. 25.

Next, the image decoding processing of the image decoding device 151 shown in FIG. 25 will be described with reference to the flowchart shown in FIG. 26.

The entropy decoding unit 161 has input thereto an encoded code stream D160 that has been encoded by the image encoding processing shown in FIG. 24, from an external source (e.g., from a digital decoding unit 313 shown in FIG. 27, which will be described later). In step S161, the entropy decoding unit 161 performs entropy decoding (source decoding) of the input encoded code stream D160, thereby generating quantized coefficient data D161.

At this time, source coding has been performed for each P line at the image encoding unit 101, so the entropy decoding unit 161 also performs source decoding independently for each frequency band, and for each P line within each subband.

The inverse quantization unit 162 performs inverse quantization by multiplying the quantized coefficient data D161 by the quantization step size, thereby generating coefficient data D162.

The quantization step size is set at the image encoding device 101 for each line block, so the inverse quantization unit 162 correspondingly sets the inverse quantization step size for each line block, and performs inverse quantization.

In step S163, the wavelet inverse transformation device 163 performs wavelet inverse transformation processing on the coefficient data D162. Note that this wavelet inverse transformation processing is processing which is performed in increments of lines, with vertical synchronizing signals being inserted following the image being generated, but the processing is generally the same as the wavelet inverse transformation processing described above with reference to FIG. 19, so description thereof will be omitted.

With the wavelet inverse transformation processing in step S163, vertical synthesizing filtering and horizontal synthesizing filtering is performed on the coefficient data D162, a part of the coefficients obtained intermediately during the vertical synthesizing filtering are stored in the coefficient buffer 66, and coefficient data obtained as a result of the horizontal synthesizing filtering is stored in the buffers corresponding to each level, wherein, upon the coefficient data stored in the buffers corresponding to each level being accumulated to a predetermined number, the wavelet inverse transformation device 163 immediately performs vertical synthesizing filtering and horizontal synthesizing filtering using the coefficient data of the results and the coefficient data in the coefficient buffer 66, which is repeated to level 1, thereby generating the baseband image. Further, the wavelet inverse transformation device 163 inserts vertical synchronizing signals in the baseband image so as to generate video signals D163, which are externally output (e.g., to a video camera unit 303 shown in FIG. 27, which will be described later).

That is to say, the image encoding device 101 performs wavelet transformation processing in increments of lines, so in the same way, the image decoding device 163 performs wavelet inverse transformation processing in increments of lines.

As described above, with the image decoding device 151, the input encoded code stream is subjected to source decoding for each P line, inverse quantization is performed in increments of line blocks, and wavelet inverse transformation is performed in increments of lines, thereby generating the baseband image. Vertical synchronizing signals are further inserted in the baseband image so as to generate video signals D163, which are externally output. That is to say, decoding processing, inverse quantization processing, and wavelet inverse transformation processing can be operated in parallel in predetermined increments of lines.

Accordingly, in the event that encoded data is transmitted, encoded data which is sequentially transmitted is decoded every P lines and generated in increments of lines, so a decoded image can be obtained with little delay.

As described above, the processing of each of the image encoding device 101 and image decoding device 151 described with reference to FIGS. 23 and 25 can be operated in parallel in increments of lines, whereby image compression encoding and decoding processing can be performed with less delay.

Next, examples of applying the image encoding device 101 and image decoding device 151 described with reference to FIGS. 23 and 25 to various systems will be described.

Figure 27:
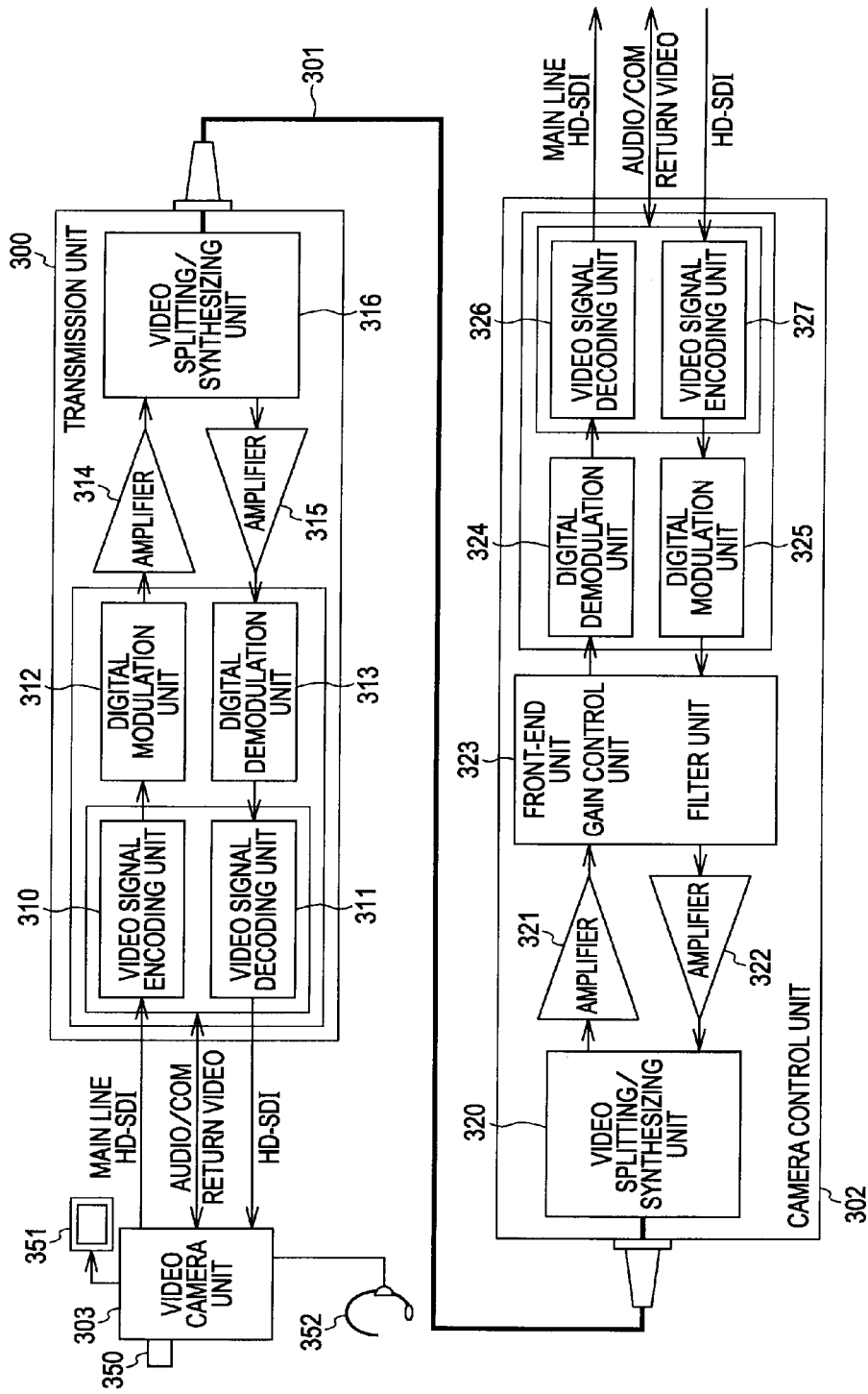
FIG. 27 is a block diagram illustrating the configuration of an example of a digital triax system to which an embodiment of the present invention has been applied.

FIG. 27 illustrates the configuration of an example of a digital triax system to which the image encoding including the wavelet transformation, and image decoding including the wavelet inverse transformation, according to an embodiment of the present invention, can be applied.

A triax system is a system used in television broadcasting stations, production studios, and so forth. With such a system, at the time of recording in the studio or broadcasting live from a remote location, a single triaxial cable connecting a video camera and a camera control unit or a switcher is used to transmit multiplex signals such as picture signals, audio signals, return picture signals, synchronizing signals, and so forth, and also to supply power.

Many known triax systems have been arranged to transmit the above-described signals in the form of analog signals. On the other hand, in recent years, entire systems are becoming digital, and accordingly, triax systems used in television broadcasting stations are also becoming digital.

With known digital triax systems, the digital video signals transmitted over the triax cable have been uncompressed video signals. The reason for this is that the specs demanded regarding signal delay time are particularly severe with television broadcasting stations; basically, the delay time from shooting to monitor output, for example, is required to be within one field (16.67 msec). Compression encoding systems such as MPEG2 and MPEG4 which have realized high compression rates and high image quality have not been used in triax systems since time equivalent to several frames worth is required for video signal compression and encoding, and decoding of compressed video signals, meaning that delay time is great.

Image encoding including the wavelet transformation, and image decoding including the wavelet inverse transformation, according to an embodiment of the present invention, is capable of parallel operations for the horizontal filtering and vertical filtering as described above with reference to FIGS. 2 and 19, and also is capable of parallel operations due to operations being performed in increments of lines, as described above with reference to FIGS. 24 and 26; accordingly, the delay time from image data input till obtaining of an output image can be reduced, such that application can be made to a digital triax system.

The digital triax system shown in FIG. 27 is configured with a transmission unit 300 and camera control unit 302 connected via a triax cable (triaxial cable) 301. Digital video signals and digital audio signals (hereafter referred to as "main line signals") from the transmission unit 300 to the camera control unit 302 which are actually broadcast, or used as contents, and intercom audio signals and return digital video signals from the camera control unit 302 to the transmission unit 300, are transmitted over the triax cable 301.

The transmission unit 300 is built into an unshown video camera device, for example. Of course, other arrangements may be made, such as the transmission unit 300 being connected to the video camera device as an external device of the video camera device. The camera control unit 302 may be a device commonly called a CCU (Camera Control Unit), for example.

Digital audio signals have little bearing on the essence of the present invention, so description thereof will be omitted for the sake of simplicity in description.

The video camera unit 303 is configured within an unshown video camera device for example, and performs photoreception with an unshown image-taking device such as a CCD (Charge Coupled Device), of light from a subject that has been taken in via an optical system 350 including a lens, focusing mechanism, zooming mechanism, iris adjusting mechanism, and so forth. The image-taking device converts the received light into electrical signals by photoelectric conversion, and further performs predetermined signals processing, so as to output as baseband digital video signals. These digital video signals are mapped to an HD-SDI (High Definition Serial Data Interface) format for example, and output.

Also connected to the video camera unit 303 are a display unit 351 used as a monitor, and an intercom 352 used for exchanging audio externally.

The transmission unit 300 has a video signal encoding unit 310 and video signal decoding unit 311, digital modulation unit 312 and digital demodulation unit 313, amplifiers 314 and 315, and a video splitting/synthesizing unit 316.

Baseband digital video signals mapped to the HD-SDI format for example, and supplied from the video camera unit 303 to the transmission unit 300. The digital video signals are compressed and encoded at the video signal encoding unit 310 so as to become a code stream, which is supplied to the digital modulation unit 312. The digital modulation unit 312 modulates the supplied code stream into a format suitable for transmission over the triax cable 301, and outputs. The signals output from the digital modulation unit 312 are supplied to the video splitting/synthesizing unit 316 via an amplifier 314. The video splitting/synthesizing unit 316 sends the supplied signals to the triax cable 301. These signals are received at the camera control unit 302 via the triax cable 302.

The signals output from the camera control unit 302 are received at the transmission unit 300 via the triax cable 301. The received signals are supplied to the video splitting/synthesizing unit 316, and the portion of digital video signals and the portion of other signals are separated. Of the received signals, the portion of the digital video signals is supplied via an amplifier 315 to the digital demodulation unit 313, the signals modulated into a format suitable of transmission over the triax cable 301 are demodulated at the camera control unit 302 side, and the code stream is restored.

The code stream is supplied to the video signal decoding unit 311, the compression coding is decoded, and the baseband digital video signals are obtained. The decoded digital video signals are mapped to the HD-SDI format and output, and supplied to the video camera unit 303 as return digital video signals. The return digital video signals are supplied to the display unit 351 connected to the video camera unit 303, and used for monitoring by the camera operator.

The cameral control unit 302 has a video splitting/synthesizing unit 320, amplifiers 321 and 322, a front-end unit 323, a digital demodulation unit 324 and digital modulation unit 325, and a video signal decoding unit 326 and video signal encoding unit 327.

Signals output from the transmission unit 300 are received at the camera control unit 302 via the triax cable 301. The received signals are supplied to the video splitting/synthesizing unit 320. The video splitting/synthesizing unit 320 supplies the signals supplied thereto to the digital demodulation unit 324 via the amplifier 321 and front end unit 323. Note that the front end unit 323 has a gain control unit for adjusting gain of input signals, a filter unit for performing predetermined filtering on input signals, and so forth.

The digital demodulation unit 324 demodulates the signals modulated into a format suitable of transmission over the triax cable 301 at the transmission unit 300 side, and restores the code stream. The code stream is supplied to the video signal decoding unit 326 where compression encoding is decoded, so as to obtain the baseband digital video signals. The decoded digital video signals are mapped to the HD-SDI format and output, and externally output as main line signals.

The return digital video signals and digital audio signals are supplied externally to the camera control unit 302. The digital audio signals are supplied to the intercom 352 of the camera operator for example, to be used for transmitting external audio instructions to the camera operator.

The return digital video signals are supplied to the video signal encoding unit 327 and compression encoded, and supplied to the digital modulation unit 325. The digital modulation unit 325 modulates the supplied code stream into a format suitable for transmission over the triax cable 301, and outputs. The signals output from the digital modulation unit 325 are supplied to the video splitting/synthesizing unit 320 via the front end unit 323 and amplifier 322. The video splitting/synthesizing unit 320 multiplexes these signals with other signals, and sends out to the triax cable 301. The signals are received at the transmission unit 300 via the triax cable 301.

In the example shown in FIG. 27, the image encoding device 101 in FIG. 23 and the image decoding device 151 shown in FIG. 25 are respectively applied to the video signal encoding units 310 and 327, and the video signal decoding units 311 and 326. That is to say, the video signal encoding units 310 and 327 are basically configured the same as with the image encoding device 101 in FIG. 23, and video signal decoding units 311 and 326 are basically configured the same as with the image decoding device 151 in FIG. 25.

That is to say, at the transmission unit 300 side, the video signal encoding unit 310 performs the wavelet transformation and entropy encoding described above with reference to FIG. 24, on the digital video signals supplied thereto, and outputs a code stream. As described above with reference to FIGS. 13 through 16, upon a number of lines corresponding to the number of taps of the filter used for wavelet transformation and according to the number of division levels of wavelet transformation being input, the video signal encoding unit 310 starts wavelet transformation. Further, as described above with reference to FIGS. 24 and 26, upon coefficient data necessary for the components being accumulated at the image encoding device and image decoding device, processing is sequentially performed by the components. Upon processing ending to the bottom line of one frame or one field, processing of the next one frame or one field is started.

As described above, with the image encoding device 101 and image decoding device 151 shown in FIGS. 23 and 25, the components thereof perform processing in parallel, so the image encoding device 101 and image decoding device 151 can suppress delay of output of pictures taken by the video camera unit 303 from the camera control unit 302, and delay of return digital video signals supplied externally and transmitted from the cameral control unit 302 to the video camera unit 303, and accordingly are advantageously used in the digital triax system shown in FIG. 27.

This also holds true for transmitting return digital video signals from the camera control unit 302 side to the transmission unit 300 side. That is to say, the above-described wavelet transformation and entropy encoding in FIG. 24 is performed on the externally supplied return digital video signals by the video signal encoding unit 327, and a code stream is output.

Now, there are many cases wherein it is permissible for the return digital video signals to be of a lower image quality than the digital video signals of the main line signals. In this case, the bit rate at the time of encoding at the video signal encoding unit 327 can be lowered.

For example, the video signal encoding unit 327 performs control with the rate control unit 114 such that the bit rate of entropy encoding processing at the entropy encoding unit 113 is lower. Also, an arrangement can be conceived, wherein, for example, at the camera control unit 302 side, transformation processing is performed to a higher division level with the wavelet transformation unit 111 at the video signal encoding unit 327, and at the transmission unit 300 side, the wavelet inverse transformation at the wavelet inverse transformation unit 163 of the video signals encoding unit 311 is stopped at a lower division level. Processing at the video signal encoding unit 327 of the camera control unit 302 is not restricted to this example; and various other types of processing can be conceived, such as keeping the division level for wavelet transformation low so as to alleviate the load of transformation processing.

Figure 28:
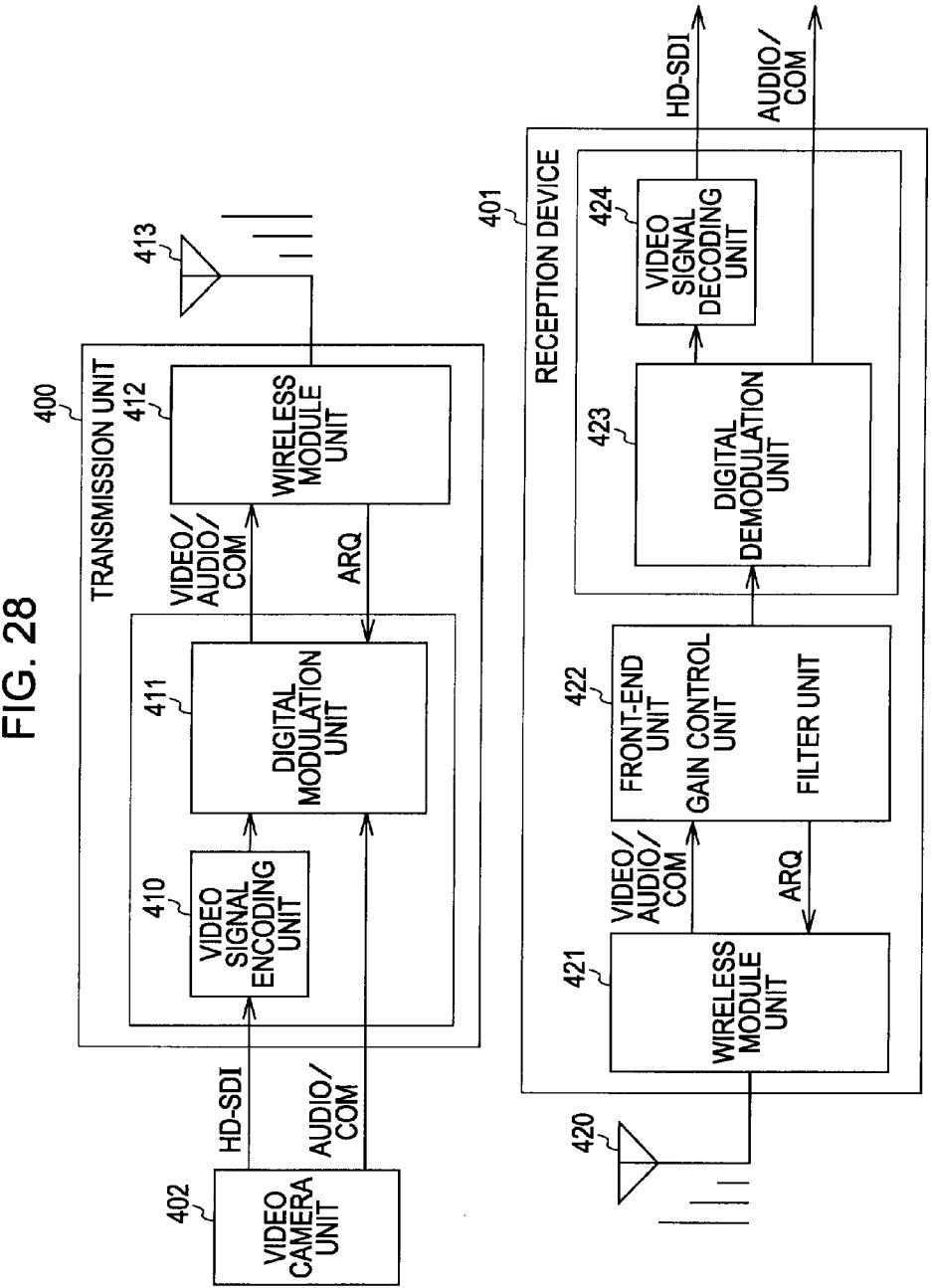
FIG. 28 is a block diagram illustrating the configuration of an example of a wireless transmission system to which an embodiment of the present invention has been applied.

FIG. 28 illustrates the configuration of an example of a wireless transmission system to which the image encoding including the wavelet transformation, and image decoding including the wavelet inverse transformation, according to an embodiment of the present invention, can be applied. That is to say, with the example shown in FIG. 28, transmission of coded data encoded at the image encoding device including the wavelet transformation according to an embodiment of the present invention, to an image decoding device side, is performed wirelessly.

Note that in the example in FIG. 28, video signals are transmitted unidirectionally from the video camera or transmission unit 400 side (hereafter abbreviated as "transmission unit 400 ") to the reception device 401 side. Bidirectional communication between the transmission unit 400 and reception unit 401 can be performed for audio signals and other signals.

The transmission unit 400 is built into an unshown video camera device having a video camera unit 402, for example. Of course, other arrangements may be made, such as the transmission unit 400 being connected to the video camera device as an external device of the video camera device having the video camera unit 402.

The video camera unit 402 has a predetermined optical system, an image-taking device such as a CCD, and a signal processing unit for outputting signals output from the image-taking device as digital video signals, for example. These digital video signals are mapped to an HD-SDI format for example, and output from the video camera unit 402, for example. Of course, the digital video signals output from the video camera unit 402 are not restricted to this example, and may be of other formats as well.

The transmission unit 400 has a video signal encoding unit 410, digital modulation unit 411, and a wireless module unit 412. The video signal encoding unit 410 is configured basically in the same way as the image encoding device 101 shown in FIG. 23.

At the transmission unit 400, the baseband digital video signals mapped to the HD-SDI format for example, and output. The digital video signals are subjected to wavelet transformation and compression encoding by entropy encoding described above with reference to FIG. 24 at the video signal encoding unit 410, so as to become a code stream which is supplied to the digital modulation unit 411. The digital modulation unit 411 performs digital modulation of the supplied code stream into signals of a format suitable for wireless communication, and outputs.

Also, digital audio signals and other signals, such as predetermined commands and data for example, are also supplied to the digital modulation unit 411. For example, the video camera unit 402 has a microphone whereby collected sound is converted into audio signals, and further the audio signals are subjected to A/D conversion and output as digital audio signals. Further, the video cameral unit 402 is capable of outputting certain commands and data. The commands and data may be generated within the video camera unit 402, or an operation unit may be provided to the video camera unit 402 with the commands and data being generated in response to user operations made at the operating unit. Also, an arrangement may be made wherein an input device, for inputting commands and data, is connected to the video camera unit 402.

The digital modulation unit 411 performs digital modulation of these digital audio signals and other signals, and outputs. The digital modulated signals output from the digital modulation unit 411 are supplied to the wireless module unit 412 and wirelessly transmitted from an antenna 413 as airwaves.

Upon receiving an ARQ (Auto Repeat Request) from the reception unit 401 side, the wireless module unit 412 makes notification of this ARQ to the digital modulation unit 411, so as to request a data resend.

The airwaves transmitted from the antenna 413 are received at an antenna 420 of the reception device 401 side, and supplied to a wireless module unit 421. The reception device 401 has the wireless module unit 421 front end unit 422, digital demodulation unit 423, and video signal decoding unit 424. The video signal decoding unit 424 is basically configured the same way as with the image decoding unit 151 shown in FIG. 25.

The wireless module unit 421 supplies digital modulated signals based on the received airwaves to the front end unit 422. The front end unit 422 performs predetermined signal processing such as gain control to the supplied digital modulated signals, for example, and supplies to the digital demodulation unit 423. The digital demodulation unit 423 demodulates the supplied digital modulated signals, and restores the code stream.

The code stream restored at the digital demodulation unit 423 is supplied to the video signal decoding unit 424, the compressed encoding is decoded with the decoding method described above with reference to FIG. 26, and the baseband digital video signals are obtained. The decoded digital video signals are mapped to the HD-SDI format for example, and output.

The digital demodulation unit 423 is also supplied with the digital audio signals and other signals subjected to digital modulation at the transmission unit 400 side and transmitted. The digital demodulation unit 423 demodulates the signals wherein these digital audio signals and other signals have been subjected to digital modulation, and restores and outputs the digital audio signals and other signals.

Also, the front end unit 422 performs error detection according to a predetermined method regarding the received signals supplied from the wireless module unit 421, and in the event that an error is detected such as an erroneous frame having been received for example, outputs an ARQ. The ARQ is supplied to the wireless module unit 421, and transmitted form the antenna 420.

With such a configuration, the transmission unit 400 is built into a relatively small-sized video camera device having a video camera unit 402 for example, a monitor device is connected to the reception device 401, and the digital video signals output from the video signal decoding unit 424 are supplied to the monitor device. As long as the reception device 401 is within the airwave range of the airwaves transmitted from the video camera device having the built-in transmission unit 400, the pictures taken with the video camera device can be watched on the monitor device with little delay, e.g., with a delay within one field or one frame.

Note that in the example shown in FIG. 28, communication between the transmission unit 400 and the reception device 401 is performed using wireless communication, so as to transmit video signals via wireless communication, but this arrangement is not restricted to this example. For example, the transmission unit 400 and the reception device 401 may be connected via a network such as the Internet. In this case, the wireless module unit 412 at the transmission unit 400 side and the wireless module unit 421 at the reception device side 401 side are each communication interfaces capable of communication using IP (Internet Protocol).

Various applications can be conceived for the wireless transmission system shown in FIG. 28. For example, this wireless transmission system can be applied to a videoconferencing system. An example of an arrangement would be to connect a simple video camera device capable of USB (Universal Serial Bus) connection to a computer device such as a personal computer, with the computer device side implementing the video signal encoding unit 410 and video signal decoding unit 424. The video signal encoding unit 410 and video signal decoding unit 424 implemented at the computer device may be a hardware configuration, or may be realized by software running on the computer device.

For example, each of the members participating in the videoconference would be provided with a computer device and a video camera device to be connected to the computer device, with the computer device being connected to a server device for providing the videoconference system service, by either cable or wireless network. Video signals output from the video camera device are supplied to the computer device via USB cable, and the encoding processing described above with reference to FIG. 24 is performed at the video signal encoding unit 410 within the computer device. The computer device transmits the code steam wherein the videos signals have been encoded, to the server device or the like, via the network.

The server device transmits the received code stream to the computer device of each of the participating members, via the network. This code stream is received at the computer device of each of the participating members, and is subjected to the decoding processing at the video signal decoding unit 424 within the computer device described above with reference to FIG. 26. The image data output from the video signal decoding unit 424 is displayed on the display unit of the computer device as a picture.

That is to say, video pictures taken by the video camera devices of the other participating members are displayed on the display units of the computer devices of each of the participating members. Accordingly, applying an embodiment of the present invention to the wireless transmission system means that the delay time from encoding video signals taken with a video camera device to decoding thereof at the computer device of other participating members is short, so the unnatural sensation of the pictures of other participating members being displayed on the display units of the computer devices of the participating members being delayed, can be reduced.

Further, an arrangement can be conceived wherein the video signal encoding unit 410 is installed at the video camera device side for example, the transmission unit 400 is built into a video camera device. Such a configuration does away with the need for the video camera device to be connected to another device such as a computer device or the like.

Such a system mode up of the video camera device with the transmission unit 400 built in, and the reception device 401, can be applied to various applications other than the above-described videoconferencing system. For example, as schematically shown in FIG. 29, this system can be applied to a home gaming console. In FIG. 29, the transmission unit 400 shown in FIG. 28 is built into a video camera device 500.

In the main unit 501 of the home gaming console, a bus for example connects a CPU, RAM, ROM, a disk drive device compatible with CD-ROMs (Compact Disc Read Only Memory) and DVD-ROMs (Digital Versatile Disc-ROM), a graphics control unit for converting display control signals generated by the CPU into vide signals and outputting, an audio playback unit for playing audio signals, and so forth, i.e., having a configuration generally like that of a computer device.

The main unit 501 of the home gaming console is controlled overall by the CPU, following programs stored in the ROM beforehand, or programs recorded in a CD-ROM or DVD-ROM mounted to the disk drive device. The RAM is used as work memory for the CPU. The main unit 501 of the home gaming console has built in the reception device 401. digital video signals output from the reception device 401, and other signals, are supplied to the CPU via the bus, for example.

Let us say that with such a system, e.g., the main unit 501 of the home gaming console, software is running which can take images in the form of digital video signals supplied externally, as images within the game. For example, this game software is capable of using images in the form of digital video signals supplied externally as images within the game, and also recognize the movements of persons (players) within the image, and perform operations corresponding to the recognized motions. The video camera device 500 encodes the shot digital video signals with the encoding method described above with reference to FIG. 24 at the video signal encoding unit 410 within the built-in transmission unit 400, modulates the code stream and the digital modulation unit 411 and supplies to the wireless module unit 412, so as to be transmitted from the antenna 413. The transmitted airwaves are received at the antenna 420 of the reception device 401 built into the main unit 501 of the home gaming console, the received signals being supplied to the digital demodulation unit 423 via the wireless module unit 421 and the front end unit 422.

The received signals are demodulated at the digital demodulation unit 423 into a code stream, and supplied to the video signal decoding unit 424. The video signal decoding unit 424 decodes the supplied code stream with the decoding method described above with reference to FIG. 26, and outputs the baseband digital video signals.

The baseband digital video signals output from the video signals decoding unit 424 are sent over the bus in the main unit 501 of the home gaming console, and temporarily stored in the RAM, for example. Upon the digital video signals stored in the RAM being read out following a predetermined program, the CPU can detect movement of persons within the image provided by the digital video signals, and use the image within the game.

Due to the delay time, from the images being shot with the video camera device 500 and the obtained digital video signals being encoded to the code stream being decoded at the main unit 501 of the home gaming console and the images being obtained thereat, being short, responsivity of the game software running on the main unit 501 of the home gaming console as to the movement of the player improves, thereby improving operability of the game.

Note that such a video camera device 500 used with a home gaming console often has a simple configuration due to restrictions on price, size, and so forth, and assumptions must be made that a CPU with high processing capabilities and large-capacity memory may be unaffordable. Accordingly, using the encoding processing including the wavelet transformation processing according to an embodiment of the present invention allows for operation with a small memory capacity, since there is no need for large-capacity external memory. Also, an arrangement may be conceived wherein wavelet transformation is performed at a low division level at the video signal encoding unit 410 of the transmission unit 400 built into the video camera device 500. This further reduces the need for memory capacity.

Note that the video camera device 500 and the main unit 501 of the home gaming console have been described above as being connected by wireless communication, but this arrangement is not restricted to this example. That is to say, the video camera device 500 and the main unit 501 of the home gaming console may be connected by cable, via interfaces such as USB, IEEE 1394, or the like.

The present invention has been described above by way of embodiments, whereby it is apparent that a wide range of applications thereof can be made as long as belonging to a device or method for performing wavelet transformation of images or video signals, and a device or method for performing wavelet inverse transformation for synthesizing filtering of band-analyzed information so as to restore image or video signals.

That is to say, embodiments of the present invention are advantageously applied to devices or systems, wherein image signals or images of video signals are compressed, transmitted received, decompressed, and output, as described above with reference to FIGS. 27 through 29, by providing an encoding arrangement is provided downstream of the wavelet transformation, as with the image encoding device 101 shown in FIG. 23. Embodiments of the present invention are particularly advantageous with devices or systems wherein short delay from compression encoding to decoding and output of images is demanded.

Another application is remote medical diagnosis and treatment using remotely operable instruments or devices, while viewing images taken with a video camera, for example.

Another application is compression encoding and transmission of digital video signals, and decoding of digital video signals subjected to compression encoding, in systems such as used in broadcasting stations and the like.

Another application is to systems for distributing video of live coverage.

Another application is to remote educational systems, wherein students and teachers can communicate interactively.

Further applications include, but are not restricted to, systems for transmitting image data taken with mobile terminals having image-taking functions, such as cellular phones with camera functions; videoconferencing systems; surveillance systems for recording images taken with a monitoring camera with a recorder; wireless image transmission systems; interactive gaming applications; and so forth.

The series of processing in these various applications can be realized by hardware or by software, as with the case illustrated in FIG. 29.

In the case of realizing the series of processing by software, a program making up the software is installed in a computer which has dedicated hardware built in, or installed in a general-purpose computer for example, capable of executing various functions by various types of programs being installed therein, from a program recording medium.

FIG. 30 is a block diagram illustrating an example of the configuration of a personal computer 701 for executing the above-described series of processing with a software program. A CPU 711 executes various types of programs according to programs stored in ROM 712 or a storage unit 718. RAM 713 stores programs and data used by the CPU 711 as necessary. The CPU 711, ROM 712, and RAM 713 are mutually connected by a bus 714.

An input/output interface 715 is also connected to the CPU 711 via the bus 714. Connected to the input/output interface 715 are an input unit 716 including a keyboard mouse, microphone, and so forth, and an output unit 717 including a display, speaker, and so forth. The CPU 711 executes various types of processing in response to commands input form the input unit 716. The CPU 711 outputs the results of processing to the output unit 717.

The storage unit 718 connected to the input/output interface 715 is configured of a hard disk for example, and stores various types of programs and data which the CPU 711 executes or uses. A communication unit 719 communicates with external devices via a network such as the Internet, a Local Area Network, or the like.

Programs may also be obtained via the communication unit 719 and stored in the storage unit 718.

A drive 720 connected to the input/output interface 715 drives a removable media 721 mounted thereto, such as a magnetic disk optical disk magneto-optical disk, semiconductor memory, or the like, so as to obtain programs or data recorded therein. The programs and data obtained are transferred to the storage unit 718 as necessary and stored.

A program recording medium for storing programs which are installed in the computer in a computer-executable form includes the removable media 721 shown in FIG. 30 which is packaged media including magnetic disks (including flexible disks), optical disks (including CD-ROM and DVD), magneto-optical disks, semiconductor memory, etc., the ROM 712 where programs or temporarily or permanently stored, a hard disk making up the storage unit 718, and so forth. Storing of programs to the program recording medium can also be performed using wire or wireless communication media such as a Local Area Network, the Internet, digital satellite broadcast, etc., via the communication unit 719 serving as an interface with a router, modem, etc., as necessary.

While the steps describing the program stored in the program recording medium in the present specification may of course be performed in the time-sequence described of course, but is not restricted to this time-sequence, and may be executed in parallel, or individually.

Further, the term "system" as used in the present Specification refers to the entirety of equipment configured of multiple devices.

It should be understood by those skilled in the art that various modifications, combinations, sub-combinations and alterations may occur depending on design requirements and other factors insofar as they are within the scope of the appended claims or the equivalents thereof.

What is claimed is:

1. A wavelet transformation device for performing wavelet transformation at a plurality of division levels as to image signals, the wavelet transformation device comprising:
    a first buffer comprising a plurality of buffers which are independent for each division level for storing, for each of the levels, coefficients from results of analysis filtering in a horizontal direction of the image signals;
    a second buffer coupled to vertical filtering means for storing, independently for each of the levels, coefficients generated in a computation process of analysis filtering in a vertical direction of the image signals;
    vertical filtering means for performing the vertical direction analysis filtering, using coefficients read out from the first and second buffers; and
    horizontal filtering means for performing analysis filtering in the horizontal direction, using coefficients from the results of the vertical direction analysis filtering as the input of the horizontal direction analysis filtering for the next level, except for the final level of the levels.

2. The wavelet transformation device according to claim 1, wherein the horizontal filtering means and the vertical filtering means are realized by a lifting scheme of the wavelet transformation.

3. The wavelet transformation device according to claim 2, wherein,
    the lifting scheme is a scheme wherein horizontal direction analysis filtering is performed divided into a plurality of stages of computations, and
    the horizontal filtering means perform horizontal direction analysis filtering for a preset number of columns with the lifting scheme.

4. The wavelet transformation device according to claim 3, wherein the horizontal filtering means further comprise:
    holding means for holding a part of coefficients obtained in the process of the plurality of stages of computation with the lifting scheme, and generating coefficients of highband components and lowband components by performing the plurality of stages of computation to the final stage, wherein,
    in the event of performing horizontal direction analysis filtering for the next stage, only a necessary columns worth of the coefficients from vertical direction analysis filtering results from the vertical filtering means are input,
    coefficients held in the holding means in the process of the plurality of stages of computation by the previous lifting scheme are read out, and
    the plurality of stages of computation with the lifting scheme are performed.

5. The wavelet transformation device according to claim 4, wherein the horizontal filtering means perform horizontal direction analysis filtering with the lifting scheme until the number of columns in the horizontal direction are all gone.

6. The wavelet transformation device according to claim 4, wherein,
    the number of columns input to the lifting scheme at once is three columns, and
    the number of coefficients held in the holding means is three.

7. The wavelet transformation device according to claim 4, wherein the horizontal filtering means store highband component and lowband component coefficients, generated by performing the plurality of stages of computation with the lifting scheme to the final stage, in the first buffer corresponding to the level.

8. The wavelet transformation device according to claim 2, wherein,
    the lifting scheme is a scheme for performing vertical direction analysis filtering in multiple stages of computation, and
    the vertical filtering means perform a preset number of lines worth of vertical direction analysis filtering with the lifting scheme.

9. The wavelet transformation device according to claim 8, wherein,
    the vertical filtering means generate highband component and lowband component coefficients by storing, in the second buffer, a part of coefficients obtained in the process of the plurality of stages of computation with the lifting scheme, and performing the plurality of stages of computation to the final stage,
    when performing vertical direction analysis filtering for the next stage, only a necessary number of lines of the coefficients from horizontal direction analysis filtering results from the horizontal filtering means are read out from the first buffer,
    coefficients stored in the second buffer in the process of the plurality of stages of computation with the previous lifting scheme are read out, and
    the plurality of stages of computation with the lifting scheme are performed.

10. The wavelet transformation device according to claim 9, wherein the vertical filtering means perform vertical direction analysis filtering with the lifting scheme until the number of lines in the vertical direction are all gone.

11. The wavelet transformation device according to claim 9, wherein the number of lines read out from the first buffer is three lines, and the number of coefficients stored in the second buffer is three.

12. The wavelet transformation device according to claim 9, wherein the first buffer is configured having within itself independent buffers of as many lines as necessary for performing the vertical direction analysis filtering.

13. The wavelet transformation device according to claim 9, wherein the second buffer is configured having within itself independent buffers of as many coefficients necessary for performing the plurality of stages of computation.

14. The wavelet transformation device according to claim 1, wherein,
the horizontal filtering means input the image signals in increments of lines, and perform horizontal direction analysis filtering each time the number of samples in the horizontal direction reaches a predetermined number, and
the vertical filtering means perform the vertical direction analysis filtering each time the number of lines in the vertical direction of the frequency component in the results of the horizontal direction analysis filtering performed by the horizontal filtering means reach a predetermined number.

15. The wavelet transformation device according to claim 1, wherein the horizontal filtering means and the vertical filtering means perform analysis filtering on the lowest frequency components in a hierarchical manner.

16. The wavelet transformation device according to claim 1, wherein,
the image signals are video signals comprising a plurality of pictures,
the wavelet transformation device further comprises detecting means for detecting the end of each picture by detecting vertical synchronization signals of the video signals, and
the horizontal filtering means and the vertical filtering means perform analysis filtering for each picture.

17. A wavelet transformation method of a wavelet transformation device for performing wavelet transformation at a plurality of division levels as to image signals, the method comprising:
storing coefficients from results of analysis filtering in a horizontal direction in a plurality of first buffers which are independent for each of the division levels;
storing coefficients generated in a process of computation of analysis filtering in a vertical direction in second buffers independent for each of the levels;
performing vertical direction analysis filtering, using coefficients read out from the first and second buffers; and
taking coefficients from the results of the vertical direction analysis filtering as the input of the horizontal direction analysis filter for the next level, except for the final level of the levels.

18. A non-transitory, computer-readable storage medium having stored thereon a program for causing a computer to execute processing of wavelet transformation at a plurality of division levels as to image signals, the processing comprising:
storing coefficients from results of analysis filtering in a horizontal direction in a plurality of first buffers which are independent for each of the division levels;
storing coefficients generated in a process of analysis filtering in a vertical direction of the image signals in second buffers independent for each of the levels;
performing vertical direction analysis filtering, using coefficients read out from the first and second buffers; and
taking coefficients from the results of the vertical direction analysis filtering as the input of the horizontal direction analysis filter for the next level, except for the final level of the levels.

19. A wavelet inverse transformation device for performing wavelet inverse transformation at a plurality of division levels as to frequency components, generated by wavelet transformation having been performed as to image signals, thereby reconstructing an image, the wavelet inverse transformation device comprising:
a first buffer comprising a plurality of buffers which are independent for each division level for storing, independently for each of the levels except for a lowest band, coefficients from results of synthesizing filtering in a horizontal direction of the frequency components;
a second buffer coupled to vertical filtering means for storing, independently for each of the levels, coefficients generated in the computation process of synthesizing filtering in a vertical direction as to the frequency components;
vertical filtering means for performing the vertical direction synthesizing filtering, using coefficients read out from the first and second buffers; and
horizontal filtering means for performing synthesizing filtering in the horizontal direction, using coefficients from the results of the vertical direction synthesizing filtering as the input of the horizontal direction synthesizing filtering for the next level, except for the final level of the levels.

20. The wavelet inverse transformation device according to claim 19, wherein the vertical filtering means and the horizontal filtering means are realized by a lifting scheme of the wavelet inverse transformation.

21. The wavelet inverse transformation device according to claim 20, wherein,
the lifting scheme is a scheme wherein vertical direction synthesizing filtering is performed divided into a plurality of stages of computations, and
the vertical filtering means perform vertical direction synthesizing filtering for a preset number of lines with the lifting scheme.

22. The wavelet inverse transformation device according to claim 21, wherein,
the vertical filtering means store, in the second buffer, a part of coefficients obtained in the process of the plurality of stages of computation with the lifting scheme, and generate the image by performing the plurality of stages of computation to the final stage, and
in the event of performing vertical direction synthesizing filtering for the next stage, only a necessary number of lines of the coefficients from horizontal direction synthesizing filtering results from the horizontal filtering means are read out,
coefficients stored in the second buffer in the process of the plurality of stages of computation with the lifting scheme above are read out, and
the plurality of stages of computation with the lifting scheme are performed.

23. The wavelet inverse transformation device according to claim 22, wherein the vertical filtering means perform vertical direction synthesizing filtering with the lifting scheme until the number of lines in the horizontal direction are all gone.

24. The wavelet inverse transformation device according to claim 22, wherein,
the number of lines read out from the first buffer is three lines, and the number of coefficients stored in the second buffer is three.

25. The wavelet inverse transformation device according to claim 22, wherein the first buffer is configured having within itself independent buffers of as many lines as necessary for performing the vertical direction synthesizing filtering.

26. The wavelet inverse transformation device according to claim 22, wherein the second buffer is configured having within itself independent buffers of as many coefficients necessary for performing the plurality of stages of computation.

27. The wavelet inverse transformation device according to claim 20, wherein,
the lifting scheme is a scheme for performing horizontal direction synthesizing filtering in multiple stages of computation, and
the horizontal filtering means perform a preset number of columns worth of horizontal direction synthesizing filtering with the lifting scheme.

28. The wavelet inverse transformation device according to claim 27, wherein the horizontal filtering means further comprise:
holding means for holding a part of coefficients obtained in the process of the plurality of stages of computation with the lifting scheme, and generating the image by performing the plurality of stages of computation to the final stage, wherein,
when performing horizontal direction synthesizing filtering for the next stage, only a necessary number of columns of the coefficients from vertical direction synthesizing filtering results from the vertical filtering means are input,
coefficients held in the holding means in the process of the plurality of stages of computation with the previous lifting scheme are read out, and
the plurality of stages of computation with the lifting scheme are performed.

29. The wavelet inverse transformation device according to claim 28, wherein the horizontal filtering means perform horizontal direction synthesizing filtering with the lifting scheme until the number of columns in the horizontal direction are all gone.

30. The wavelet inverse transformation device according to claim 28, wherein,
the number of columns which can be input to the lifting scheme at once is three columns, and
the number of coefficients held in the holding means is three.

31. The wavelet inverse transformation device according to claim 28, wherein the horizontal filtering means store, in the first buffer corresponding to the levels, highband component and lowband component coefficients generated by performing the plurality of stages of computation with the lifting scheme to the final stage.

32. The wavelet inverse transformation device according to claim 19, wherein,
the horizontal filtering means input the frequency components in increments of lines, and perform the horizontal direction lowband synthesizing filtering and highband synthesizing filtering each time the number of samples in the horizontal direction reaches a predetermined number, and
the vertical filtering means perform the vertical direction lowband synthesizing filtering and highband synthesizing filtering each time the number of lines in the vertical direction of the frequency component in the results of the horizontal direction synthesizing filtering performed by the horizontal filtering means reach a predetermined number.

33. The wavelet inverse transformation device according to claim 19, wherein,
the image signals are video signals comprising a plurality of pictures, divided into a plurality of frequency components by performing analysis filtering on the lowest frequency components in a hierarchical manner, and
the vertical filtering means and the horizontal filtering means perform synthesizing filtering in a hierarchical manner form, of a plurality of frequency components, a predetermined number of frequency components including the lowest frequency components, ultimately generating a picture.

34. The wavelet inverse transformation device according to claim 33, further comprising:
vertical synchronizing signal insertion means for inserting vertical synchronizing signals between the pictures generated by the vertical filtering means and the horizontal filtering means.

35. A wavelet inverse transformation method for performing wavelet inverse transformation at a plurality of division levels as to frequency components, generated by wavelet transformation having been performed as to image signals, thereby reconstructing an image, the method comprising:
storing coefficients from results of synthesizing filtering in a horizontal direction in a plurality of first buffers which are independent for each of the division levels, except for a lowest band;
storing coefficients generated in a process of synthesizing filtering in a vertical direction in second buffers independent for each of the levels;
performing the vertical direction synthesizing filtering, using coefficients read out from the first and second buffers; and
taking coefficients from the results of the vertical direction synthesizing filtering as the input of the horizontal direction synthesizing filter for the next level, except for the final level of the levels.

36. A non-transitory computer-readable storage medium having stored thereon a program for causing a computer to execute processing of wavelet inverse transformation at a plurality of division levels as to frequency components, generated by wavelet transformation having been performed as to image signals, thereby reconstructing an image, the processing comprising:
storing coefficients from results of synthesizing filtering in a horizontal direction in a plurality of first buffers which are independent for each of the division levels;
storing a part of coefficients generated in a process of synthesizing filtering in a vertical direction in second buffers independent for each of the levels;
performing vertical direction synthesizing filtering, using coefficients read out from the first and second buffers; and
taking coefficients from the results of the vertical direction synthesizing filtering as the input of the horizontal direction synthesizing filter for the next level, except for the final level of the levels.

37. A wavelet transformation device for performing wavelet transformation at a plurality of division levels as to image signals, the wavelet transformation device comprising:
a first buffer comprising a plurality of buffers which are independent for each division level for storing, independently for each of the levels, coefficients from results of analysis filtering in a horizontal direction of the image signals;

a second buffer coupled to a vertical filtering unit for storing, independently for each of the levels, coefficients generated in a computation process of analysis filtering in a vertical direction of the image signals;

a vertical filtering unit for performing the vertical direction analysis filtering, using coefficients read out from the first and second buffers; and a horizontal filtering unit for performing analysis filtering in the horizontal direction, using coefficients from the results of the vertical direction analysis filtering as the input of the horizontal direction analysis filtering for the next level, except for the final level of the levels.

38. A wavelet inverse transformation device for performing wavelet inverse transformation at a plurality of division levels as to frequency components, generated by wavelet transformation having been performed as to image signals, thereby reconstructing an image, the wavelet inverse transformation device comprising:

a first buffer comprising a plurality of buffers which are independent for each division level for storing, independently for each of the levels except for the lowest band, coefficients from results of synthesizing filtering in a horizontal direction of the frequency components;

a second buffer coupled to a vertical filtering unit for storing, independently for each of the levels, coefficients generated in a computation process of synthesizing filtering in a vertical direction as to the frequency components;

a vertical filtering unit for performing the vertical direction synthesizing Filtering, using coefficients read out from the first and second buffers; and a horizontal filtering unit for performing synthesizing filtering in the horizontal direction, using coefficients from the results of the vertical direction synthesizing filtering as the input of the horizontal direction synthesizing filtering for the next level, except for the final level of the levels.

* * * * *